(12) United States Patent
Pham et al.

(10) Patent No.: US 10,767,878 B2
(45) Date of Patent: Sep. 8, 2020

(54) HUMIDIFIER CONTROL SYSTEMS AND METHODS

(71) Applicant: Emerson Climate Technologies, Inc., Sidney, OH (US)

(72) Inventors: Hung M. Pham, Dayton, OH (US); Stuart K. Morgan, West Chester, OH (US); Brian R. Butler, Centerville, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/196,770

(22) Filed: Nov. 20, 2018

(65) Prior Publication Data

US 2019/0154286 A1 May 23, 2019

Related U.S. Application Data

(60) Provisional application No. 62/589,035, filed on Nov. 21, 2017, provisional application No. 62/589,041, (Continued)

(51) Int. Cl.
*F24F 11/00* (2018.01)
*F24F 11/30* (2018.01)
(Continued)

(52) U.S. Cl.
CPC ...... *F24F 11/0001* (2013.01); *F24F 11/0008* (2013.01); *F24F 11/30* (2018.01);
(Continued)

(58) Field of Classification Search
CPC ........ F24F 11/0001; F24F 11/77; F24F 11/86; F24F 11/65; F24F 11/30; F24F 11/0008;
(Continued)

(56) References Cited

U.S. PATENT DOCUMENTS

| 4,135,370 A | 1/1979 | Hosoda et al. |
| 4,136,529 A | 1/1979 | McCarty |

(Continued)

FOREIGN PATENT DOCUMENTS

| CN | 102019120 A | 4/2011 |
| CN | 102353751 A | 2/2012 |

(Continued)

OTHER PUBLICATIONS

International Search Report of the ISA/KR regarding International Application No. PCT/US2018/062190 dated Mar. 21, 2019.
(Continued)

*Primary Examiner* — James J Lee
*Assistant Examiner* — Michael W Choi
(74) *Attorney, Agent, or Firm* — Harness, Dickey & Pierce, P.L.C.

(57) ABSTRACT

An indoor air quality (IAQ) system for a building includes a relative humidity (RH) sensor. The RH sensor is configured to measure a RH of the air within the building. At least one of a thermostat and an IAQ control module is configured to control humidification of the building based on the RH measured by the RH sensor.

25 Claims, 24 Drawing Sheets

Related U.S. Application Data filed on Nov. 21, 2017, provisional application No. 62/589,046, filed on Nov. 21, 2017, provisional application No. 62/589,049, filed on Nov. 21, 2017, provisional application No. 62/660,361, filed on Apr. 20, 2018, provisional application No. 62/660,393, filed on Apr. 20, 2018.

(51) Int. Cl.

| F24F 11/77 | (2018.01) |
|---|---|
| F24F 11/86 | (2018.01) |
| F24F 11/65 | (2018.01) |
| F24F 110/66 | (2018.01) |
| F24F 110/64 | (2018.01) |
| F24F 110/20 | (2018.01) |
| F24F 110/10 | (2018.01) |

(52) U.S. Cl.
CPC .............. *F24F 11/65* (2018.01); *F24F 11/77* (2018.01); *F24F 11/86* (2018.01); *F24F 2110/10* (2018.01); *F24F 2110/20* (2018.01); *F24F 2110/64* (2018.01); *F24F 2110/66* (2018.01)

(58) Field of Classification Search
CPC .............. F24F 2110/20; F24F 2110/64; F24F 2110/66; F24F 2110/10
USPC ........................................................ 700/276
See application file for complete search history.

(56) References Cited

U.S. PATENT DOCUMENTS

| | | |
|---|---|---|
| 4,735,054 A | 4/1988 | Beckey |
| 4,922,808 A | 5/1990 | Smith |
| 4,977,818 A | 12/1990 | Taylor et al. |
| 5,067,394 A | 11/1991 | Cavallero |
| 5,129,234 A | 7/1992 | Alford |
| 5,259,553 A | 11/1993 | Shyu |
| 5,267,897 A | 12/1993 | Drees |
| 5,303,561 A | 4/1994 | Bahel et al. |
| 5,351,855 A | 10/1994 | Nelson et al. |
| 5,394,934 A | 3/1995 | Rein et al. |
| 5,428,964 A | 7/1995 | Lobdell |
| 5,520,328 A | 5/1996 | Bujak, Jr. |
| 5,598,715 A | 2/1997 | Edmisten |
| 5,707,005 A | 1/1998 | Kettler et al. |
| 5,832,411 A | 11/1998 | Schatzmann et al. |
| 5,887,784 A | 3/1999 | Haas |
| 5,892,690 A | 4/1999 | Boatman et al. |
| 5,904,896 A | 5/1999 | High |
| 6,161,764 A | 12/2000 | Jatnieks |
| 6,187,263 B1 | 2/2001 | Nielsen |
| 6,230,980 B1 | 5/2001 | Hudson |
| 6,251,344 B1 | 6/2001 | Goldstein |
| 6,288,646 B1 | 9/2001 | Skardon |
| 6,358,374 B1 | 3/2002 | Obee et al. |
| 6,369,716 B1 | 4/2002 | Abbas et al. |
| 6,377,858 B1 | 4/2002 | Koeppe |
| 6,391,102 B1 | 5/2002 | Bodden et al. |
| 6,392,536 B1 | 5/2002 | Tice et al. |
| 6,394,427 B1 | 5/2002 | Guetersloh et al. |
| 6,406,367 B1 | 6/2002 | Chou et al. |
| 6,406,506 B1 | 6/2002 | Moredock et al. |
| 6,423,118 B1 | 7/2002 | Becerra et al. |
| 6,448,896 B1 | 9/2002 | Bankus et al. |
| 6,466,133 B1 | 10/2002 | Skardon |
| 6,493,638 B1 | 12/2002 | McLean et al. |
| 6,494,053 B1 | 12/2002 | Forkosh et al. |
| 6,494,940 B1 | 12/2002 | Hak |
| 6,503,462 B1 | 1/2003 | Michalakos et al. |
| 6,557,365 B2 | 5/2003 | Dinnage et al. |
| 6,578,770 B1 | 6/2003 | Rosen |
| 6,582,295 B1 | 6/2003 | Abouchaar |
| 6,588,250 B2 | 7/2003 | Schell |
| 6,622,993 B2 | 9/2003 | Mulvaney |
| 6,691,526 B2 | 2/2004 | Gether et al. |
| 6,698,219 B2 | 3/2004 | Sekhar et al. |
| 6,711,470 B1 | 3/2004 | Hartenstein et al. |
| 6,752,713 B2 | 6/2004 | Johnson, Jr. |
| 6,790,136 B2 | 9/2004 | Sharp et al. |
| 6,826,920 B2 | 12/2004 | Wacker |
| 6,843,068 B1 | 1/2005 | Wacker |
| 6,848,266 B1 | 2/2005 | Sheehan |
| 6,884,399 B2 | 4/2005 | Reisfeld et al. |
| 6,898,960 B1 | 5/2005 | Bodnar |
| 6,902,592 B2 | 6/2005 | Green et al. |
| 6,916,239 B2 | 7/2005 | Siddaramanna et al. |
| 6,919,809 B2 | 7/2005 | Blunn et al. |
| 6,920,874 B1 | 7/2005 | Siegel |
| 6,924,326 B2 | 8/2005 | Meyer et al. |
| 6,926,079 B2 | 8/2005 | Kensok et al. |
| 6,941,193 B2 | 9/2005 | Frecska et al. |
| 6,952,715 B1 | 10/2005 | Kronz |
| 7,016,791 B2 | 3/2006 | Carnegie et al. |
| 7,048,776 B2 | 5/2006 | Moore et al. |
| 7,059,400 B2 | 6/2006 | Sekhar et al. |
| 7,114,343 B2 | 10/2006 | Kates |
| 7,151,264 B2 | 12/2006 | Ehlers, Sr. |
| 7,178,350 B2 | 2/2007 | Shah |
| 7,186,290 B2 | 3/2007 | Sheehan et al. |
| 7,222,494 B2 | 5/2007 | Peterson et al. |
| 7,241,326 B2 | 7/2007 | Han et al. |
| 7,253,743 B2 | 8/2007 | Liang et al. |
| 7,255,831 B2 | 8/2007 | Wei et al. |
| 7,261,762 B2 | 8/2007 | Kang et al. |
| 7,266,960 B2 | 9/2007 | Shah |
| 7,267,017 B1 | 9/2007 | Bodnar |
| RE39,871 E | 10/2007 | Skardon |
| 7,291,206 B1 | 11/2007 | Kiern et al. |
| 7,291,315 B2 | 11/2007 | Obee et al. |
| 7,302,313 B2 | 11/2007 | Sharp et al. |
| 7,306,650 B2 | 12/2007 | Slayzak et al. |
| 7,325,748 B2 | 2/2008 | Acker, Jr. |
| 7,326,388 B2 | 2/2008 | Uslenghi et al. |
| 7,357,828 B2 | 4/2008 | Bohlen |
| 7,366,588 B2 | 4/2008 | Kim et al. |
| 7,368,003 B2 | 5/2008 | Crapser et al. |
| 7,369,955 B2 | 5/2008 | Lee |
| 7,378,064 B2 | 5/2008 | Uslenghi et al. |
| 7,381,244 B2 | 6/2008 | Tyndall et al. |
| 7,389,158 B2 | 6/2008 | Desrochers et al. |
| 7,398,821 B2 | 7/2008 | Rainer et al. |
| 7,407,624 B2 | 8/2008 | Cumberland et al. |
| 7,413,594 B2 | 8/2008 | Paterson et al. |
| 7,434,413 B2 | 10/2008 | Wruck |
| 7,475,828 B2 | 1/2009 | Bartlett et al. |
| 7,552,030 B2 | 6/2009 | Guralnik et al. |
| 7,552,635 B2 | 6/2009 | Chang et al. |
| 7,574,871 B2 | 8/2009 | Bloemer et al. |
| 7,621,985 B1 | 11/2009 | Kuo |
| 7,632,178 B2 | 12/2009 | Meneely, Jr. |
| 7,632,340 B2 | 12/2009 | Brady et al. |
| 7,635,845 B2 | 12/2009 | Jensen et al. |
| 7,645,323 B2 | 1/2010 | Massenbauer-Strafe et al. |
| 7,651,256 B2 | 1/2010 | Lee et al. |
| 7,721,560 B2 | 5/2010 | Carpenter |
| 7,740,184 B2 | 6/2010 | Schnell et al. |
| 7,748,639 B2 | 7/2010 | Perry |
| 7,758,408 B2 | 7/2010 | Hagentoft |
| 7,765,792 B2 | 8/2010 | Rhodes et al. |
| 7,780,092 B2 | 8/2010 | Ahmed |
| 7,789,951 B2 | 9/2010 | Sung et al. |
| 7,811,363 B2 | 10/2010 | Zhang |
| 7,836,712 B2 | 11/2010 | Sasao et al. |
| 7,837,958 B2 | 11/2010 | Crapser et al. |
| 7,839,275 B2 | 11/2010 | Spalink et al. |
| 7,857,884 B2 | 12/2010 | Bohlen |
| 7,857,890 B2 | 12/2010 | Paterson et al. |
| 7,918,407 B2 | 4/2011 | Patch |
| 7,932,490 B2 | 4/2011 | Wang et al. |
| 7,938,896 B2 | 5/2011 | Paterson et al. |

(56) References Cited

U.S. PATENT DOCUMENTS

| | | |
|---|---|---|
| 7,951,327 B2 | 5/2011 | Reisfeld et al. |
| 7,966,104 B2 | 6/2011 | Srivastava et al. |
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Kilps et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,233,472 B2 | 1/2016 | Angle et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,375,847 B2 | 6/2016 | Angle et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |
| 9,404,666 B2 | 8/2016 | Terlson et al. |
| 9,405,301 B2 | 8/2016 | Montero et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |

(56) References Cited

U.S. PATENT DOCUMENTS

| | | | |
|---|---|---|---|
| 9,423,144 B2 | 8/2016 | Evans et al. |
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,802,322 B2 | 10/2017 | Angle et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,874,873 B2 | 1/2018 | Angle et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 2003/0070544 A1 | 4/2003 | Mulvaney et al. |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0182506 A1 | 7/2008 | Jackson et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2011/0010071 A1 | 1/2011 | Rhodes et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0323374 A1 | 12/2012 | Dean-Hendricks et al. |
| 2013/0014522 A1 | 1/2013 | Lukasse et al. |
| 2013/0144527 A1 | 6/2013 | Kuhnreichi |
| 2013/0174841 A1* | 7/2013 | McAuley .......... A61M 16/0066 128/203.14 |
| 2013/0184875 A1 | 7/2013 | Miura |
| 2013/0226352 A1 | 8/2013 | Dean-Hendricks et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0194039 A1 | 7/2015 | Martin |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0323941 A1 | 11/2015 | Pariseau et al. |
| 2015/0330650 A1 | 11/2015 | Abiprojo et al. |
| 2015/0330817 A1 | 11/2015 | Law et al. |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |
| 2016/0048143 A1 | 2/2016 | Chan et al. |
| 2016/0054018 A1* | 2/2016 | Motodani ................ F24F 11/56 700/276 |
| 2016/0054023 A1 | 2/2016 | Baker et al. |

(56) References Cited

U.S. PATENT DOCUMENTS

| | | |
|---|---|---|
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0267776 A1 | 9/2016 | Martin |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1 | 12/2017 | Zhang et al. |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0073759 A1 | 3/2018 | Zhang et al. |
| 2018/0119973 A1 | 5/2018 | Rothman et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2018/0304472 A1 | 10/2018 | Angle et al. |
| 2018/0350226 A1 | 12/2018 | Martin |
| 2019/0097827 A1 | 3/2019 | Angle et al. |
| 2019/0178522 A1* | 6/2019 | Sun ................. G05B 19/042 |

FOREIGN PATENT DOCUMENTS

| | | |
|---|---|---|
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 2007083106 A | 4/2007 |
| JP | 2007120815 A | 5/2007 |
| JP | 2011146137 A | 7/2011 |
| JP | 5231476 B2 | 7/2013 |
| JP | 2014208343 A | 11/2014 |
| JP | 2015114014 A | 6/2015 |
| JP | 2015152175 A | 8/2015 |
| JP | 2018017403 A | 2/2018 |
| KR | 100355352 B1 | 9/2002 |
| KR | 20030016787 A | 3/2003 |
| KR | 100509332 B1 | 8/2005 |
| KR | 20070072787 A | 7/2007 |
| KR | 100819077 B1 | 4/2008 |
| KR | 100930346 B1 | 12/2009 |
| KR | 20100089605 A | 8/2010 |
| KR | 20110074222 A | 6/2011 |
| KR | 20110093329 A | 8/2011 |
| KR | 10-1492316 B1 | 2/2015 |
| KR | 101566592 B1 | 11/2015 |
| KR | 101765454 B1 | 8/2017 |
| KR | 101771053 B1 | 8/2017 |
| KR | 20170122043 A | 11/2017 |
| KR | 20180007381 A | 1/2018 |
| LU | 92350 A1 | 7/2015 |
| WO | WO-9409324 A1 | 4/1994 |
| WO | WO-2005110580 A2 | 11/2005 |
| WO | WO-2013163612 A1 | 10/2013 |
| WO | WO-2015078672 A1 | 6/2015 |
| WO | WO-2016102337 A1 | 6/2016 |
| WO | WO-2016139544 A1 | 9/2016 |
| WO | WO-2017146637 A1 | 8/2017 |

(56) References Cited

OTHER PUBLICATIONS

Written Opinion of the ISA/KR regarding International Application No. PCT/US2018/062190 dated Mar. 21, 2019.
Written Opinion of the ISA/KR regarding International Application No. PCT/US2019/028391 dated Aug. 14, 2019.
International Search Report regarding International Application No. PCT/US2019/028391 dated Aug. 14, 2019.
"Clean Your Air with Keen Home Smart Filters", Keen Home, Inc., <https://keenhome.io/pages/smart-filter> 2018.
"Home Comfort: Digital, App-Based Climate Control", Ecovent Systems Inc., <https://www.ecoventsystems.com/> 2018.
"Meet the Keen Home Zoning System—How It Works", Keen Home, Inc., <https://keenhome.io/pages/how-it-works> 2018.
Doty, Steve, et al., "Building Operations: Balancing Energy Efficiency with Indoor Air Quality", 2009.
El Mankibi, Mohamed, "Indoor air quality control in case of scheduled or intermittent occupancy based building: Development of a scale model", 2009.
Emmerich, Steven, et al., "Indoor air quality impacts of residential HVAC systems, phase 1 report: Computer simulation plan", NISTIR 5346: Building and Fire Research Laboratory; National Institute of Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.
Footbot; Product Specifications; www.footbot.io. Accessed Sep. 13, 2017.
Herberger, Simone, et al., "Indoor Air Quality Monitoring Improving Air Quality Perception", 2012.
Shaw, C. Y., "Maintaining acceptable air quality in office buildings through ventilation", Construction Technology Updated No. 3, Institute for Research in Construction, National Research Council of Canada, Jan. 1997; 4 Pages.
Turner, William J.N., et al, "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.
Notice of Allowance regarding U.S. Appl. No. 16/196,744 dated Mar. 4, 2020.

\* cited by examiner

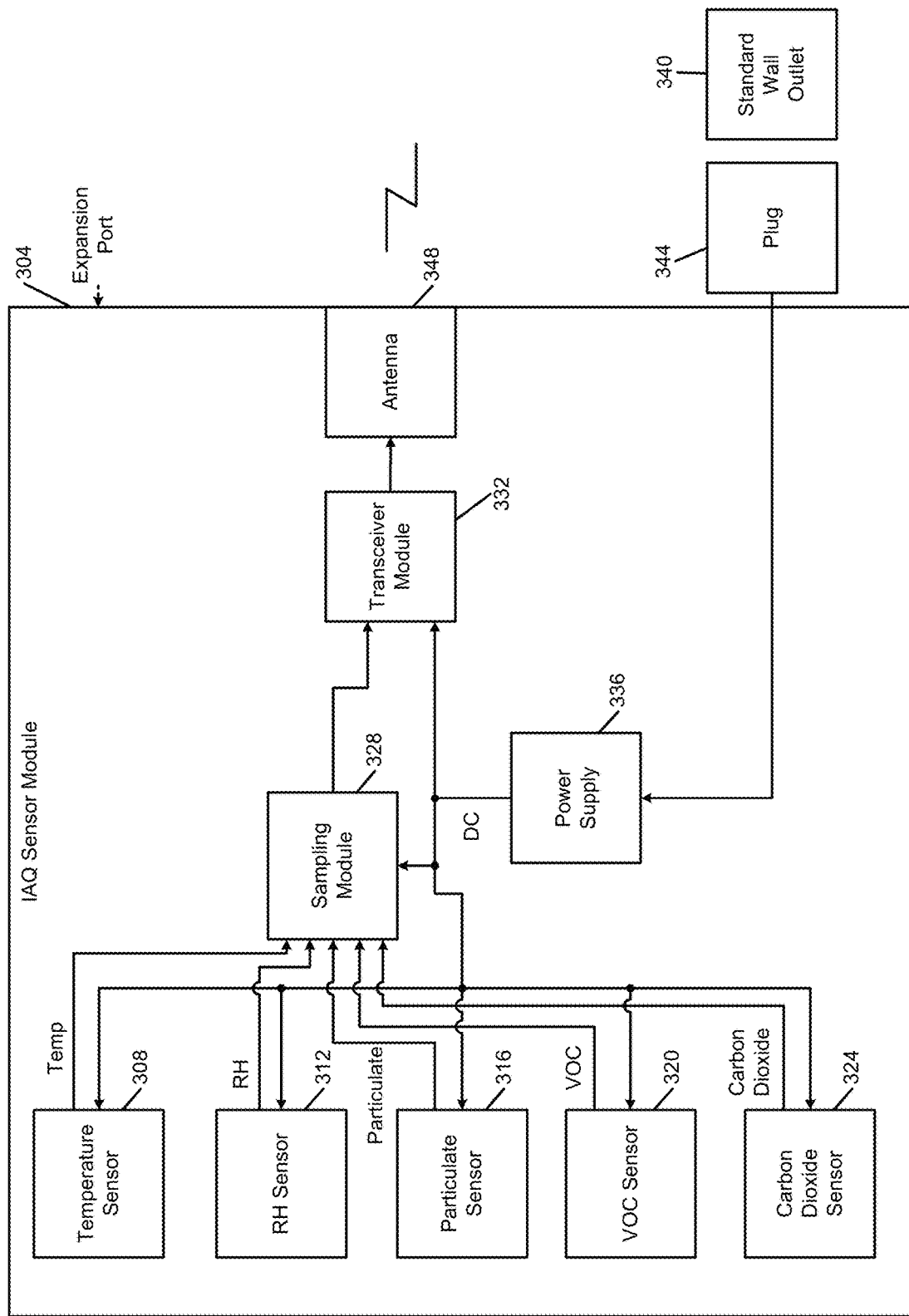

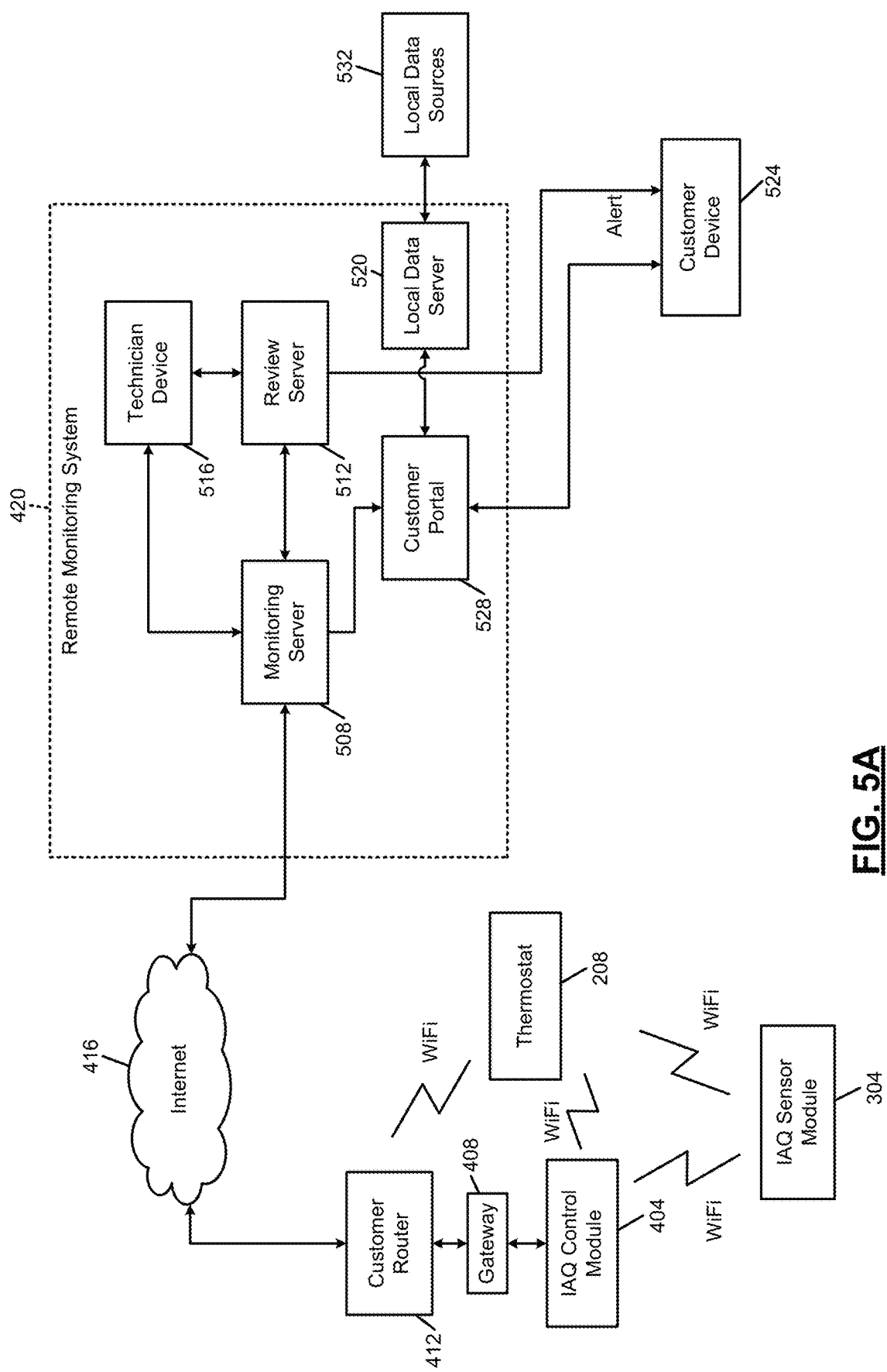

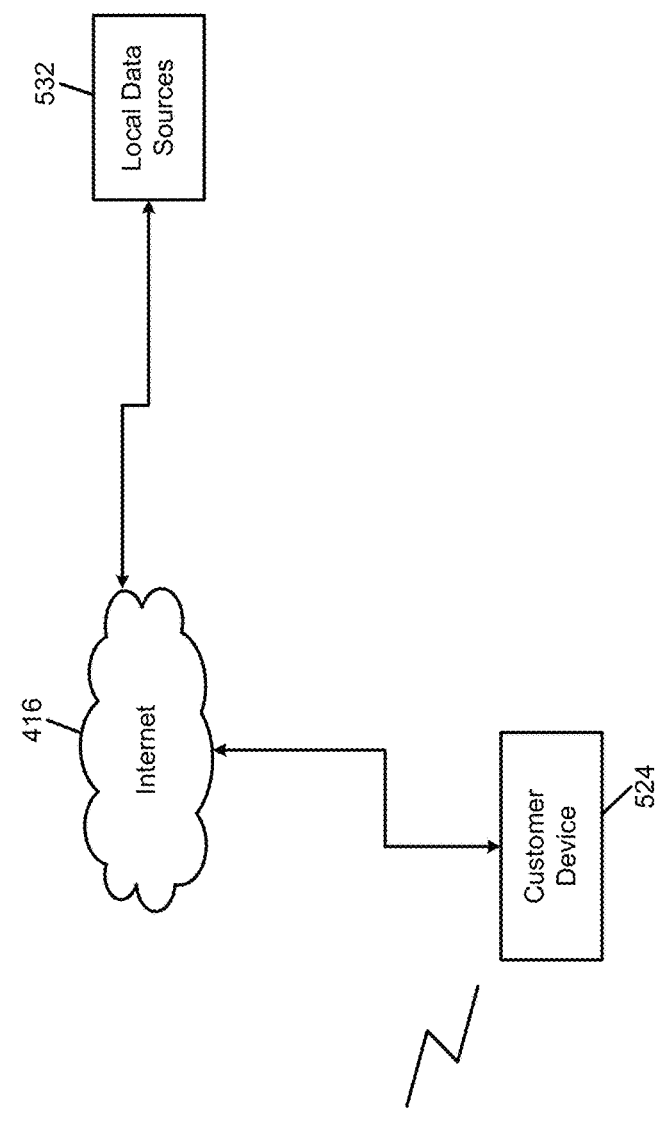
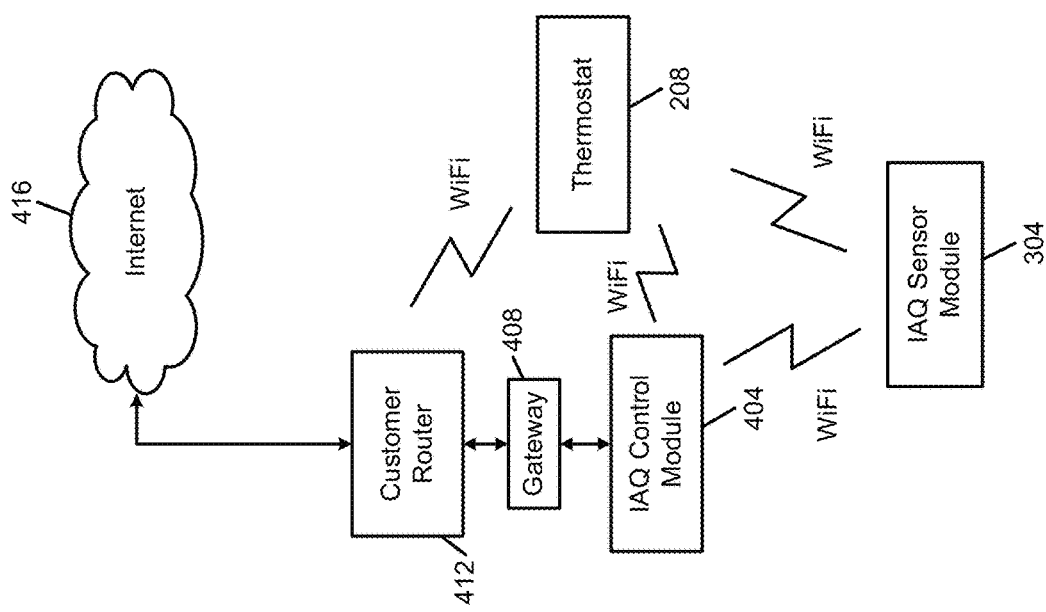
FIG. 5B

| | Conditions | | | | | Sequence of Modes | | | | |
|---|---|---|---|---|---|---|---|---|---|---|
| | Temp | RH | $PM_{2.5}$ | VOC | $CO_2$ | Conditions | Mode 1 | Mode 2 | Mode 3 | Mode 4 | Mode 5 |
| Set Points | 68-74° | 40-60% | <12 ppb | <60 ppm | <600 ppb | | | | | | |
| | Temp + | | | | | 1 | Cool | | | | |
| | Temp + | RH + | | | | 2 | Cool | Dehumidify | | | |
| | Temp + | RH + | $PM_{2.5}$ | | | 3 | Cool | Dehumidify | | PM | |
| | Temp + | RH + | $PM_{2.5}$ | VOC | | 4 | Cool | Dehumidify | | PM | VOC/CO2 |
| | Temp + | RH + | $PM_{2.5}$ | VOC | $CO_2$ | 5 | Cool | Dehumidify | | PM | VOC/CO2 |
| | Temp + | RH - | | | | 5 | Cool | | Humidify | | |
| | Temp + | RH - | $PM_{2.5}$ | | | 6 | Cool | | Humidify | PM | |
| | Temp + | RH - | $PM_{2.5}$ | VOC | | 7 | Cool | | Humidify | PM | VOC/CO2 |
| | Temp + | RH - | $PM_{2.5}$ | VOC | $CO_2$ | | Cool | | Humidify | PM | VOC/CO2 |
| | Temp + | | $PM_{2.5}$ | | | 8 | Cool | | | PM | |
| | Temp + | | $PM_{2.5}$ | VOC | | 9 | Cool | | | PM | VOC/CO2 |
| | Temp + | | $PM_{2.5}$ | VOC | $CO_2$ | | Cool | | | PM | VOC/CO2 |
| | Temp + | | | VOC | | 10 | Cool | | | | VOC/CO2 |
| | Temp + | | | VOC | $CO_2$ | | Cool | | | | VOC/CO2 |
| | Temp + | | | | $CO_2$ | | Cool | | | | VOC/CO2 |
| | Temp - | | | | | 11 | Heat | | | | |
| | Temp - | RH + | | | | 12 | Heat | Dehumidify | | | |
| | Temp - | RH + | $PM_{2.5}$ | | | 13 | Heat | Dehumidify | | PM | |
| | Temp - | RH + | $PM_{2.5}$ | VOC | | 14 | Heat | Dehumidify | | PM | VOC/CO2 |
| | Temp - | RH + | $PM_{2.5}$ | VOC | $CO_2$ | | Heat | Dehumidify | | PM | VOC/CO2 |
| | Temp - | RH - | | | | 15 | Heat | | Humidify | | |
| | Temp - | RH - | $PM_{2.5}$ | | | 16 | Heat | | Humidify | PM | |
| | Temp - | RH - | $PM_{2.5}$ | VOC | | 17 | Heat | | Humidify | PM | VOC/CO2 |
| | Temp - | RH - | $PM_{2.5}$ | VOC | $CO_2$ | | Heat | | Humidify | PM | VOC/CO2 |
| | Temp - | | $PM_{2.5}$ | | | 18 | Heat | | | PM | |
| | Temp - | | $PM_{2.5}$ | VOC | | 19 | Heat | | | PM | VOC/CO2 |
| | Temp - | | $PM_{2.5}$ | VOC | $CO_2$ | | Heat | | | PM | VOC/CO2 |
| | Temp - | | | VOC | | 20 | Heat | | | | VOC/CO2 |
| | Temp - | | | VOC | $CO_2$ | | Heat | | | | VOC/CO2 |
| | Temp - | | | | $CO_2$ | | Heat | | | | VOC/CO2 |
| | | RH + | | | | 21 | | Dehumidify | | | |
| | | RH + | $PM_{2.5}$ | | | 22 | | Dehumidify | | PM | |
| | | RH + | $PM_{2.5}$ | VOC | | 23 | | Dehumidify | | PM | VOC/CO2 |
| | | RH + | $PM_{2.5}$ | VOC | $CO_2$ | | | Dehumidify | | PM | VOC/CO2 |
| | | RH + | | VOC | | 24 | | Dehumidify | | | VOC/CO2 |
| | | RH + | | VOC | $CO_2$ | | | Dehumidify | | | VOC/CO2 |
| | | RH + | | | $CO_2$ | | | Dehumidify | | | VOC/CO2 |
| | | RH - | | | | 25 | | | Humidify | | |
| | | RH - | $PM_{2.5}$ | | | 26 | | | Humidify | PM | |
| | | RH - | $PM_{2.5}$ | VOC | | 27 | | | Humidify | PM | VOC/CO2 |
| | | RH - | $PM_{2.5}$ | VOC | $CO_2$ | | | | Humidify | PM | VOC/CO2 |
| | | RH - | | VOC | | 28 | | | Humidify | | VOC/CO2 |
| | | RH - | | VOC | $CO_2$ | | | | Humidify | | VOC/CO2 |
| | | RH - | | | $CO_2$ | | | | Humidify | | VOC/CO2 |
| | | | $PM_{2.5}$ | | | 29 | | | | PM | |
| | | | $PM_{2.5}$ | VOC | | 30 | | | | PM | VOC/CO2 |
| | | | $PM_{2.5}$ | VOC | $CO_2$ | | | | | PM | VOC/CO2 |
| | | | $PM_{2.5}$ | | $CO_2$ | | | | | PM | VOC/CO2 |
| | | | | VOC | | 31 | | | | | VOC/CO2 |
| | | | | VOC | $CO_2$ | | | | | | VOC/CO2 |
| | | | | | $CO_2$ | | | | | | VOC/CO2 |

FIG. 10A

| 10A | 10B |
|---|---|

FIG. 10B

| Indoor Fan Speed | Compressor ON | Compressor OFF |
|---|---|---|
| High (400 CFM/Ton) | Conventional operation | |
| Medium (300 CFM/Ton) | Mode 1 Dehumidification | Mode 2 Extra Humidification |
| Low (250 CFM/Ton) | Mode 3 Extra Dehumidification | Mode 4 Humidification |
| OFF | Not Permitted | Mode 5 Standby |

FIG. 12

HUMIDIFIER CONTROL SYSTEMS AND METHODS

CROSS-REFERENCE TO RELATED APPLICATIONS

This application claims the benefit of U.S. Provisional Application No. 62/589,035, filed on Nov. 21, 2017, U.S. Provisional Application No. 62/589,041, filed on Nov. 21, 2017, U.S. Provisional Application No. 62/589,046, filed on Nov. 21, 2017, U.S. Provisional Application No. 62/589,049, filed on Nov. 21, 2017, U.S. Provisional Application No. 62/660,361, filed on Apr. 20, 2018, and U.S. Provisional Application No. 62/660,393, filed on Apr. 20, 2018. The entire disclosures of the applications referenced above are incorporated herein by reference.

FIELD

The present disclosure relates to environmental control systems and more particularly to systems and methods for controlling indoor humidity.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A residential or light commercial HVAC (heating, ventilation, and/or air conditioning) system controls temperature and humidity of a building. Upper and lower temperature limits may be specified by an occupant or owner of the building, such as an employee working in the building or a homeowner.

A thermostat controls operation of the HVAC system based on a comparison of the temperature at a thermostat and the target values. The thermostat may control the HVAC system to heat the building when the temperature is less than the lower temperature limit. The thermostat may control the HVAC system to cool the building when the temperature is greater than the upper temperature limit. Heating the building and cooling the building generally decreases humidity, although the HVAC system may include a humidifier that adds humidity to warm air output by the HVAC system during heating of the building.

SUMMARY

In a feature, an indoor air quality (IAQ) system for a building is described. A temperature sensor is configured to measure a temperature of air within the building. A relative humidity (RH) sensor is configured to measure a RH of the air within the building. At least one of a thermostat and an IAQ control module is configured to, during cooling of the air within the building, based on the RH, control operation of: a blower of an air handler unit of a heating, ventilation, and air conditioning (HVAC) system of the building; and a compressor of a condenser unit of the HVAC system of the building. The at least one of the thermostat and the IAQ control module is configured to, while the compressor is off: operate the blower at a first predetermined speed when the RH is less than a first predetermined RH but greater than a second predetermined RH; and operate the blower at a second predetermined speed that is greater than the first predetermined speed when the RH is less than the second predetermined RH.

In further features, the one of the thermostat and the IAQ control module is configured to, during cooling of the air within the building: selectively turn the compressor on and off based on the RH; and selectively turn the blower on and off based on the RH.

In further features, the one of the thermostat and the IAQ control module is configured to, in response to a determination that the RH is greater than a third predetermined RH: operate the blower; and operate the compressor.

In further features, the one of the thermostat and the IAQ control module is configured to, in response to a determination that the RH is less than a fourth predetermined RH that is less than the third predetermined RH: operate the blower; and disable the compressor.

In further features, the one of the thermostat and the IAQ control module is configured to, in response to a determination that the RH is greater than a third predetermined RH: operate the blower at a third predetermined speed; and operate the compressor.

In further features, the one of the thermostat and the IAQ control module is configured to, in response to a determination that the RH is greater than a fourth predetermined RH that is greater than the third predetermined RH: operate the blower at a fourth predetermined speed that is less than the third predetermined speed; and operate the compressor.

In further features, the one of the thermostat and the IAQ control module is configured to, in response to determinations that the RH is not greater than the third predetermined RH and is not less than the first predetermined RH: operate the blower at the third predetermined speed that is greater than the fourth predetermined speed; and operate the compressor.

In further features, the one of the thermostat and the IAQ control module is configured to, in response to a determination that the RH is less than a third predetermined RH: operate the blower at a third predetermined speed; and disable the compressor.

In further features, the one of the thermostat and the IAQ control module is configured to, in response to a determination that the RH is less than a fourth predetermined RH that is less than the third predetermined RH: operate the blower at a fourth predetermined speed that is greater than the third predetermined speed; and disable the compressor.

In a feature, an indoor air quality (IAQ) control method for a building, includes: by a temperature sensor, measuring a temperature of air within the building; by a relative humidity (RH) sensor, measuring a RH of the air within the building; and by at least one of a thermostat and an IAQ control module, during cooling of the air within the building, based on the RH, controlling operation of: a blower of an air handler unit of a heating, ventilation, and air conditioning (HVAC) system of the building; and a compressor of a condenser unit of the HVAC system of the building, where the control includes, while the compressor is off: operating the blower at a first predetermined speed when the RH is less than a first predetermined RH but greater than a second predetermined RH; and operating the blower at a second predetermined speed that is greater than the first predetermined speed when the RH is less than the second predetermined RH.

In further features, the controlling operation includes, by the at least one of the thermostat and the IAQ control module, during cooling of the air within the building, based on the RH: selectively turning the compressor on and off based on the RH; and selectively turning the blower on and off based on the RH.

In further features, the controlling operation includes, by the at least one of the thermostat and the IAQ control module, in response to a determination that the RH is greater than a third predetermined RH: operating the blower; and operating the compressor.

In further features, the controlling operation includes, by the at least one of the thermostat and the IAQ control module, during cooling of the air within the building, in response to a determination that the RH is less than a fourth predetermined RH that is less than the third predetermined RH: operating the blower; and disabling the compressor.

In further features, the controlling operation includes, by the at least one of the thermostat and the IAQ control module, during cooling of the air within the building, in response to a determination that the RH is greater than a third predetermined RH: operating the blower at a third predetermined speed; and operating the compressor.

In further features, the controlling operation includes, by the at least one of the thermostat and the IAQ control module, during cooling of the air within the building, in response to a determination that the RH is greater than a fourth predetermined RH that is greater than the third predetermined RH: operating the blower at a fourth predetermined speed that is less than the third predetermined speed; and operating the compressor.

In further features, the controlling operation includes, by the at least one of the thermostat and the IAQ control module, during cooling of the air within the building, in response to determinations that the RH is not greater than the third predetermined RH and is not less than the first predetermined RH: operating the blower at the third predetermined speed that is greater than the fourth predetermined speed; and operating the compressor.

In further features, the controlling operation includes, by the at least one of the thermostat and the IAQ control module, during cooling of the air within the building, in response to a determination that the RH is less than a third predetermined RH: operating the blower at a third predetermined speed; and disabling the compressor.

In further features, the controlling operation includes, by the at least one of the thermostat and the IAQ control module, during cooling of the air within the building, in response to a determination that the RH is less than a fourth predetermined RH that is less than the third predetermined RH: operating the blower at a fourth predetermined speed that is greater than the third predetermined speed; and disabling the compressor.

In a feature, a humidifier control system for a building is described. An IAQ sensor module is located within the building and includes: a particulate sensor configured to measure an amount of particulate of at least a predetermined size present in air at the IAQ sensor module; a volatile organic compound (VOC) sensor configured to measure an amount of VOCs present in air at the IAQ sensor module; and an average module configured to determine an average relative humidity (RH) of air within the building. An IAQ score module is configured to determine an IAQ score value for air within the building based on the amount of particulate, the amount of VOCs, a RH of air within the building, and a temperature of air within the building. A humidifier control module is configured to selectively open and close a water feed valve of a humidifier within the building based on the IAQ score value and the average RH.

In further features, the humidifier control module is configured to open the water feed valve of the humidifier in response to a determination that the average RH is less than a predetermined RH while a blower that blows air through the humidifier is on.

In further features, the humidifier control module is configured to maintain the water feed valve of the humidifier open until an increase in the IAQ score value over a period is less than or equal to zero.

In further features, the humidifier control module is configured to close the water feed valve of the humidifier in response to a determination that the increase in the IAQ score value over a period is less than or equal to zero.

In further features, the humidifier control module is configured to close the water feed valve of the humidifier in response to a determination that a temperature of air output by an air handler unit to the building is less than a predetermined temperature.

In further features, a setpoint module is configured to adjust the predetermined RH in response to receipt of user input.

In further features, the humidifier control module is further configured to turn on a humidifier blower when the water feed valve is open.

In further features, the humidifier control module is configured to close the water feed valve of the humidifier in response to a determination that a temperature of air output by an air handler unit to the building is less than a predetermined temperature.

In further features, the IAQ sensor module further includes: a temperature sensor configured to measure the temperature of air; and a RH sensor configured to measure the RH of air.

In further features, the IAQ sensor module further includes a carbon dioxide sensor configured to measure an amount of carbon dioxide present in air at the IAQ sensor module. The IAQ score module is configured to determine the IAQ score value for the air further based on the amount of carbon dioxide.

In further features, at least one of: the IAQ score module is configured to decrease the IAQ score value when the amount of particulate is greater than a predetermined amount of particulate; the IAQ score module is configured to decrease the IAQ score value when the amount of VOCs is greater than a predetermined amount of VOCs; the IAQ score module is configured to decrease the IAQ score value when the amount of carbon dioxide is greater than a predetermined amount of carbon dioxide; the IAQ score module is configured to decrease the IAQ score value when the RH is outside of a predetermined RH range; and the IAQ score module is configured to decrease the IAQ score value when the temperature is outside of a predetermined temperature range.

In further features, all of: the IAQ score module is configured to decrease the IAQ score value when the amount of particulate is greater than a predetermined amount of particulate; the IAQ score module is configured to decrease the IAQ score value when the amount of VOCs is greater than a predetermined amount of VOCs; the IAQ score module is configured to decrease the IAQ score value when the amount of carbon dioxide is greater than a predetermined amount of carbon dioxide; the IAQ score module is configured to decrease the IAQ score value when the RH is outside of a predetermined RH range; and the IAQ score module is configured to decrease the IAQ score value when the temperature is outside of a predetermined temperature range.

In further features, at least one of: the IAQ score module is configured to decrease the IAQ score value as a first period that the amount of particulate has been greater than a predetermined amount of particulate increases; the IAQ score module is configured to decrease the IAQ score value as a second period that the amount of VOCs has been greater than a predetermined amount of VOCs increases; the IAQ score module is configured to decrease the IAQ score value as a third period that the amount of carbon dioxide has been greater than a predetermined amount of carbon dioxide increases; the IAQ score module is configured to decrease the IAQ score value as a fourth period that the RH has been outside of a predetermined RH range increases; and the IAQ score module is configured to decrease the IAQ score value as a fifth period that the temperature has been outside of a predetermined temperature range increases.

In a feature, a humidifier control method includes: by a particulate sensor of an indoor air quality (IAQ) sensor module within a building, measuring an amount of particulate of at least a predetermined size present in air at the IAQ sensor module; by a volatile organic compound (VOC) sensor of the IAQ sensor module within the building, measuring an amount of VOCs present in air at the IAQ sensor module; and determining an average relative humidity (RH) of air within the building; determining an IAQ score value for air within the building based on the amount of particulate, the amount of VOCs, a RH of air within the building, and a temperature of air within the building; and selectively opening and closing a water feed valve of a humidifier within the building based on the IAQ score value and the average RH.

In further features, selectively opening and closing a water feed valve includes opening the water feed valve of the humidifier in response to a determination that the average RH is less than a predetermined RH while a blower that blows air through the humidifier is on.

In further features, selectively opening and closing a water feed valve includes maintaining the water feed valve of the humidifier open until an increase in the IAQ score value over a period is less than or equal to zero.

In further features, selectively opening and closing a water feed valve includes closing the water feed valve of the humidifier in response to a determination that the increase in the IAQ score value over a period is less than or equal to zero.

In further features, selectively opening and closing a water feed valve includes closing the water feed valve of the humidifier in response to a determination that a temperature of air output by an air handler unit to the building is less than a predetermined temperature.

In further features, the humidifier control method further includes adjusting the predetermined RH in response to receipt of user input.

In further features, the humidifier control method further includes turning on a humidifier blower when the water feed valve is open.

In further features, selectively opening and closing a water feed valve includes closing the water feed valve of the humidifier in response to a determination that a temperature of air output by an air handler unit to the building is less than a predetermined temperature.

In further features, the humidifier control method further includes: by a temperature sensor of the IAQ sensor module, measuring the temperature of air; and by a RH sensor of the IAQ sensor module, measuring the RH of air.

In further features, the humidifier control method further includes, by a carbon dioxide sensor of the IAQ sensor module within the building, measuring an amount of carbon dioxide present in air at the IAQ sensor module, where determining the IAQ score value includes determining the IAQ score value for the air further based on the amount of carbon dioxide.

In further features, determining an IAQ score value includes at least one of: decreasing the IAQ score value when the amount of particulate is greater than a predetermined amount of particulate; decreasing the IAQ score value when the amount of VOCs is greater than a predetermined amount of VOCs; decreasing the IAQ score value when the amount of carbon dioxide is greater than a predetermined amount of carbon dioxide; decreasing the IAQ score value when the RH is outside of a predetermined RH range; and decreasing the IAQ score value when the temperature is outside of a predetermined temperature range.

In further features, determining an IAQ score value includes all of: decreasing the IAQ score value when the amount of particulate is greater than a predetermined amount of particulate; decreasing the IAQ score value when the amount of VOCs is greater than a predetermined amount of VOCs; decreasing the IAQ score value when the amount of carbon dioxide is greater than a predetermined amount of carbon dioxide; decreasing the IAQ score value when the RH is outside of a predetermined RH range; and decreasing the IAQ score value when the temperature is outside of a predetermined temperature range.

In further features, determining an IAQ score value includes at least one of: decreasing the IAQ score value as a first period that the amount of particulate has been greater than a predetermined amount of particulate increases; decreasing the IAQ score value as a second period that the amount of VOCs has been greater than a predetermined amount of VOCs increases; decreasing the IAQ score value as a third period that the amount of carbon dioxide has been greater than a predetermined amount of carbon dioxide increases; decreasing the IAQ score value as a fourth period that the RH has been outside of a predetermined RH range increases; and decreasing the IAQ score value as a fifth period that the temperature has been outside of a predetermined temperature range increases.

In a feature, a humidifier control system for a building is described. A humidity load module is configured to: obtain an outdoor ambient temperature at the building and an outdoor relative humidity (RH) at the building; and, at a first time, determine a predicted humidity load of a future predetermined period based on a temperature of air within the building, a RH of air within the building, the outdoor ambient temperature, the outdoor RH, a predetermined air exchange rate of the building with outdoors, and an interior volume of the building, where the future predetermined period is after the first time. A humidification module is configured to determine a predicted humidification provided by a humidifier within the building during the future predetermined period based on: a period that the humidifier was on during a previous predetermined period, wherein the previous predetermined period is before the future predetermined period; and a predetermined evaporation rate of the humidifier when the humidifier is on. A humidifier control module is configured to open a water feed valve of the humidifier in response to a determination that the predicted humidification for the future predetermined period is less than the predicted humidity load of the future predetermined period.

In further features, the humidifier control module is configured to open the water feed valve of the humidifier before the future predetermined period in response to the determination that the predicted humidification for the future predetermined period is less than the predicted humidity load of the future predetermined period.

In further features, in response to the determination that the predicted humidification for the future predetermined period is less than the predicted humidity load of the future predetermined period, the humidifier control module is configured to open the water feed valve of the humidifier before the future predetermined period when the RH of air within the building is greater than a predetermined humidification setpoint.

In further features, the humidifier control module is configured to open the water feed valve of the humidifier during the future predetermined period in response to the determination that the predicted humidification for the future predetermined period is less than the predicted humidity load of the future predetermined period.

In further features, in response to the determination that the predicted humidification for the future predetermined period is less than the predicted humidity load of the future predetermined period, the humidifier control module is configured to open the water feed valve of the humidifier during the future predetermined period when the RH of air within the building is greater than a predetermined humidification setpoint.

In further features, an indoor air quality (IAQ) module of the building includes: a temperature sensor configured to measure the temperature of air within the building; and a RH sensor configured to measure the RH of air within the building.

In further features, the humidity load module is configured to: receive predicted outdoor temperatures at predetermined times during the future predetermined period; determine the outdoor ambient temperature at the building based on an average of the predicted outdoor temperatures at the predetermined times; receive predicted outdoor RHs at the predetermined times during the future predetermined period; and determine the outdoor ambient RH at the building based on an average of the predicted outdoor RHs at the predetermined times.

In further features, the humidity load module is configured to: receive a first predicted outdoor ambient temperature at a first predetermined time during the future predetermined period; receive a second predicted outdoor ambient temperature at a second predetermined time during the future predetermined period; receive a first predicted outdoor RH at the first predetermined time during the future predetermined period; receive a second predicted outdoor RH at the second predetermined time during the future predetermined period; determine a first predicted humidity load based on the temperature of air within the building, the RH of air within the building, the first predicted outdoor ambient temperature, the first predicted outdoor RH, the predetermined air exchange rate of the building with outdoors, and the interior volume of the building; determine a second predicted humidity load based on the temperature of air within the building, the RH of air within the building, the second predicted outdoor ambient temperature, the second predicted outdoor RH, the predetermined air exchange rate of the building with outdoors, and the interior volume of the building; and set the predicted humidity load based on the first predicted humidity load plus the second predicted humidity load.

In further features, the temperature of air within the building is a setpoint temperature within the building.

In further features, the RH of air within the building is a setpoint RH within the building.

In further features, the temperature of air within the building is an average air temperature within the building over the previous predetermined period.

In further features, the RH of air within the building is an average RH of air within the building over the previous predetermined period.

In a feature, a humidifier control system for a building is described. A humidity load module is configured to: obtain an outdoor ambient temperature at the building and an outdoor relative humidity (RH) at the building; and determine a humidity load based on a temperature of air within the building, a RH of air within the building, the outdoor ambient temperature, the outdoor RH, a volume of the building, a predetermined air exchange rate of the building with outdoors, and an interior volume of the building. A humidification module is configured to determine a humidification provided by a humidifier within the building based on: a period that the humidifier was on during a previous predetermined period; and a predetermined evaporation rate of the humidifier when the humidifier is on. A humidifier control module is configured to open a water feed valve of the humidifier in response to a determination that the humidification is less than the humidity load.

In a feature, a humidifier control method includes: obtaining an outdoor ambient temperature at a building; obtaining an outdoor relative humidity (RH) at the building; at a first time, determining a predicted humidity load of a future predetermined period based on a temperature of air within the building, a RH of air within the building, the outdoor ambient temperature, the outdoor RH, a predetermined air exchange rate of the building with outdoors, and an interior volume of the building, where the future predetermined period is after the first time; determining a predicted humidification provided by a humidifier within the building during the future predetermined period based on: a period that the humidifier was on during a previous predetermined period, wherein the previous predetermined period is before the future predetermined period; and a predetermined evaporation rate of the humidifier when the humidifier is on; and opening a water feed valve of the humidifier in response to a determination that the predicted humidification for the future predetermined period is less than the predicted humidity load of the future predetermined period.

In further features, opening the water feed valve includes opening the water feed valve of the humidifier before the future predetermined period in response to the determination that the predicted humidification for the future predetermined period is less than the predicted humidity load of the future predetermined period.

In further features, opening the water feed valve includes, in response to the determination that the predicted humidification for the future predetermined period is less than the predicted humidity load of the future predetermined period, opening the water feed valve of the humidifier before the future predetermined period when the RH of air within the building is greater than a predetermined humidification setpoint.

In further features, opening the water feed valve includes opening the water feed valve of the humidifier during the future predetermined period in response to the determination that the predicted humidification for the future predetermined period is less than the predicted humidity load of the future predetermined period.

In further features, opening the water feed valve includes, in response to the determination that the predicted humidification for the future predetermined period is less than the predicted humidity load of the future predetermined period, opening the water feed valve of the humidifier during the future predetermined period when the RH of air within the building is greater than a predetermined humidification setpoint.

In further features, the humidifier control method further includes: by a temperature sensor of an indoor air quality (IAQ) sensor module of the building, measuring the temperature of air within the building; and by a RH sensor of the IAQ sensor module, measuring the RH of air within the building.

In further features, the humidifier control method further includes: receiving predicted outdoor temperatures at predetermined times during the future predetermined period; determining the outdoor ambient temperature at the building based on an average of the predicted outdoor temperatures at the predetermined times; receiving predicted outdoor RHs at the predetermined times during the future predetermined period; and determining the outdoor ambient RH at the building based on an average of the predicted outdoor RHs at the predetermined times.

In further features, the humidifier control method further includes: receiving a first predicted outdoor ambient temperature at a first predetermined time during the future predetermined period; receiving a second predicted outdoor ambient temperature at a second predetermined time during the future predetermined period; receiving a first predicted outdoor RH at the first predetermined time during the future predetermined period; receiving a second predicted outdoor RH at the second predetermined time during the future predetermined period; determining a first predicted humidity load based on the temperature of air within the building, the RH of air within the building, the first predicted outdoor ambient temperature, the first predicted outdoor RH, the predetermined air exchange rate of the building with outdoors, and the interior volume of the building; determining a second predicted humidity load based on the temperature of air within the building, the RH of air within the building, the second predicted outdoor ambient temperature, the second predicted outdoor RH, the predetermined air exchange rate of the building with outdoors, and the interior volume of the building; and setting the predicted humidity load based on the first predicted humidity load plus the second predicted humidity load.

In further features, the temperature of air within the building is a setpoint temperature within the building.

In further features, the RH of air within the building is a setpoint RH within the building.

In further features, the temperature of air within the building is an average air temperature within the building over the previous predetermined period.

In further features, the RH of air within the building is an average RH of air within the building over the previous predetermined period.

In a feature, a humidifier control method includes: obtaining an outdoor ambient temperature at a building; obtaining an outdoor relative humidity (RH) at the building; determining a humidity load based on a temperature of air within the building, a RH of air within the building, the outdoor ambient temperature, the outdoor RH, a volume of the building, a predetermined air exchange rate of the building with outdoors, and an interior volume of the building; determining a humidification provided by a humidifier within the building based on: a period that the humidifier was on during a previous predetermined period; and a predetermined evaporation rate of the humidifier when the humidifier is on; and opening a water feed valve of the humidifier in response to a determination that the humidification is less than the humidity load.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a functional block diagram of an example indoor air quality (IAQ) sensor module that can be used with an HVAC system and/or other mitigation devices;

FIG. 5A is a functional block diagram of an example remote monitoring system;

FIG. 5B is a functional block diagram of an example monitoring system;

FIGS. 10A and 10B include an example table of example sequences for activating control modes and mitigation devices for different combinations of conditions;

FIG. 12 includes an example table of compressor operation and blower speed for various humidity control modes;

In the drawings, reference numbers may be reused to identify similar and/or identical elements.

DETAILED DESCRIPTION

Figure 1:
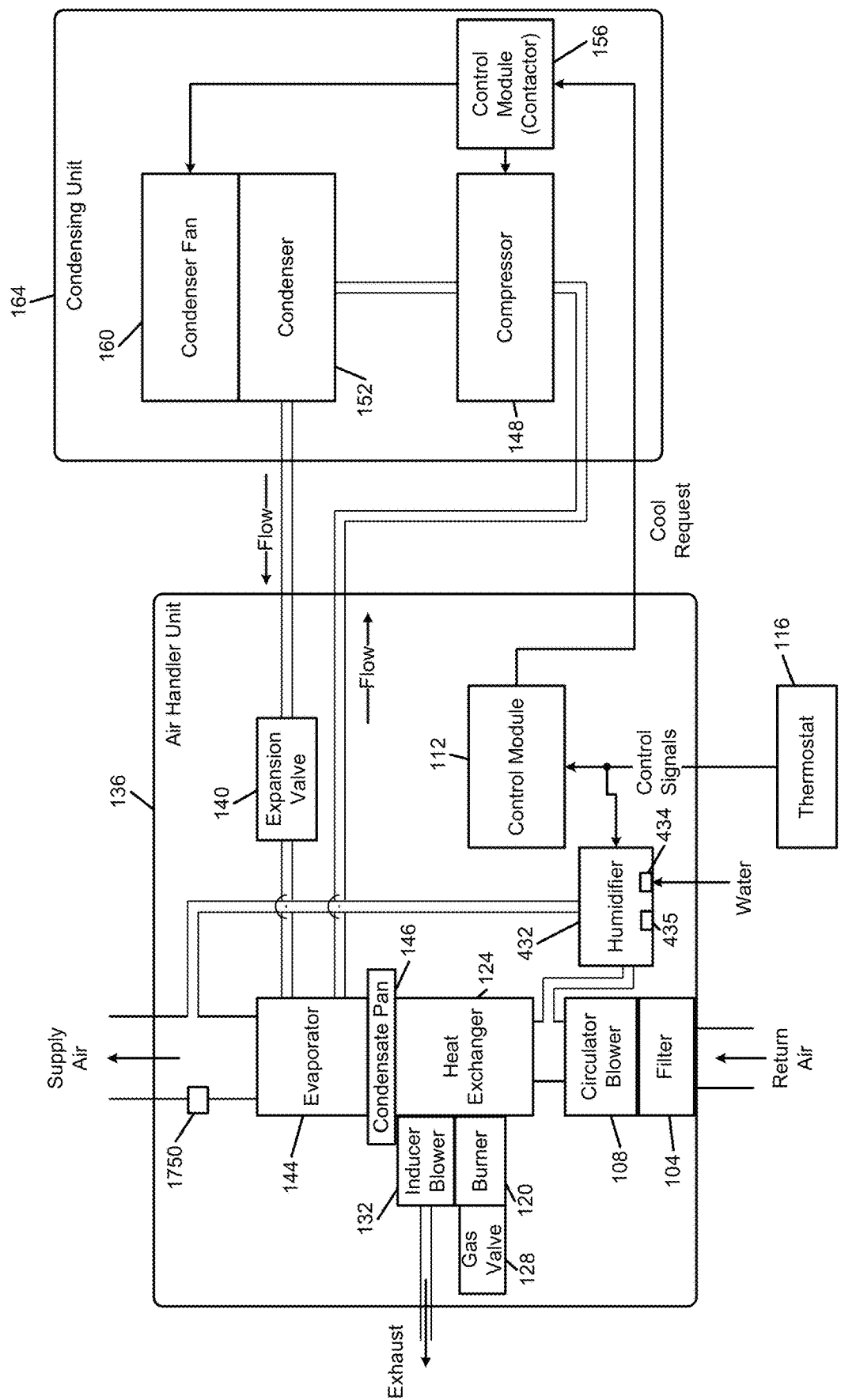
FIG. 1 is a block diagram of an example heating, ventilation, and air conditioning (HVAC) system.

According to the present disclosure, an indoor air quality (IAQ) sensor module can be used with one or more mitigation devices of a residential or light commercial HVAC (heating, ventilation, and/or air conditioning) system of a building and/or one or more other mitigation devices. The IAQ sensor module includes one, more than one, or all of a temperature sensor, a relative humidity (RH) sensor, a particulate sensor, a volatile organic compound (VOC) sensor, and a carbon dioxide ($CO_2$) sensor. The IAQ sensor module may also include one or more other IAQ sensors, such as occupancy, barometric pressure, light, sound, etc. The temperature sensor senses a temperature of air at the location of the IAQ sensor. The RH sensor measures a RH of air at the location of the IAQ sensor. The particulate sensor measures an amount (e.g., concentration) of particulate greater than a predetermined size in the air at the location of the IAQ sensor. The VOC sensor measures an amount of VOCs in the air at the location of the IAQ sensor. The carbon dioxide sensor measures an amount of carbon dioxide in the air at the location of the IAQ sensor. Other IAQ sensors would measure an amount of a substance or condition in the air at the location of the IAQ sensor.

Higher humidity in a building may increase the level of other IAQ parameters such as particulate matter (PM), VOCs, and carbon dioxide within the building. Operating an indoor fan air flow for circulation and ventilation to improve the above IAQ parameters may also increase humidity. There is a need for better control of the humidity range by combining dehumidification and humidification functions. An ideal range of humidity for IAQ may be between 40% and 50%.

The IAQ sensor module is wirelessly connected to a thermostat of the HVAC system, such as via a Bluetooth or WiFi. The IAQ sensor module may additionally or alternatively be wirelessly connected to a control module. The IAQ sensor module communicates measurements from its sensors, and optionally, a time and date to the thermostat and/or the control module. The control module and/or the thermostat controls operation of the mitigation devices based on the measurements from the IAQ sensor module. For example, the control module and/or the thermostat controls operation of the mitigation devices based on maintaining a temperature measured by the IAQ sensor module within a upper and lower temperature limits, based on maintaining a RH measured by the IAQ sensor within upper and lower RH limits, based on maintaining the amount of particulate in the air at the IAQ sensor module below a predetermined amount of particulate, based on maintaining the amount of VOCs in the air at the IAQ sensor module below a predetermined amount of VOCs, and/or based on maintaining the amount of carbon dioxide in the air at the IAQ sensor module below a predetermined amount of carbon dioxide.

The control module and/or the thermostat can provide information on the measurements of the IAQ sensor and other data (e.g., statuses of mitigation devices, local outdoor air conditions, etc.) to one or more user devices (e.g., of tenants, occupants, customers, contractors, etc.) associated with the building. For example, the building may be a single-family residence, and the customer may be the homeowner, a landlord, or a tenant. In other implementations, the building may be a light commercial building, and the customer may be the building owner, a tenant, or a property management company.

A humidifier control module controls operation of a humidifier of a building during heating to maintain RH within the building within a predetermined RH range and maintain other IAQ parameters less than respective predetermined values or within respective predetermined ranges. To this end, an IAQ score module determines an IAQ score of the air within the building based on the IAQ parameters. The IAQ score module may decrease the IAQ score when one or more of the IAQ parameters are outside of the respective predetermined ranges or greater than the respective predetermined values, and vice versa. After turning on the humidifier, the humidifier control module may maintain the humidifier on until the IAQ score stops improving (e.g., increasing) or until heating is discontinued (e.g., due to air temperature within the building becoming greater than a predetermined value).

The humidifier control module may additionally or alternatively predictively control operation of the humidifier based on a predicted humidity load of the building over a predetermined period in the future. The predicted humidity load corresponds to the amount of water to be added to the air within the building during the predetermined period to reach an RH setpoint. A humidification module may determine a predicted humidification of the building that may be provided by the humidifier over the predetermined period in the future based on how long the humidifier was on during a predetermined period prior to the future predetermined period and a predetermined evaporation rate of the humidifier.

When the predicted humidification is less than the predicted humidity load, the humidifier control module may turn the humidifier on more frequently and/or for a longer period before and/or during the future predetermined period. This may at least to some extent offset the predicted humidity load over the future predetermined period and prevent low RH situations from occurring before and during the future predetermined period. When the predicted humidification is greater than the predicted humidity load, the humidifier control module may maintain the humidifier off more frequently and/or for a longer period before and/or during the future predetermined period. This may at least to some extent offset the predicted humidity load over the future predetermined period and prevent high RH situations from occurring before and during the future predetermined period.

As used in this application, the term HVAC can encompass all environmental comfort systems in a building, including heating, cooling, humidifying, dehumidifying, and air exchanging and purifying, and covers devices such as furnaces, heat pumps, humidifiers, dehumidifiers, ventilators, and air conditioners. HVAC systems as described in this application do not necessarily include both heating and air conditioning, and may instead have only one or the other.

In split HVAC systems, an air handler unit is often located indoors, and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—i.e., refrigerant evaporation occurs in what is labeled the condenser while refrigerant condensation occurs in what is labeled as the evaporator.

The control module and/or the thermostat upload data to a remote location. The remote location may be accessible via any suitable network, including the Internet. The remote location includes one or more computers, which will be referred to as servers. The servers execute a monitoring system on behalf of a monitoring company. Additionally or alternatively, a user computing device may serve as the monitoring system. The monitoring system receives and processes the data from the controller and/or thermostat of customers who have such systems installed. The monitoring system can provide performance information, diagnostic alerts, and error messages to one or more users associated with the building and/or third parties, such as designated HVAC contractors.

A server of the monitoring system includes a processor and memory. The memory stores application code that processes data received from the controller and/or the thermostat. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from multiple buildings. A load balancing algorithm may be used between the servers to distribute processing and storage. The present application is not limited to servers that are owned, maintained, and housed by a monitoring company. Although the present disclosure describes diagnostics and processing and alerting occurring in a remote monitoring system, some or all of these functions may be performed locally using installed equipment and/or customer resources, such as on a customer computer or computers.

Customers and/or HVAC contractors may be notified of current and predicted issues (e.g., dirty filter) affecting effectiveness or efficiency of the HVAC system and/or the mitigating devices, and may receive notifications related to routine maintenance. The methods of notification may take the form of push or pull updates to an application, which may be executed on a smart phone, tablet, another type of mobile device, or on a computer (e.g., laptop or desktop). Notifications may also be viewed using web applications or on local displays, such as on the thermostat and/or other displays located throughout the building. Notifications may also include text messages, emails, social networking messages, voicemails, phone calls, etc.

Based on measurements from the control module, the thermostat, and/or the IAQ sensor module, the monitoring company can determine whether various components are operating at their peak performance. The monitoring company can advise the customer and a contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. A contractor can also be notified that a service call may be required. Depending on the contractual relationship between the customer and the contractor, the contractor may schedule a service call to the building.

The monitoring system may provide specific information to a contractor, such as identifying information of the customer's components, including make and model numbers, as well as indications of the specific part numbers of components. Based on this information, the contractor can allocate the correct repair personnel that have experience with the specific components and/or the system. In addition, a service technician is able to bring replacement parts, avoiding return trips after diagnosis.

Depending on the severity of the failure, the customer and/or contractor may be advised of relevant factors in determining whether to repair or replace some or all of the components. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure of components. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of a component. For example, failure of heating components of the HVAC system in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment and/or applying surcharges to repairs and service visits.

The monitoring service allows the customer to remotely monitor real-time data within the building, outside of the building, and/or control components of the system, such as setting temperature and RH setpoints and other IAQ setpoints, enabling or disabling heating, cooling, ventilation, air purification, etc. In addition, the customer may be able to track usage data for components of the system and/or historical data.

In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive web site.

In FIG. 1, a block diagram of an example HVAC system is presented. In this particular example, a forced air system with a gas furnace is shown. Return air is pulled from the building through a filter 104 by a circulator blower 108. The circulator blower 108, also referred to as a fan, is controlled by a control module 112. The control module 112 receives signals from a thermostat 116. For example only, the thermostat 116 may include one or more temperature set points specified by the user.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may switch one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a high enough temperature that, when gas is introduced, the heated surface initiates combustion of the gas. Fuel for combustion, such as natural gas, may be provided by a gas valve 128.

The products of combustion are exhausted outside of the building, and an inducer blower 132 may be turned on prior to ignition of the burner 120. In a high efficiency furnace, the products of combustion may not be hot enough to have sufficient buoyancy to exhaust via conduction. Therefore, the inducer blower 132 creates a draft to exhaust the products of combustion. The inducer blower 132 may remain running while the burner 120 is operating. In addition, the inducer blower 132 may continue running for a set period of time after the burner 120 turns off.

A single enclosure, which will be referred to as an air handler unit 136, may include the filter 104, the circulator blower 108, the control module 112, the burner 120, the heat exchanger 124, the inducer blower 132, an expansion valve 140, an evaporator 144, and a condensate pan 146. In various implementations, the air handler unit 136 includes an electrical heating device (not shown) instead of or in addition to the burner 120. When used in addition to the burner 120, the electrical heating device may provide backup or secondary (extra) heat to the burner 120.

In FIG. 1, the HVAC system includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (e.g., below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in a single condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for cooling. The compressor 148 may vary its capacity according to the cool request.

The electrical lines provided to the condensing unit 164 may include a 240 volt mains power line (not shown) and a 24 volt switched control line. The 24 volt control line may correspond to the cool request shown in FIG. 1. The 24 volt control line controls operation of the contactor. When the control line indicates that the compressor should be on, the contactor contacts close, connecting the 240 volt power supply to the compressor 148. In addition, the contactor may connect the 240 volt power supply to the condenser fan 160. In various implementations, such as when the condensing unit 164 is located in the ground as part of a geothermal system, the condenser fan 160 may be omitted. When the 240 volt mains power supply arrives in two legs, as is common in the U.S., the contactor may have two sets of contacts, and can be referred to as a double-pole single-throw switch.

Typically, the thermostat 116 includes a temperature sensor and a relative humidity (RH) sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set to a setpoint temperature+ and − a predetermined amount (e.g., 1, 2, 3, 4, 5 degrees Fahrenheit), respectively. The setpoint temperature may be set to a predetermined temperature by default and may be adjusted by a user.

Figure 2A:
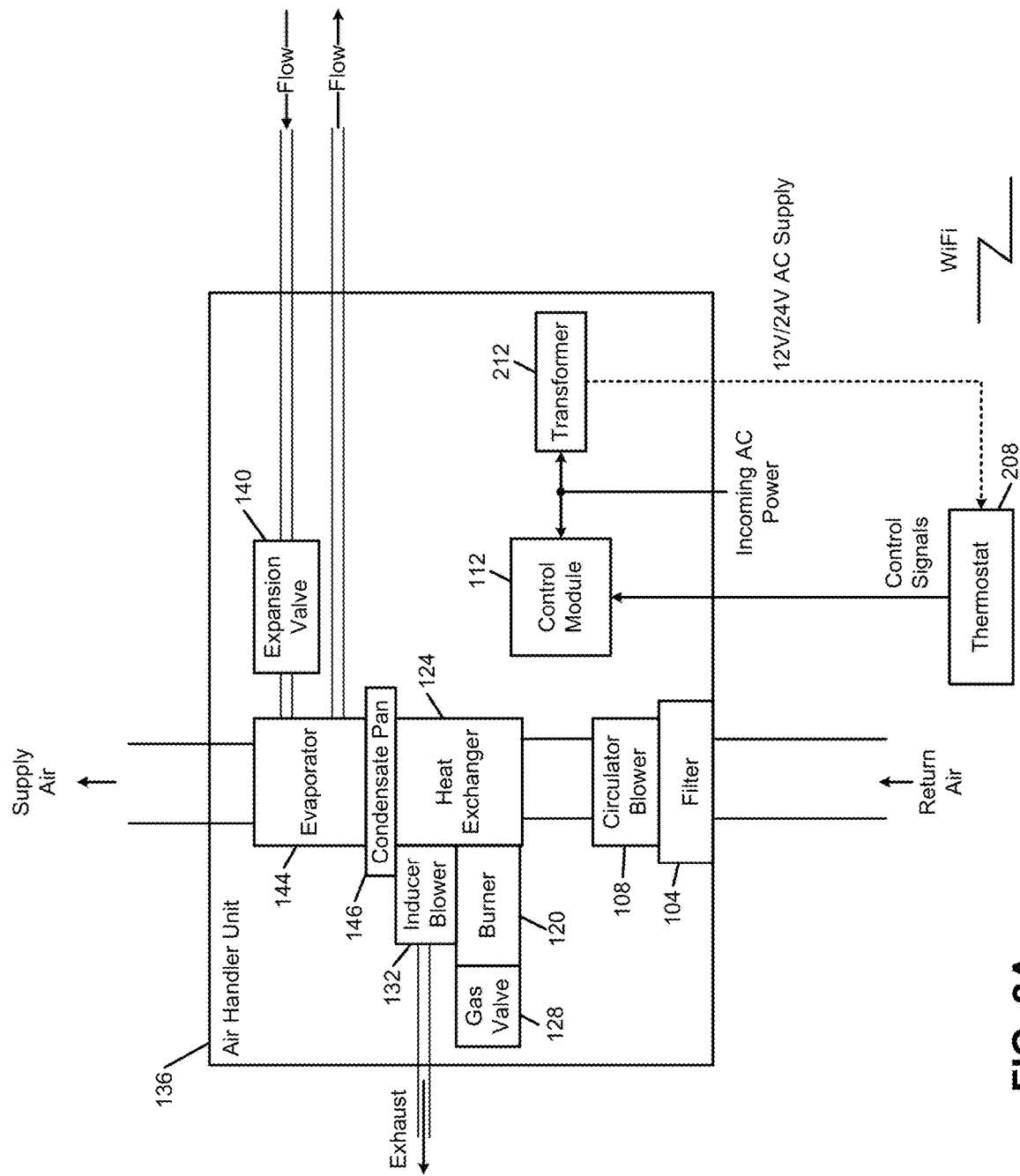
FIG. 2A is a functional block diagram of an air handler unit of an example HVAC system.
Figure 2B:
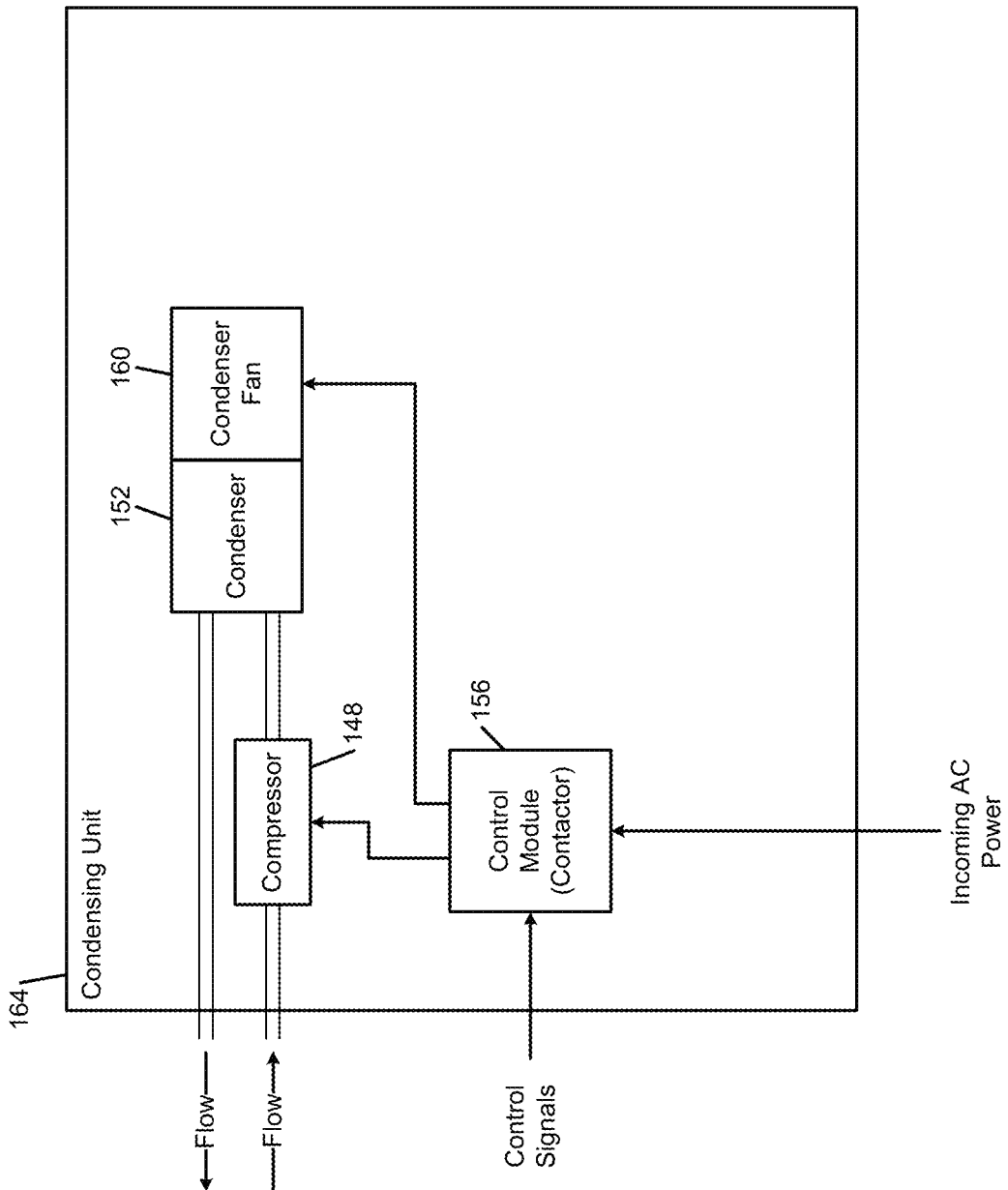
FIGS. 2B and 2C are functional block diagrams of example condenser units of example HVAC systems.

FIGS. 2A-2B are functional block diagrams of an example monitoring system associated with an HVAC system of a building. The air handler unit 136 of FIG. 1 is shown for reference. The thermostat 116 of FIG. 1 is a WiFi thermostat 208 having networking capability.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In FIG. 2A, a transformer 212 can be connected to an AC line in order to provide AC power to the control module 112 and the thermostat 208. For example, the transformer 212 may be a 10-to-1 transformer and therefore provide either a 12V or 24V AC supply depending on whether the air handler unit 136 is operating on nominal 120 volt or nominal 240 volt power.

The control module 112 controls operation in response to signals from the thermostat 208 received over control lines. The control lines may include a call for cool (cool request), a call for heat (heat request), and a call for fan (fan request). The control lines may include a line corresponding to a state of a reversing valve in heat pump systems.

The control lines may further carry calls for secondary heat and/or secondary cooling, which may be activated when the primary heating or primary cooling is insufficient. In dual fuel systems, such as systems operating from either electricity or natural gas, control signals related to the selection of the fuel may be monitored. Further, additional status and error signals may be monitored, such as a defrost status signal, which may be asserted when the compressor is shut off and a defrost heater operates to melt frost from an evaporator.

Figure 2C:
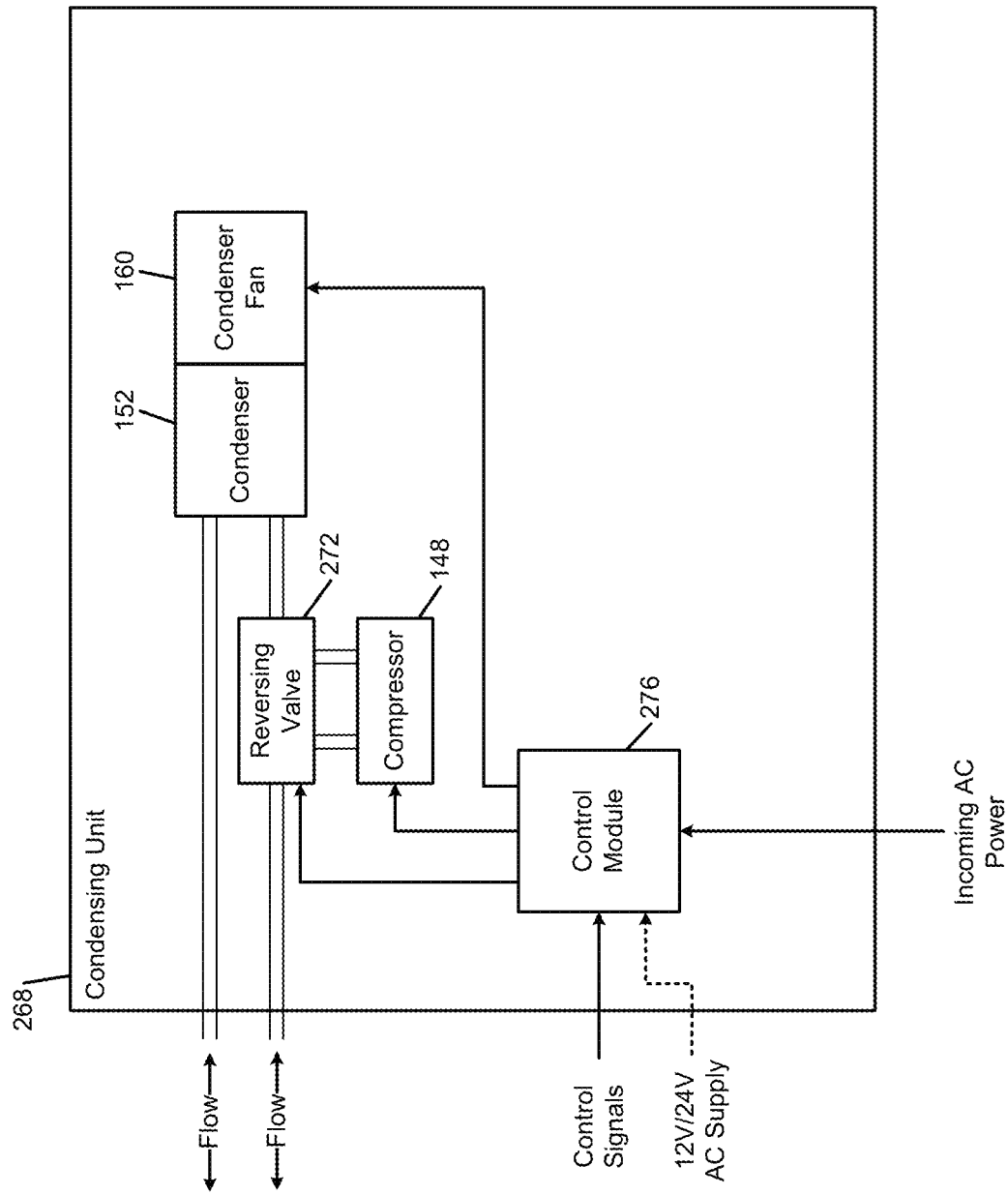

One or more of these control signals (on the control lines) is also transmitted to the condensing unit 164 (shown in FIGS. 2B and 2C). In various implementations, the condensing unit 164 may include an ambient temperature sensor that generates temperature data. When the condensing unit 164 is located outdoors, the ambient temperature represents an outside (or outdoor) ambient temperature. The temperature sensor supplying the ambient temperature may be located outside of an enclosure of the condensing unit 164. Alternatively, the temperature sensor may be located within the enclosure, but exposed to circulating air. In various implementations the temperature sensor may be shielded from direct sunlight and may be exposed to an air cavity that is not directly heated by sunlight. Alternatively or additionally, online (including Internet-based) weather data based on the geographical location of the building may be used to determine sun load, outside ambient air temperature, relative humidity, particulate, VOCs, carbon dioxide, etc.

In FIG. 2C, an example condensing unit 268 is shown for a heat pump implementation. The condensing unit 268 may be configured similarly to the condensing unit 164 of FIG. 2B. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power, for example, from the transformer 212 of the air handler unit 136 or via the incoming AC power line.

FIG. 3 includes a functional block diagram of an example indoor air quality (IAQ) sensor module 304 that can be used with an HVAC system and/or one or more other mitigation devices. The IAQ sensor module 304 includes one, more than one, or all of: a temperature sensor 308, a relative humidity (RH) sensor 312, a particulate sensor 316, a volatile organic compounds (VOC) sensor 320, and a carbon dioxide sensor 324. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 volt or nominal 240 volt AC power. The power supply 336 may include an AC to direct current (DC) converter that converts the AC power into DC power, such as 5 volt, 12 volt, or 24 volt DC power. The power supply 336 supplies power to the components of the IAQ sensor module 304 including the sensors, the sampling module 328, and the transceiver module 332. While the example of the power supply 336 being integrated within the IAQ sensor module 304 is provided, the power supply 336 may be integrated with the plug 344 in various implementations. Also, while the example of the power supply 336 providing one DC voltage to the components of the IAQ sensor module 304, the power supply 336 may provide two or more different DC voltages to different components of the IAQ sensor module 304.

Additionally or alternatively, the power supply 336 may include one or more batteries or one or more solar cells that supply power to the components of the IAQ sensor module 304. The one or more batteries may be replaceable or non-replaceable. In the example of the one or more batteries being non-replaceable, the one or more batteries may be re-chargeable, such as via a standard wall outlet. In this example, the IAQ sensor module 304 may include a charger that charges the one or more batteries using power supplied, for example, via a standard wall outlet.

The IAQ sensor module 304 is portable and can be moved into different rooms of a building. The IAQ sensor module 304 could also be placed outside the building, for example, to measure one or more conditions outside of the building, calibration, or for one or more other reasons. The temperature sensor 308 measures a temperature of air at the IAQ sensor module 304. The RH sensor 312 measures a relative humidity of air at the IAQ sensor module 304. The particulate sensor 316 measures an amount (e.g., a mass flow rate, such as micrograms ($\mu g$) per cubic meter) of particulate in air at the IAQ sensor module 304 having a diameter that is less than a predetermined size (e.g., 2.5 or 10 micrometers ($\mu m$)). The VOC sensor 320 measures an amount (e.g., parts per billion (ppb)) of VOC in air at the IAQ sensor module 304. The carbon dioxide sensor 324 measures an amount (e.g., ppm) of carbon dioxide in air at the IAQ sensor module 304. The included ones of the temperature sensor 308, the RH sensor 312, the particulate sensor 316, the VOC sensor 320, and the carbon dioxide sensor 324 will be referred to collectively as the IAQ sensors.

The sampling module 328 samples (analog) measurements of the IAQ sensors. The sampling module 328 may also digitize and/or store values of the measurements of the IAQ sensors. In various implementations, the IAQ sensors may be digital sensors and output digital values corresponding to the respective measured parameters. In such implementations, the sampling module 328 may perform storage or may be omitted.

The IAQ sensor module 304 may include one or more expansion ports to allow for connection of additional sensors and/or to allow connection to other devices. Examples of other devices include one or more other IAQ sensor modules, one or more other types of the IAQ sensors not included in the IAQ sensor module 304, a home security system, a proprietary handheld device for use by contractors, a mobile computing device, and other types of devices.

The transceiver module 332 transmits frames of data corresponding to predetermined periods of time. Each frame of data may include the measurements of the IAQ sensors over a predetermined period. One or more calculations may be performed for the data of each frame of data, such as averaging the measurements of one or more of the IAQ sensors. Each frame (including the calculations and/or the measurements) may be transmitted to a monitoring system, as discussed further below. The measurements of the IAQ sensors may be sampled at a predetermined rate, such as 10 samples per minute or another suitable rate. Each frame may correspond to a predetermined number of sets of samples (e.g., 10). The monitoring system may provide visual representations of the measurements over predetermined periods of time along with other data, as discussed further below.

The transceiver module 332 transmits each frame (including the calculations and/or the measurements) to an IAQ control module 404 and/or the thermostat 208. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, WiFi (IEEE 802.11). The IAQ sensor module 304 may communicate directly with the IAQ control module 404 and/or the thermostat 208 or with a separate computing device, such as a smartphone, tablet, or another type of computing device. In various implementations, a gateway 408 is implemented, which creates a wireless network for the IAQ sensor module 304, the IAQ control module 404, and the thermostat 208. The gateway 408 may also interface with a customer router 412 using a wired or wireless protocol, such as Ethernet (IEEE 802.3).

Figure 4A:
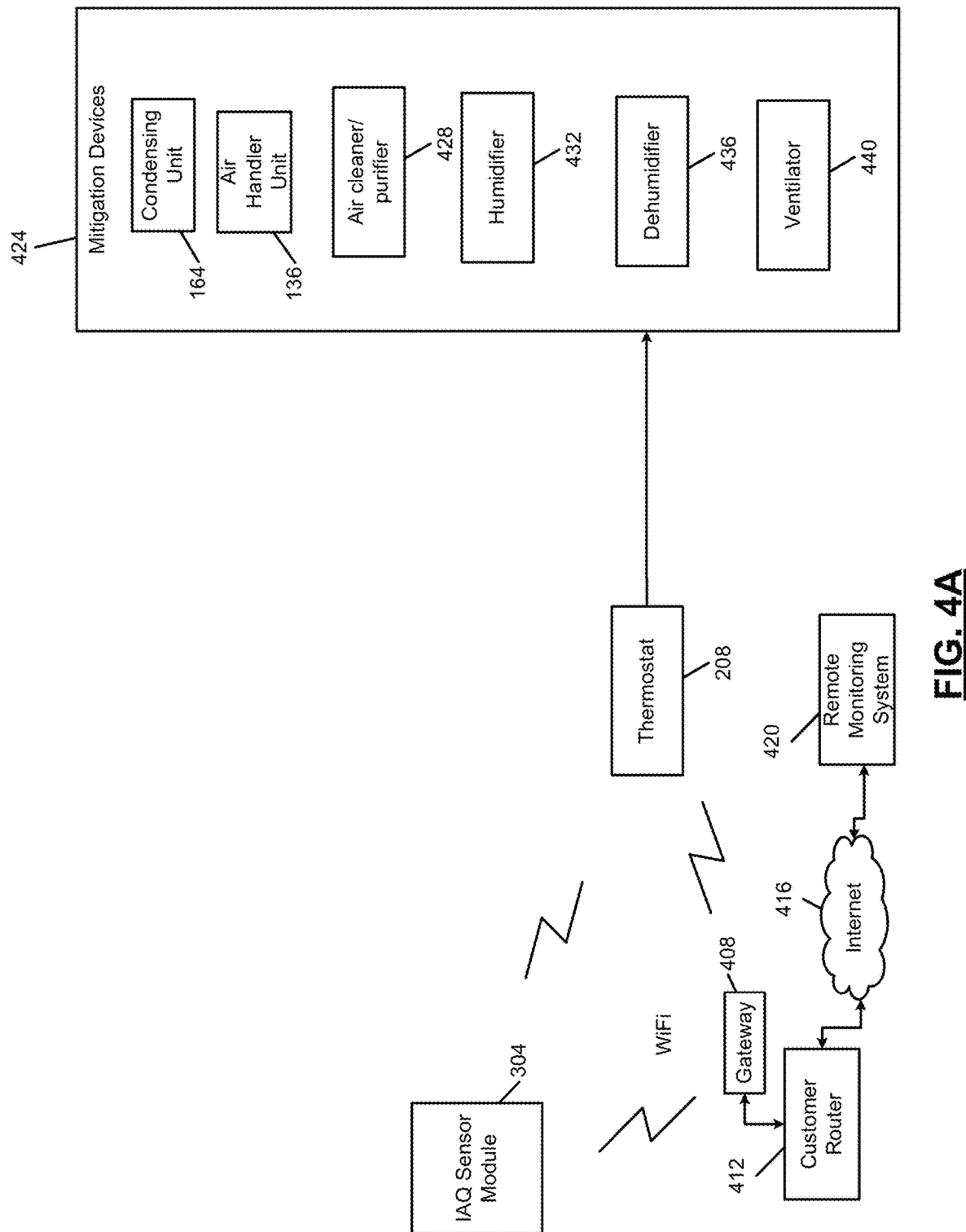
FIGS. 4A-4C are a functional block diagram of an example IAQ control system.
Figure 4B:
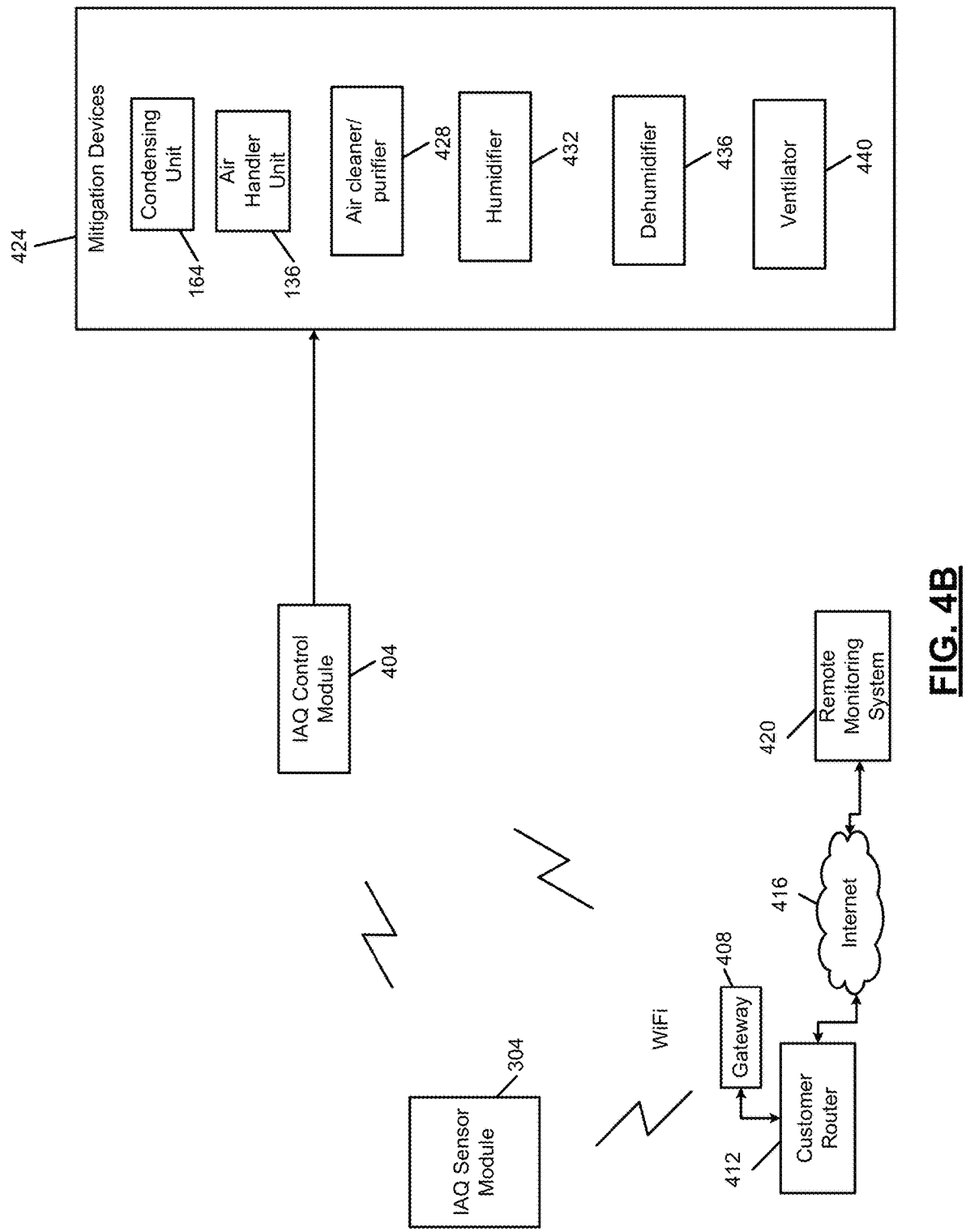
Figure 4C:
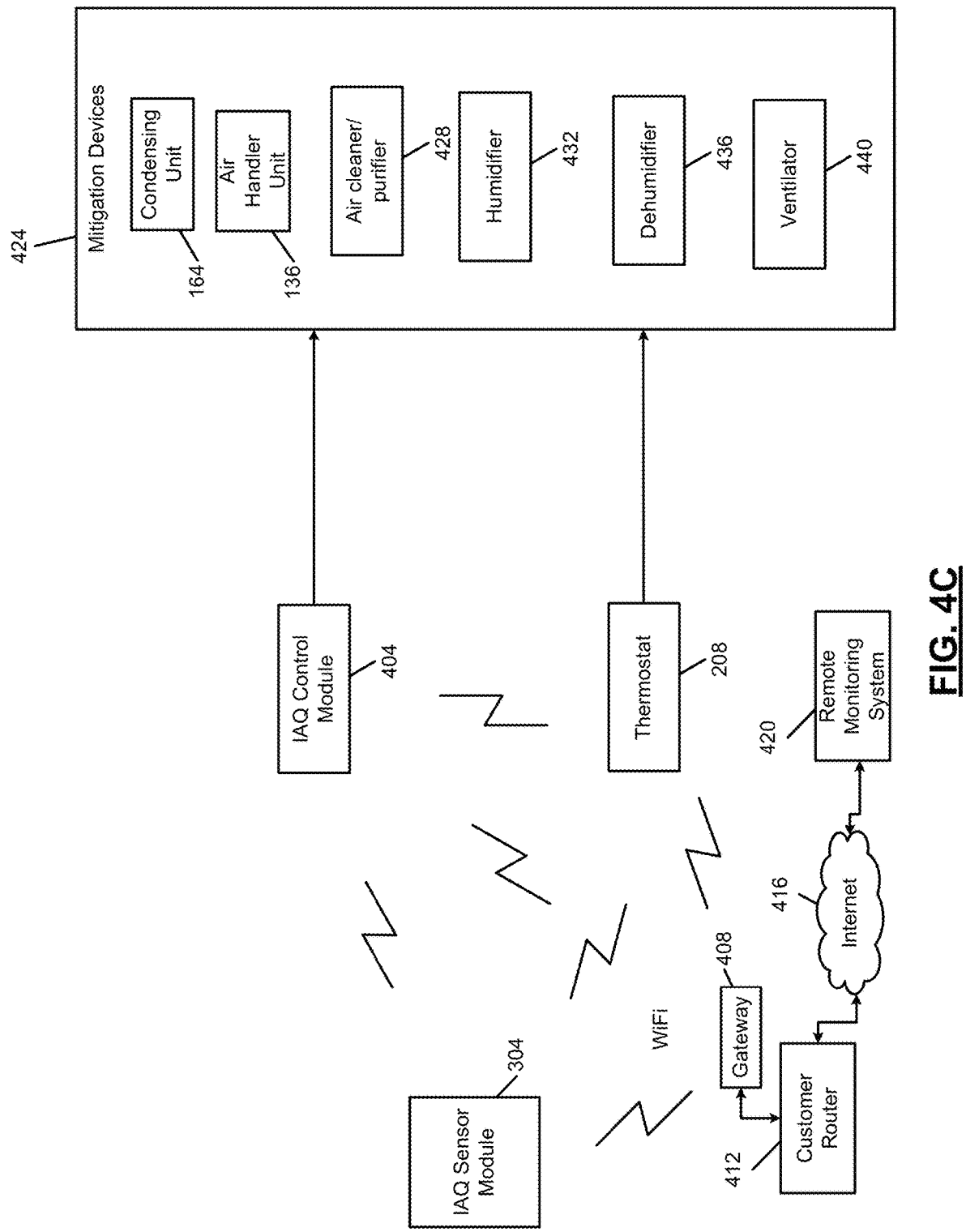

Referring now to FIGS. 4A-4C, functional block diagrams of example IAQ control systems are presented. The IAQ control module 404 may communicate with the customer router 412 using WiFi. Alternatively, the IAQ control module 404 may communicate with the customer router 412 via the gateway 408. The thermostat 208 may also communicate with the customer router 412 using WiFi or via the gateway 408. In various implementations, the IAQ control module 404 and the thermostat 208 may communicate directly or via the gateway 408.

The IAQ sensor module 304, the IAQ control module 404, and/or the thermostat 208 transmits data measured by the IAQ sensor module 304 and parameters of the IAQ control module 404 and/or the thermostat 208 over a wide area network 416, such as the Internet (referred to as the Internet 416). The IAQ sensor module 304, the IAQ control module 404, and/or the thermostat 208 may access the Internet 416 using the customer router 412 of the customer. The customer router 412 may already be present to provide Internet access to other devices (not shown) within the building, such as a customer computer and/or various other devices having Internet connectivity, such as a DVR (digital video recorder) or a video gaming system.

The IAQ sensor module 304, the IAQ control module 404, and/or the thermostat 208 transmit the data to a remote monitoring system 420 via the Internet 416 using the customer router 412. Further discussion of the remote monitoring system 420 is provided below.

The IAQ control module 404 and/or the thermostat 208 control operation (e.g., on, off, speed, etc.) of mitigation devices 424 based on the measurements from the IAQ sensor module 304. For example, the measurements of the IAQ sensor module 304 may be provided to the thermostat 208 and the thermostat 208 may control operation of the mitigation devices 424 in various implementations (e.g., FIG. 4A). The IAQ control module 404 can be omitted in such implementations. While the example of the thermostat 208 controlling the mitigation devices 424 will be discussed, alternatively the IAQ control module 404 may control operation of the mitigation devices 424 (e.g., FIG. 4B), or the thermostat 208 and the IAQ control module 404 may together control the mitigation devices 424 (e.g., FIG. 4C).

The IAQ control module 404 and/or thermostat 208 control and communicate with the mitigation devices 424 wirelessly, by wire, using a combination of wireless and wired connections. In the case of wireless control and communication, the IAQ control module 404, the thermostat 208, and the mitigation devices 424 include respective transceivers.

The mitigation devices 424 include: (i) the condensing unit 164, (ii) the air handler unit 136 (e.g., the circulator blower 108), (iii) an air cleaner/purifier 428, (iv) a humidifier 432, (v) a dehumidifier 436, and (vi) a ventilator 440. The air cleaner/purifier 428 may be separate from the air handler unit 136 (e.g., a standalone air cleaner/purifier). In various implementations, the air handler unit 136 may serve as the air cleaner/purifier 428. The air cleaner/purifier 428 draws in air and forces the air through a filter before expelling filtered air to the building. The filter may be rated (e.g., minimum efficiency reporting value, MERV) to remove a predetermined amount (e.g., 95%) of particulate of the size measured by the particulate sensor 316. Operation of the air cleaner/purifier 428 may include whether the air cleaner/purifier 428 is on or off and, when on, a speed of the air cleaner/purifier 428. The air cleaner/purifier 428 may have a single speed or multiple discrete speeds.

Operation of the air cleaner/purifier 428 may be controlled via wire or wirelessly by the thermostat 208. Examples of wireless communication and control include, but are not limited to, Bluetooth connections and WiFi connections. For example only, the thermostat 208 may wirelessly control whether the air cleaner/purifier 428 is on or off and, if on, the speed of the air cleaner/purifier 428. As one example, the thermostat 208 may turn the air cleaner/purifier 428 on when the amount of particulate measured by the particulate sensor 316 is greater than a first predetermined amount of particulate. The thermostat 208 may leave the air cleaner/purifier 428 on until the amount of particulate measured by the particulate sensor 316 is less than a second predetermined amount of particulate that is less than the first predetermined amount of particulate. The thermostat 208 may turn the air cleaner/purifier 428 off when the amount of particulate measured by the particulate sensor 316 is less than the second predetermined amount of particulate. In various implementations, the thermostat 208 may vary the speed of the air cleaner/purifier 428 based on the amount of particulate measured by the particulate sensor 316. For example, the thermostat 208 may increase the speed of the air cleaner/purifier 428 as the amount of particulate increases and vice versa.

The humidifier 432 humidifies air within the building. The humidifier 432 may be included with the air handler unit 136 or a standalone humidifier. For example, when included with the air handler unit 136, the humidifier 432 may add moisture to the supply air before the supply air is output from vents to the building. The humidifier 432 may add moisture to air, for example, by supplying water to a medium (e.g., a pad) and forcing air (e.g., supply air) through the hydrated medium. Alternatively, the humidifier 432 may spray water in the form of mist into air (e.g., supply air). In the example of a standalone humidifier, the humidifier 432 may spray water in the form of mist into air. Examples of humidifiers include drum type humidifiers (drained and drainless), evaporative pad humidifiers, and powered flow humidifiers, etc.

FIG. 1 includes an example implementation of the humidifier 432 with the air handler unit 136, although other configurations are possible. The thermostat 208 controls water flow to the humidifier 432 (via opening of a water feed valve 434, such as a solenoid valve) from a water system of the building. Standalone humidifiers 432 also include a water feed valve. For standalone humidifiers, the water feed valve 434 may control water flow from a water tank or reservoir. Some humidifiers also include a humidifier blower 435 that increases airflow to through the humidifier 432 (e.g., through an evaporative pad) to help facilitate humidification.

Operation of the humidifier 432 may include whether the humidifier 432 is on (the water feed valve 434 is open) or off (the water feed valve 434 is closed). In various implementations, operation of the humidifier 432 may also include a humidification rate (e.g., an amount of water supplied to the pad or into the air as mist or opening of the water feed valve 434). The humidifier 432 may be configured to provide only a single humidification rate or may be configured to provide multiple different humidification rates.

Operation of the humidifier 432 may be controlled via wire or wirelessly by the thermostat 208. For example only, the thermostat 208 may control (by wire) whether the humidifier 432 included with the air handler unit 136 is on or off. As another example, if the humidifier 432 is implemented separately from the air handler unit 136, the thermostat 208 may wirelessly control whether the humidifier 432 is on or off and a humidification rate when on. Examples of wireless communication include, but are not limited to, Bluetooth connections and WiFi connections. For example only, the thermostat 208 may turn the humidifier 432 on when the RH measured by the RH sensor 312 is less than a humidification RH setpoint. The thermostat 208 may leave the humidifier 432 on until the RH measured by the RH sensor 312 is greater than a second RH setpoint that is greater than the first RH setpoint. The thermostat 208 may turn the humidifier 432 off when the RH measured by the RH sensor 312 is greater than the second RH setpoint. Control of operation of the humidifier 432 is discussed further below. While the humidifier is shown in the example of FIG. 1, the humidifier 432 could also be implemented with the example of FIG. 2A. As discussed above, the humidifier 432 may alternatively be a standalone humidifier.

The dehumidifier 436 dehumidifies (i.e., removes humidity from) air within the building. The dehumidifier 436 may be included with the air handler unit 136 or a standalone dehumidifier. For example, the dehumidifier 436 may draw moisture from the supply air (or add dry air to the supply air) before the supply air is output from vents to the building. Operation of the dehumidifier 436 may include whether the dehumidifier 436 is on or off.

Operation of the dehumidifier 436 may be controlled via wire or wirelessly by the thermostat 208. For example only, the thermostat 208 may control (by wire) whether the dehumidifier 436 included with the air handler unit 136 is on or off. As another example, the thermostat 208 may wirelessly control whether the dehumidifier 436, implemented as a standalone device, is on or off. For example only, the thermostat 208 may turn the dehumidifier 436 on when the RH measured by the RH sensor 312 is greater than a first dehumidification RH setpoint. The first dehumidification RH setpoint may be the same as the second RH setpoint or different than (e.g., greater than) the second RH setpoint. The thermostat 208 may leave the dehumidifier 436 on until the RH measured by the RH sensor 312 is less than a second dehumidification RH setpoint that is less than the first dehumidification RH setpoint. The thermostat 208 may turn the dehumidifier 436 off when the RH measured by the RH sensor 312 is less than the second dehumidification RH setpoint. The second dehumidification RH setpoint may be the same as the first RH setpoint or different than (e.g., greater than) the first RH setpoint.

The ventilator 440 vents air from within the building out of the building. This also passively draws air from outside of the building into the building. The ventilator 440 may be included with the air handler unit 136 (e.g., the inducer blower 132) or a standalone ventilator. Examples of standalone ventilators include blowers that blow air from within the building out of the building (e.g., range hoods fans, bathroom fans, the inducer blower, etc.). Operation of the ventilator 440 may include whether the ventilator 440 is on or off and, when on, a speed. The ventilator 440 may be configured to operate at a single speed or at multiple different speeds.

Operation of the ventilator 440 may be controlled via wire or wirelessly by the thermostat 208. For example only, the thermostat 208 may wirelessly control whether the ventilator 440 is on or off and, if on, the speed of the ventilator 440. As one example, the thermostat 208 may turn the ventilator 440 on when the amount of VOCs measured by the VOC sensor 320 is greater than a first predetermined amount of VOCs. The thermostat 208 may leave the ventilator 440 on until the amount of VOCs measured by the VOC sensor 320 is less than a second predetermined amount of VOCs that is less than the first predetermined amount of VOCs. The thermostat 208 may turn the ventilator 440 off when the amount of VOCs measured by the VOC sensor 320 is less than the second predetermined amount of VOCs.

As another example, the thermostat 208 may turn the ventilator 440 on when the amount of carbon dioxide measured by the carbon dioxide sensor 324 is greater than a first predetermined amount of carbon dioxide. The thermostat 208 may leave the ventilator 440 on until the amount of carbon dioxide measured by the carbon dioxide sensor 324 is less than a second predetermined amount of carbon dioxide that is less than the first predetermined amount of carbon dioxide. The thermostat 208 may turn the ventilator 440 off when the amount of carbon dioxide measured by the carbon dioxide sensor 324 is less than the second predetermined amount of carbon dioxide.

The mitigation devices described above are only described as example. One or more of the example mitigation devices may be omitted. One or more other types of mitigation devices may be included. Additionally, while the example of only one of each type of mitigation device is provided, two or more of a given type of mitigation device may be included and controlled.

Changes in temperature and/or humidity also cause changes in particulate, VOCs, and/or carbon dioxide. For example, a change in temperature may cause a change in VOCs, RH, particulate, and/or carbon dioxide. As another example, a change in RH may cause a change in particulate, VOCs, and/or carbon dioxide. For example, particulate may increase as RH increases and vice versa.

The thermostat 208 therefore controls operation of the mitigation devices 424 based on one, more than one, or all of the parameters measured by the IAQ sensor module 304 in an attempt to: adjust the temperature within a predetermined temperature range, adjust the RH within a predetermined RH range, adjust the amount of particulate (if measured) to less than a predetermined amount of particulate, adjust the amount of VOCs (if measured) to less than a predetermined amount of VOCs, and to adjust the amount of carbon dioxide (if measured) to less than a predetermined amount of carbon dioxide.

FIG. 5A includes a functional block diagram of an example monitoring system. In FIG. 5A, the IAQ control module 404 and/or the thermostat 208 are shown transmitting, using the customer router 412, data to the remote monitoring system 420 via the Internet 416. In other implementations, the IAQ control module 404 and/or the thermostat 208 may transmit the data to an external wireless receiver. The external wireless receiver may be a proprietary receiver for a neighborhood in which the building is located, or may be an infrastructure receiver, such as a metropolitan area network (such as WiMAX), a WiFi access point, or a mobile phone base station.

The remote monitoring system 420 includes a monitoring server 508 that receives data from the IAQ control module 404 and/or the thermostat 208 and maintains and verifies network continuity with the IAQ control module 404 and/or the thermostat 208. The monitoring server 508 executes various algorithms to store setpoints for the building and to store measurements from the thermostat 208 and/or the IAQ sensor module 304 taken over time.

The monitoring server 508 may notify a review server 512 when one or more predetermined conditions are satisfied. This programmatic assessment may be referred to as an advisory. Some or all advisories may be triaged by a technician to reduce false positives and potentially supplement or modify data corresponding to the advisory. For example, a technician device 516 operated by a technician may be used to review the advisory and to monitor data (in various implementations, in real-time) from the IAQ control module 404 and/or the thermostat 208 via the monitoring server 508.

A technician using the technician device 516 may review the advisory. If the technician determines that a problem or fault is either already present or impending, the technician instructs the review server 512 to send an alert to a customer device 524 that is associated with the building. The technician may be determine that, although a problem or fault is present, the cause is more likely to be something different than specified by the automated advisory. The technician can therefore issue a different alert or modify the advisory before issuing an alert based on the advisory. The technician may also annotate the alert sent to the customer device 524 with additional information that may be helpful in identifying the urgency of addressing the alert and presenting data that may be useful for diagnosis or troubleshooting.

In various implementations, minor problems may not be reported to the customer device 524 so as not to alarm the customer or inundate the customer with alerts. The review server 512 (or a technician) may determine whether a problem is minor based on a threshold. For example, an efficiency decrease greater than a predetermined threshold may be reported to the customer device 524, while an efficiency decrease less than the predetermined threshold may not be reported to the customer device 524.

In various implementations, the technician device 516 may be remote from the remote monitoring system 420 but connected via a wide area network. For example only, the technician device 516 may include a computing device such as a laptop, desktop, smartphone, or tablet.

Using the customer device 524 executing an application, the customer can access a customer portal 528, which provides historical and real-time data from the IAQ control module 404 and/or the thermostat 208. The customer portal 528 may also provide setpoints and predetermined ranges for each of the measurements, local outdoor air quality data, statuses of the mitigation devices 424 (e.g., on or off), and other data to the customer device 524. Via the customer device 524, the customer may change the setpoints and predetermined ranges. The monitoring server 508 transmits changed setpoints and predetermined ranges to the thermostat 208 and/or the IAQ control module 404 for use in controlling operation of the mitigation devices 424.

The remote monitoring system 420 includes a local data server 520 that obtains local data at (outside) the building. The local data server 520 may obtain the local data from one or more local data sources 532 via a wide area network, such as the internet 416, using a geographical location of the building. The geographical location may be, for example, an address, zip code, coordinates, or other geographical identifier of the building. The remote monitoring system 420 may obtain the geographical location of the building, for example, via the customer device 524 before providing data to the customer device 524. The local data includes, for example, air temperature within a predetermined geographical area including the geographical location of the building, RH within the predetermined geographical area, amount of VOCs in the air within the predetermined geographical area, amount of particulate of the predetermined size measured by the particulate sensor 316 within the predetermined geographical area, and amount of carbon dioxide within the predetermined geographical area.

FIG. 5B includes a functional block diagram of an example monitoring system where the customer device 524 serves as a monitoring system and provides the functionality of the remote monitoring system 420. The thermostat 208 and/or the IAQ control module 404 transmit data to the customer device 524 wirelessly, such as via a Bluetooth connection, WiFi, or another wireless connection. The customer device 524 may obtain the local data from the local data sources 532 via a wide area network, such as the internet 416. Alternatively, the IAQ control module 404 or the thermostat 208 may serve as a monitoring system and provide the functionality of the remote monitoring system 420.

Figure 6:
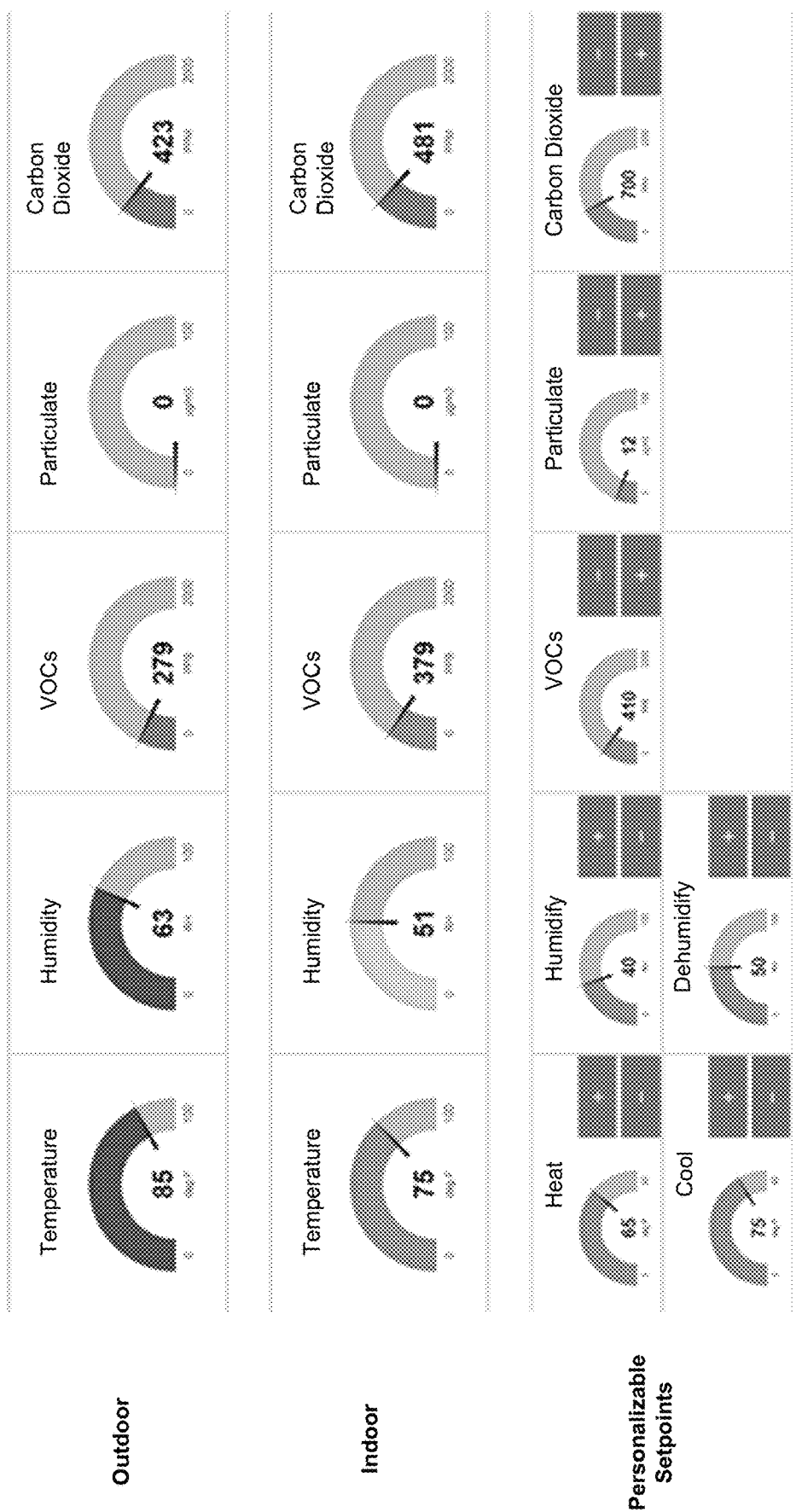
FIGS. 6-9 are example user interfaces displayed by a user computing device during execution of an application based on data received from a remote monitoring system.

FIG. 6 includes an example user interface displayed by the customer device 524 during execution of the application based on data from the customer portal 528. It should be understood that the following functions are performed by the customer device 524 during execution of the application.

As shown in FIG. 6, the customer device 524 may display real-time values of the temperature, RH, amount of VOCs, amount of particulate, and amount of carbon dioxide (CO2) measured by the IAQ sensor module 304. In FIG. 6, these are illustrated in the row labeled "indoor" as they represent parameters within the building. The real-time values may be received by the customer device 524 from the monitoring server 508 via the customer portal 528.

The customer device 524 may also display real-time values of the temperature, RH, amount of VOCs, amount of particulate, and amount of carbon dioxide (CO2) measured outside of the building but within the predetermined geographical area including the geographical area of the building. In FIG. 6, these are illustrated in the row labeled "outdoor" as they represent parameters outside of the building. The real-time values may be received by the customer device 524 from the monitoring server 508 via the customer portal 528.

The customer device 524 may also display present setpoints for beginning heating (Heat) of the building, cooling (Cool) of the building, humidification (Humidify), dehumidification (Dehumidify), VOC removal (VOCs), particulate removal (Particulate), and carbon dioxide removal (Carbon Dioxide). In FIG. 6, these setpoints are illustrated in the row labeled "setpoints" as they represent setpoints for beginning associated mitigation actions within the building. The present setpoints may be received by the customer device 524 from the monitoring server 508 via the customer portal 528.

A predetermined range for a measurement may be set based on the setpoint for a measurement. For example, a predetermined range for heating may be set to the temperature setpoint for heating plus and minus a predetermined amount. A predetermined range for cooling may be set to the temperature setpoint for cooling plus and minus a predetermined amount. The predetermined amount may be user adjustable in various implementations.

The customer device 524 also allows a user to adjust one or more of the present setpoints via the customer device 524. For example, the customer device 524 may provide positive and negative adjustment inputs in association with one, more than one, or all of the setpoints to allow for adjustment of the present setpoints. FIG. 6 includes the example of +serving as the positive adjustment input and −serving as the negative adjustment input. Adjustment inputs labeled and provided differently, however, may be used.

In response to receipt of input indicative of user interaction (e.g., touching, clicking, etc.) with an adjustment input associated with a setpoint, the customer device 524 may transmit a command to the monitoring server 508 to adjust (i.e., increment or decrement) the setpoint by a predetermined amount. For example, in response to receipt of input indicative of user interaction (e.g., touching, clicking, etc.) with the positive adjustment input associated with the heating temperature setpoint, the customer device 524 may transmit a command to the monitoring server 508 to increment the heating temperature setpoint by a first predetermined amount. In response to receipt of input indicative of user interaction (e.g., touching, clicking, etc.) with the negative adjustment input associated with the heating temperature setpoint, the customer device 524 may transmit a command to the monitoring server 508 to decrement the heating temperature setpoint by the first predetermined amount. As another example, in response to receipt of input indicative of user interaction (e.g., touching, clicking, etc.) with the positive adjustment input associated with the humidification RH setpoint, the customer device 524 may transmit a command to the monitoring server 508 to increment the humidification RH setpoint by a second predetermined amount. In response to receipt of input indicative of user interaction (e.g., touching, clicking, etc.) with the negative adjustment input associated with the humidification RH setpoint, the customer device 524 may transmit a command to the monitoring server 508 to decrement the humidification RH setpoint by the second predetermined amount.

The monitoring server 508 relays (transmits) received commands for adjusting setpoints to the thermostat 208 and/or the IAQ control module 404 via the internet 416. Alternatively, the customer device 524 may transmit commands for adjusting setpoints to the thermostat 208 and/or the IAQ control module 404 directly or via the internet 416. The thermostat 208 and/or the IAQ control module 404 adjust the associated setpoints in response to the commands received from the monitoring server 508.

Figure 7:
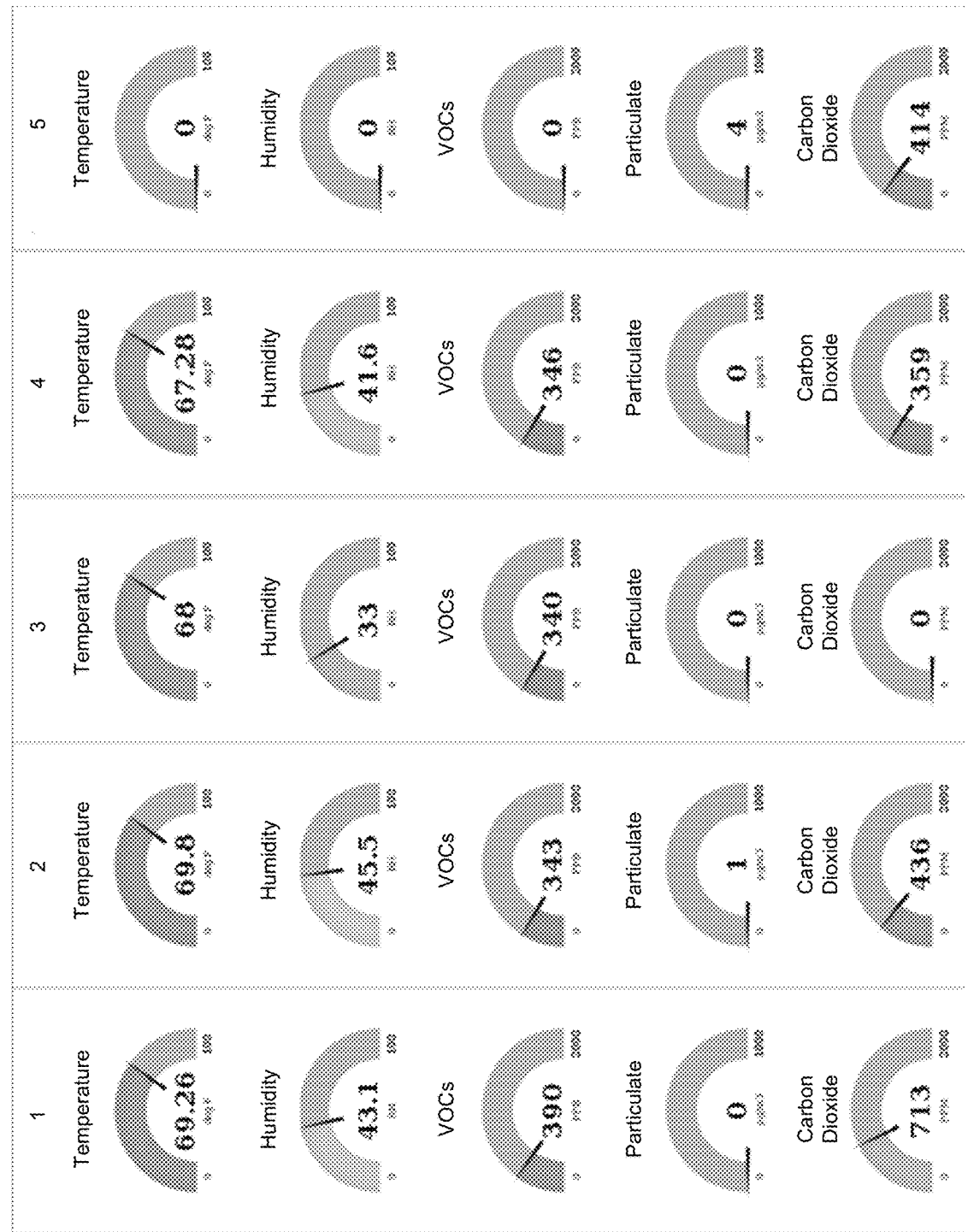

As discussed above, one or more than one IAQ sensor module 304 may be concurrently used within the building, such as in different rooms of the building. FIG. 7 includes an example user interface displayed by the customer device 524 during execution of the application when the building includes multiple IAQ sensor modules. In the example of FIG. 7, the measurements from each IAQ sensor module are shown in a separate column.

As also discussed above, one or more of the IAQ sensors may be omitted from an IAQ sensor module. For example, as shown in the right-most column of FIG. 7, the associated IAQ sensor module only includes a particulate sensor and a carbon dioxide sensor. The temperature, relative humidity, and VOCs of zero may indicate that the IAQ sensor module does not include a temperature sensor, a humidity sensor, or a VOC sensor in the example of FIG. 7.

Figure 8:
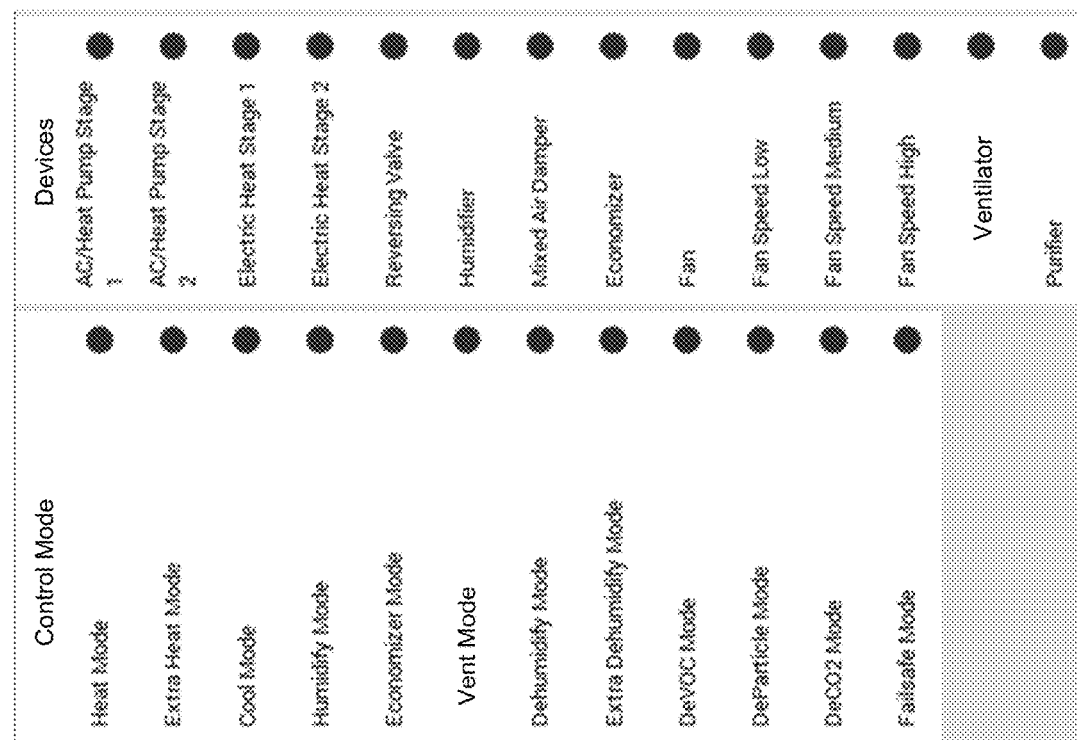

FIG. 8 includes an example user interface displayed by the customer device 524 during execution of the application based on additional data indicative of present statuses of control modes and present (operation) statuses of various devices and modes of devices of the building. The present statuses may be, for example, on or off. The present status of a control mode, device, or mode of a device may be on (currently in use) or off (not currently in use). One type of indicator may be used to indicate a present status of on, while another type of indicator may be used to indicate a present status of off. The customer device 524 may display the additional data concurrently with the data from one or more IAQ modules, the local data, and/or the setpoint data.

The customer device 524 selectively displays measurements of one or more IAQ sensor modules, local data, control modes, and/or statuses from a predetermined period of time. The predetermined period of time may be, for example, the present day, a predetermined number of days (including or not including the present day), a predetermined number of hours before a present time, a predetermined number of minutes before the present time, or another suitable period. By default, a predetermined period may be selected (e.g., the present day), but a user may select a different predetermined period and the customer device 524 may display the data for the selected predetermined period.

Figure 9:
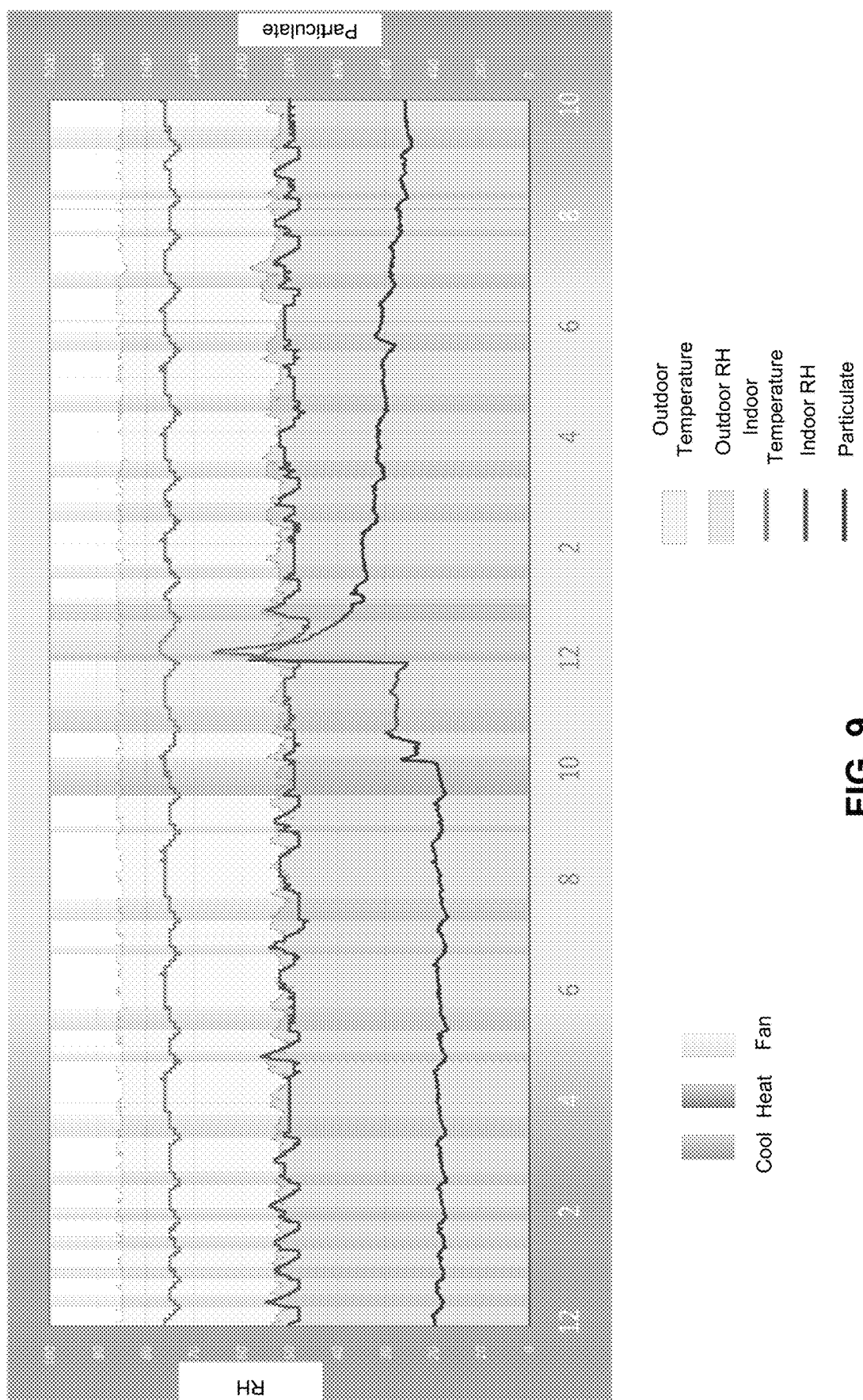

FIG. 9 includes an example user interface displayed by the customer device 524 during execution of the application for the present day (from 12:01 pm of the present day to the present time (approximately 10 pm in this example)). The customer device 524 displays data selected by a user of the customer device 524. By default, all data may be selected, but a user may select less than all of the data to be displayed, and the customer device 524 may display only the selected data.

For example, in FIG. 9, only outdoor temperature (from the local data), outdoor RH (from the local data), indoor temperature (from the IAQ sensor module 304), indoor RH (from the IAQ sensor module 304), and particulate (from the IAQ sensor module 304) are graphed over time. Indicators of the statuses of the cooling mode, the heating mode, and use of the circulator blower 108 are also concurrently shown over time. Indoor Carbon dioxide (from the IAQ sensor module 304, if measured) and indoor VOCs (from the IAQ sensor module 304, if measures) are not graphed over time in this example.

The customer device 524 selectively displays a user interface for user selection of a priority for mitigating deviations in IAQ parameters. For example, the customer device 524 may display a user interface that allows user assignment of an order of prioritization for: (i) temperature control: (ii) RH control; (iii) particulate control; (vi) VOC control; and (v) carbon dioxide control. Temperature control may refer to maintaining, as much as possible, the temperature within the building within a predetermined temperature range. RH control may refer to maintaining, as much as possible, the RH within the building within a predetermined RH range. Particulate control may refer to maintaining, as much as possible, the amount of particulate within the building less than a predetermined amount of particulate. VOC control may refer to maintaining, as much as possible, the amount of VOCs within the building less than a predetermined amount of VOCs. Carbon dioxide control may refer to maintaining, as much as possible, the amount of carbon dioxide within the building less than a predetermined amount of carbon dioxide. The order of prioritization for (i)-(v) may be initially preset, but may be user selected/adjusted, as stated above.

The thermostat 208 and/or the IAQ control module 404 may control the mitigation devices 424 based on the prioritization (order). For example, when particulate control is the first priority, the thermostat 208 may control the mitigation devices 424 to decrease particulate as quickly as possible as opposed to, for example, controlling the mitigation devices 424 to more quickly adjust temperature or RH or to more quickly decrease the amount of VOCs and/or the amount of carbon dioxide.

The user interfaces provided by the customer device 524 provide visual information to the user regarding real-time measurements, historical measurements over a period of time, trends, and efficacy of IAQ mitigation and control. The user interfaces also enable the user to adjust setpoints to be used to control the mitigation devices 424 to control comfort and IAQ within the building. The user interfaces also enable the user to adjust prioritization in which IAQ conditions are mitigated. All of the above improves IAQ within the building and user experience regarding IAQ within the building.

As discussed above, RH and temperature both affect the amount of VOCs, the amount of carbon dioxide, and the amount of particulate. The thermostat 208 and/or IAQ control module 404 controls the mitigation devices 424 to mitigate deviations of the temperature outside of the predetermined temperature range and deviations of the RH outside of the predetermined RH range. When at least one of the temperature is outside of the predetermined temperature range and the RH is outside of the predetermined RH range, the thermostat 208 sequences execution of ones of the control modes based on the prioritization when one or more of the following are also true: the amount of particulate is greater than the predetermined amount of particulate, the amount of VOCs is greater than the predetermined amount of VOCs, and the amount of carbon dioxide is greater than the predetermined amount of carbon dioxide. The thermostat 208 controls the mitigation devices 424 based on the control modes.

The control modes includes the cooling mode, the heating mode, an extra heating mode, a humidify mode, a dehumidify mode, an extra dehumidify mode, a Departicle (or remove particulate) mode, a DeCO2 (or remove carbon dioxide) mode, an extra DeCO2 mode, a DeVOC (or remove VOC) mode, and an extra DeVOC mode. The thermostat 208 and/or IAQ control module 404 activates only one of the control modes at a time and determines a sequence for activating control modes when at least one of (I) and (II) is true and at least one of (A), (B), and (C) is true:

(I) the temperature is outside of the predetermined temperature range for heating or the predetermined temperature range for cooling; and (II) the RH is outside of the predetermined RH range; and (A) the amount of particulate is greater than the predetermined amount of particulate;

(B) the amount of VOCs is greater than the predetermined amount of VOCs; and (C) the amount of carbon dioxide is greater than the predetermined amount of carbon dioxide.

The thermostat 208 and/or the IAQ control module 404 also activates an associated one of the control modes when one of (I), (II), (A), (B), and (C) is true and the other ones of (I), (II), (A), (B), and (C) are not true and when two or more of (I), (II), (A), (B), and (C) are true and the other ones of (I), (II), (A), (B), and (C) are not true.

When the heating mode is active, the thermostat 208 and/or IAQ control module 404 operates the burner 120 and/or the heat pump to generate heat. The thermostat 208 also operates the blower 108 at a predetermined speed, such as predetermined medium speed when the heating mode is active. The heating mode may be activated when the temperature is less than the lower temperature limit of the predetermined temperature range for heating.

When the extra heating mode is active, the thermostat 208 and/or IAQ control module 404 may additionally (to the burner 120 and/or the heat pump and the blower 108) operate an electric heater to generate additional heat. The extra heating mode may be activated when the temperature is less than the lower temperature limit of the predetermined temperature range for heating continuously for greater than a predetermined period, such as 30 minutes or another suitable predetermined period. The heating mode and the extra heating mode may be deactivated when the temperature becomes greater than the upper temperature limit of the predetermined temperature range for heating.

When the cooling mode is active, the thermostat 208 and/or IAQ control module 404 operates the condensing unit 164. In the example of a heat pump, the thermostat 208 may switch the reversing valve 272 to provide cooling. The thermostat 208 also operates the blower 108 at a predetermined speed, such as a predetermined high speed when the cooling mode is active. The predetermined high speed is greater than the predetermined medium speed. The cooling mode may be activated when the temperature is greater than the upper temperature limit of the predetermined temperature range for cooling. The cooling mode may be deactivated when the temperature becomes less than the lower temperature limit of the predetermined temperature range for cooling.

When the humidify mode is active, the thermostat 208 and/or control module 404 operates the humidifier 432. The thermostat 208 also operates the blower 108 at a predetermined speed, such as the predetermined high speed when the humidify mode is active. The humidify mode may be activated when the RH is less than the first RH setpoint. The humidify mode may be deactivated when the RH becomes greater than the second RH setpoint. Other options for humidification without the use of the humidifier 432 are discussed below.

When the dehumidify mode is active, the thermostat 208 and/or IAQ control module 404 may operate the dehumidifier 436. Additionally or alternatively, the thermostat 208 may toggle operation of the blower 108 between operation at a predetermined low speed for a predetermined period and the predetermined high speed for the predetermined period when the dehumidify mode is active. The dehumidify mode may be activated when the RH is greater than the first dehumidification RH setpoint. The predetermined period may be, for example, 5 minutes or another suitable period.

When the extra dehumidify mode is active, the thermostat 208 and/or IAQ control module 404 may also operate the blower 108 at the predetermined high speed. The thermostat 208 may additionally operate the compressor 148 and/or an electric heater to provide more rapid dehumidification when the extra dehumidify mode is active. Additionally or alternatively, the thermostat 208 may transition to the cooling mode. The dehumidify mode may be activated when the RH is at least a predetermined amount (e.g., 1 percent) greater than the second dehumidification RH setpoint. The dehumidify mode and the extra dehumidify may be deactivated when the RH becomes less than the second dehumidification RH setpoint.

When the Departicle mode is active, the thermostat 208 and/or IAQ control module 404 may operate the blower 108 at a predetermined speed, such as the predetermined high speed. Additionally or alternatively, the thermostat 208 may operate the air cleaner/purifier 428 when the Departicle mode is active. The Departicle mode may be activated when the amount of particulate is greater than the predetermined amount of particulate. The Departicle mode may be deactivated when the amount of particulate becomes less than the predetermined amount of particulate.

When the DeVOC mode is active, the thermostat 208 and/or IAQ control module 404 may operate the inducer blower 132 at a predetermined speed, such as the predetermined low speed. Additionally or alternatively, the thermostat 208 may operate one or more ventilators, such as one or more bathroom fans or range hood fans. The DeVOC mode may be activated when the amount of VOCs is greater than the predetermined amount of VOCs.

When the extra DeVOC mode is active, the thermostat 208 and/or IAQ control module 404 may operate the blower 108 at the predetermined high speed. The thermostat 208 may additionally operate one or more other ventilators to more rapidly decrease VOCs the extra DeVOC mode is active. The extra DeVOC mode may be activated when the amount of VOCs remains greater than the predetermined amount of VOCs for greater than a predetermined period when the DeVOC mode is active, such as 1 hour. The extra DeVOC mode and the DeVOC may be deactivated when the amount of VOCs becomes less than the predetermined amount of VOCs.

When the DeCO2 mode is active, the thermostat 208 and/or IAQ control module may operate the blower 108 at a predetermined speed, such as the predetermined low speed. Additionally or alternatively, the thermostat 208 may operate one or more ventilators, such as one or more bathroom fans or range hood fans. The DeCO2 mode may be activated when the amount of carbon dioxide is greater than the predetermined amount of carbon dioxide.

When the extra DeCO2 mode is active, the thermostat 208 and/or IAQ control module 404 may operate the blower 108 at the predetermined high speed. The thermostat 208 may additionally operate one or more other ventilators to more rapidly decrease carbon dioxide the extra DeCO2 mode is active. The extra DeCO2 mode may be activated when the amount of carbon dioxide remains greater than the predetermined amount of carbon dioxide for greater than a predetermined period when the DeCO2 mode is active, such as 1 hour. The extra DeCO2 mode and the DeCO2 may be deactivated when the amount of carbon dioxide becomes less than the predetermined amount of carbon dioxide.

When at least one of (A), (B), and (C) is satisfied and at least one of (I) and (II) is satisfied, the thermostat 208 and/or IAQ control module 404 determines the sequence for the control modes based on the prioritization of modes and the conditions that are satisfied, as discussed above. As discussed above, the prioritization may be set to a predetermined prioritization by default, but the user may adjust the prioritization via the customer device 524.

Figure 10B:
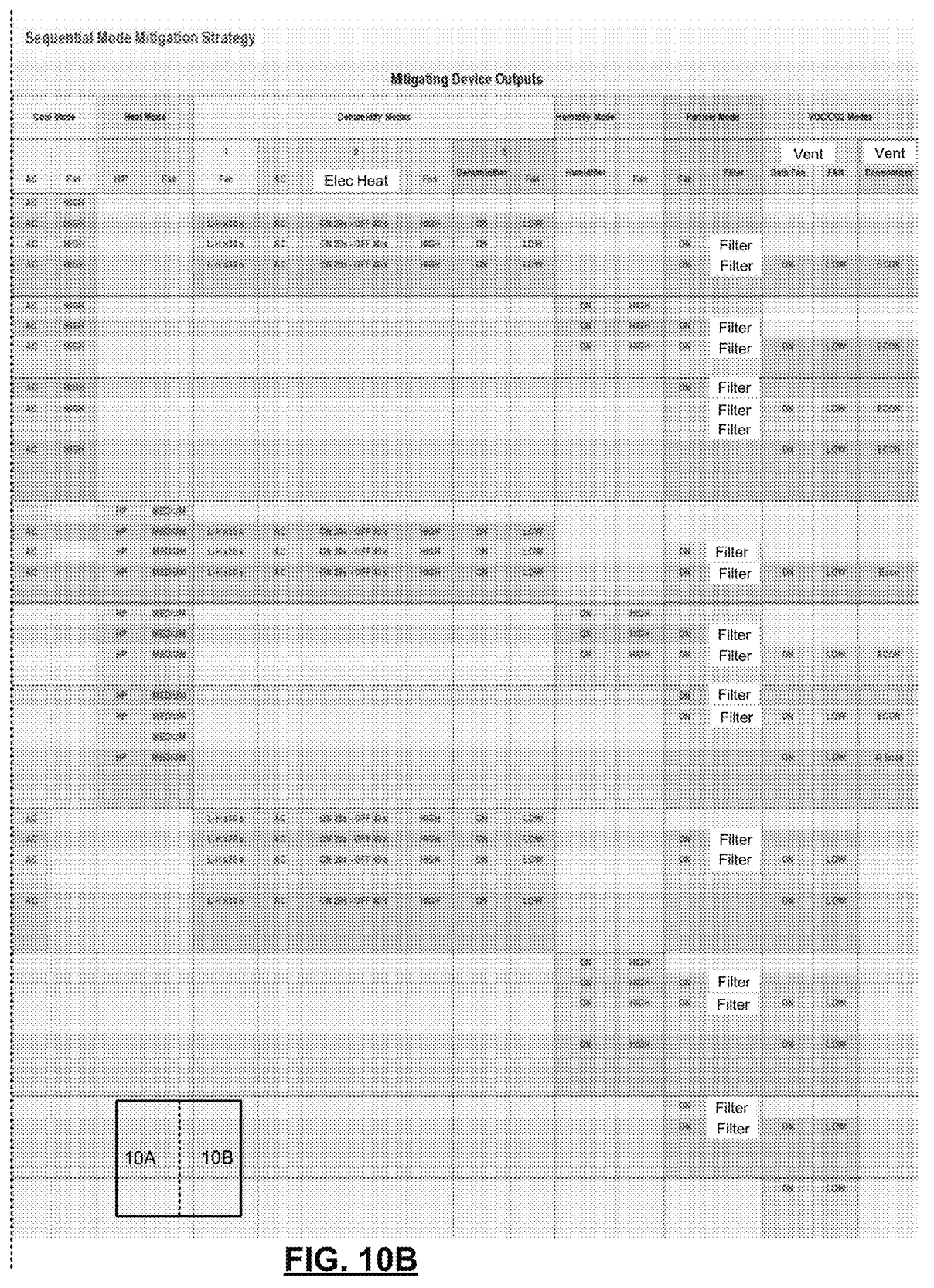

FIGS. 10A and 10B include a table of example sequences for activating ones of the control modes when different combinations of conditions are present given a prioritization. Example ranges are provided for temperature and RH, and example predetermined amounts are provided for particulate, VOCs, and carbon dioxide.

In the column headed "temp", a lack of Temp+ or Temp– indicates that the temperature is between the upper and lower temperature limits. Temp+ in the example of FIGS. 10A and 10B indicates that the temperature is greater than the upper temperature limit. Temp– indicates that the temperature is less than the lower temperature limit.

In the example provided, one predetermined RH range (e.g., defined by the first RH setpoint and the second RH setpoint) is used for humidification and de-humidification. In the column headed "RH", a lack of RH+ or RH– indicates that the RH is within a predetermined range (e.g., between the first RH setpoint and the second RH setpoint). RH+ is used to indicate that the RH is above the predetermined RH range (e.g., greater than the second RH setpoint). RH– is used to indicate that the RH is below the predetermined RH range (e.g., less than the first RH setpoint).

In the column headed "PM2.5", a lack of PM2.5 indicates that the amount of particulate is less than the predetermined amount of particulate. PM2.5 indicates that the amount of PM is greater than the predetermined amount of particulate. VOC indicates that the amount of VOCs is greater than the predetermined amount of VOCs. In the column headed "VOC", a lack of VOC indicates that the amount of VOCs is less than the predetermined amount of VOCs. In the column headed "CO2", a lack of CO2 indicates that the amount of carbon dioxide is less than the predetermined amount of carbon dioxide. CO2 indicates that the amount of carbon dioxide is greater than the predetermined amount of carbon dioxide.

Example sequences of control modes used to mitigate a given set of conditions are provided in a time based order. For example, control modes listed under the column headed "Mode 1" would be performed temporally before control modes listed under the columns headed "Mode 2", "Mode 3", "Mode 4", and "Mode 5". As another example, control modes listed under the column headed "Mode 2" would be performed temporally before control modes listed under the columns headed "Mode 3", "Mode 4", and "Mode 5". The lack of a control mode in a given column, however, does not indicate the existence of a significant period between the use of control modes. The lack of a control mode in a given column simply indicates the non-use of the associated control mode when mitigating the then present conditions. "Cool" indicates the cooling mode, while "Heat" indicates the heating mode. "Dehumidify" indicates the Dehumidify mode, "Humidify" indicates the humidify mode, PM indicates the Departicle mode, and VOC/CO2 indicates the DeVOC or the DeCO2 mode. In various implementations, the DeVOC and DeCO2 modes may be considered a single control mode because mitigation may be accomplished via operation of the same mitigation devices. The control modes labeled "extra", such as the extra DeVOC mode or the extra heat mode may be automatically activated by the thermostat 208 as described above after a predetermined period of operation in the associated (non-extra) control mode, such as the DeVOC mode.

Generally speaking, the thermostat 208 determines whether (I), (II), (A), (B), or (C) is satisfied. For example, (I), (A), and (C) may be satisfied at a given time while (II) and (B) are not satisfied. If at least one of (I), (II), (A), (B), and (C) is satisfied, the thermostat 208 determines the sequence for mitigating the satisfied ones of (I), (II), (A), (B), and (C) given the prioritization.

The example of FIGS. 10A and 10B illustrate the example prioritization of: first priority is temperature (e.g., cool mode then heat mode); second priority is RH (e.g., dehumidify mode then humidify mode); third priority is Departicle mode; and fourth priority is VOCs and carbon dioxide (e.g., DeVOC mode and DeCO2 mode). In the example of (I), (A), and (C) being satisfied while (II) and (B) are not satisfied and the example prioritization, the thermostat 208 may determine to first activate the heat or cool mode and to heat or cool the building, second activate the Departicle mode and remove particulate from the air within the building, and third activate the DeVOC or DeCO2 mode and remove VOCs and/or carbon dioxide from the air within the building. This mitigates (I), (A), and (C) and first brings the temperature within the predetermined temperature range, second brings the amount of particulate below the predetermined amount of particulate, and third, brings the amount of VOCs or carbon dioxide below the predetermined amount of VOCs or the predetermined amount of carbon dioxide.

Indicators under the columns headed "fan" indicate operation of the blower 108. The blower 108 may operate at multiple different speeds. For example, "L-Hx30s" indicates the above described toggling of the blower 108 between the predetermined low and high speeds for a predetermined period. "Medium" indicates the use of the predetermined medium speed, "low" indicates the use of the predetermined low speed, and "high" indicates the use of the predetermined high speed. The indicator "ON 20S-OFF 40s" under the columns headed "Elec Heat" indicates toggling between the electric heater being on for a predetermined period (e.g., 20 seconds) and off for a predetermined period (e.g., 40 seconds). For example, "L-Hx30s" indicates the above described toggling of the blower 108 between the predetermined low and high speeds for a predetermined period.

Figure 11:
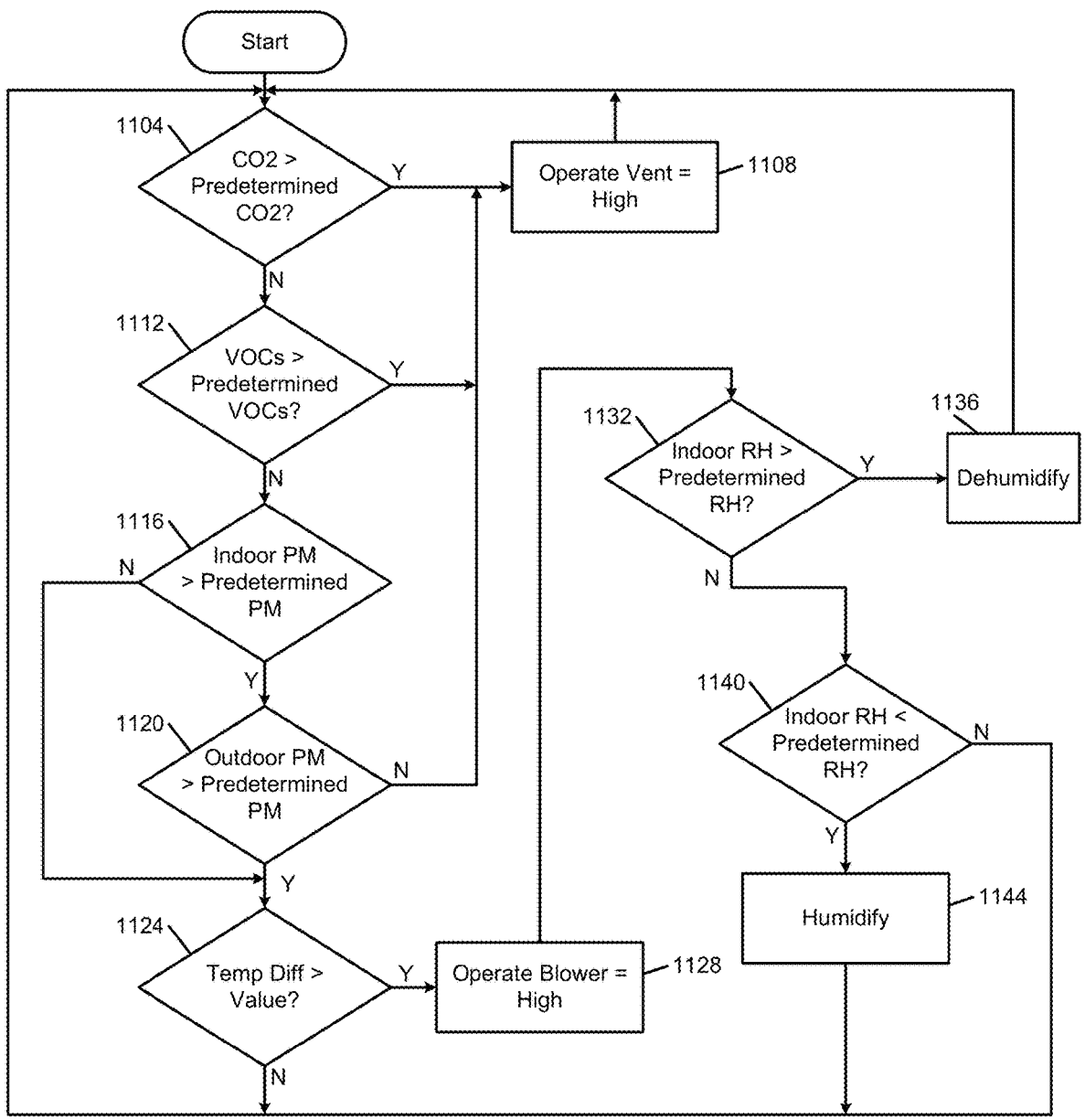
FIG. 11 includes a flowchart depicting an example method of mitigating IAQ parameters.

FIG. 11 includes a flowchart depicting an example method of mitigating multiple IAQ parameters. The example of FIG. 11 illustrates a sequence for mitigating VOC and/or carbon dioxide before mitigating particulate matter then mitigating RH. The mitigation sequence can be configured, for example, based on user input regarding the mitigation sequence. Control begins with 1104 where the thermostat 208 may determine whether the amount of carbon dioxide is greater than the predetermined amount of carbon dioxide. If 1104 is true, the thermostat 208 operates one or more ventilation devices, such as the ventilator 440, on a predetermined speed such as a predetermined high speed at 1108, and control returns to 1104. The operation of the one or more ventilation devices introduces fresh air into the building, thereby decreasing carbon dioxide within the air. If 1108 is true, control continues with 1112.

At 1112, the thermostat 208 determines whether the amount of VOCs is greater than the predetermined amount of VOCs. If 1112 is true, control continues with 1108 as discussed above. The operation of the one or more ventilation devices introduces fresh air into the house, thereby decreasing VOCs within the air. If 1112 is false, control continues with 1116. At 1116, the thermostat 208 determines whether the amount of particulate within the building is greater than the predetermined amount of particulate. If 1116 is false, control transfers to 1124, which is discussed further below. If 1116 is true, control continues with 1120.

At 1120, the thermostat 208 determines whether the amount of particulate in the air outside the building is greater than the predetermined amount of particulate. The local data server 520 determines the amount of particulate in the air outside the building based on the geographical location of the building. If 1120 is false, control continues with 1108 as discussed above. The operation of the one or more ventilation devices brings fresh air into the house, decreasing the amount of particulate in the air. If 1120 is true, control continues with 1128 or optionally 1124.

At optional 1124, the thermostat 208 determines whether a temperature difference within the building is greater than a predetermined value (temperature). The predetermined value may be calibratable and may be set to, for example, approximately 2° F. or another suitable value. The thermostat 208 determines the temperature difference with the building based on the difference between: (i) a highest temperature measured by one of the IAQ sensor modules and the thermostat 208; and (ii) a lowest temperature measured by one of the IAQ sensor modules and the thermostat 208. This provides a greatest difference in temperature between different locations where temperature is measured within the building. If 1124 is true, control transfers to 1128. If 1124 is false, control may return to 1104. In various implementations, 1124 may be omitted.

At 1128, the thermostat 208 operates the blower 108 at a predetermined speed, such as the predetermined high speed. Control continues with 1132. At 1132, the thermostat 208 determines whether the RH is greater than the predetermined RH range (e.g., the second RH setpoint or the first dehumidification RH setpoint). If 1132 is true, the thermostat 208 operates the dehumidifier 436 at 1136, and control returns to 1104. In various implementations, the thermostat 208 may operate one or more other devices to dehumidify the air with the building, such as operate the electric heater, the compressor 148, and/or one or more other mitigation devices that dehumidify air within the building. If 1132 is false, control continues with 1140.

At 1140, the thermostat 208 determines whether the RH is less than the predetermined RH range (e.g., the first RH setpoint or the second dehumidification RH setpoint). If 1140 is true, thermostat 208 operates the humidifier 432 at 1144, and control returns to 1104. In various implementations, the thermostat 208 may operate one or more other mitigation devices to humidify the air within the building. If 1132 is false, control returns to 1104.

In various implementations, the blower 108 can serve as a humidifier and a dehumidifier when the condensing unit 164 is being used (i.e., the compressor 148 is on) to cool the air within the building. More specifically, circulating the air within the building dehumidifies the air within the building. During cooling, condensation collects on the evaporator 144 and in the condensate pan 146. Via the blower 108, the condensation can be used to humidify the air within the building.

In various implementations, the IAQ control module 404 is configured to control a speed of the blower 108 to humidify or dehumidify the air within the building. While the example of the IAQ control module 404 being configured to control the speed of the blower 108 is provided, the thermostat 208 may be configured to control the speed of the blower 108, as discussed further below, or another blower control module may be configured to control the speed of the blower 108.

Although not shown in FIG. 11, it is assumed the thermostat will control temperature within the building based on the temperature set point. When the temperature of the air within the building is greater than the lower temperature limit for cooling, the thermostat 208 generates a cooling request. More specifically, the thermostat 208 generates the control signals to apply power to the compressor 148 and the condenser fan 160 via the control module 156 or 276. When the cooling request is received from the thermostat 208, the IAQ control module 404 determines a humidity control mode based on the RH within the building. The RH of the air within the building may be measured by the thermostat 208 or the IAQ sensor module 304. There may be times when both the thermostat 208 may request for the blower to operate for cooling/heating while the IAQ control module 404 may also request the blower to operate for IAQ control. This overlap is normal as part of multiple IAQ parameter control.

Although not shown in FIG. 11, the blower and one or more vent fans (e.g., one or more bathroom fans and/or a range hood fan) may be turned on after the predetermined threshold for PM, VOC, and carbon dioxide has been exceed. The blower and the one or more other vent fans can be turned off after decreasing the PM, VOC, and carbon dioxide to below the same or lower predetermined thresholds or after being on for a predetermined period to avoid excessive overrun.

Figure 13:
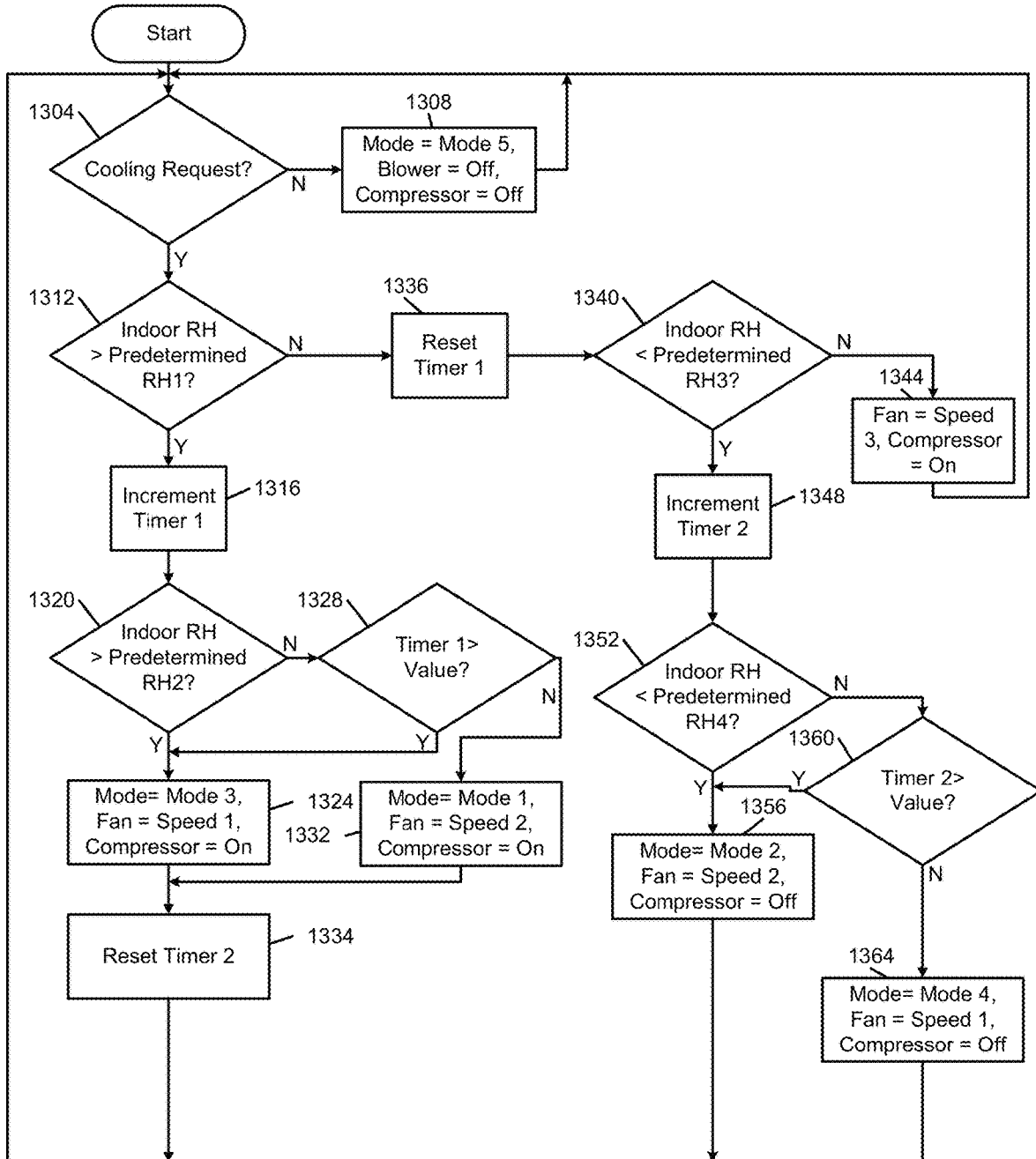
FIG. 13 includes an example method of controlling a blower and a compressor based on relative humidity.

FIG. 12 includes an example table of compressor operation and blower speed for various humidity control modes. FIG. 13 includes an example method of determining the humidity control mode based on RH within the building and controlling the blower 108 and the compressor 148 based on the humidity control mode.

Referring to FIGS. 12 and 13, at 1304, the IAQ control module 404 determines whether a cooling request has been received from the thermostat 208 or the control module 112. The thermostat 208 generates a cooling request when the temperature measured by the thermostat 208 (or the IAQ sensor module 304) is greater than the upper temperature limit of the predetermined temperature range for cooling. As described above, the upper temperature limit may be equal to or based on the setpoint temperature plus a predetermined temperature (e.g., 1, 2, or 3 degrees F.). The lower temperature limit of the predetermined temperature range for cooling may be equal to or based on the setpoint temperature minus the predetermined temperature. After generating the cooling request, the thermostat 208 maintains the cooling request until the temperature becomes less than the lower temperature limit of the predetermined temperature range for cooling. If 1304 is false, at 1308 the IAQ control module 404 sets the humidity control mode to a fifth control mode (Mode 5) and turns the blower 108 off (i.e., discontinues power to the blower 108). The blower 108 then slows to a stop. The thermostat 208 (or the IAQ control module 404) also turns off the compressor 148 at 1308. Control returns to 1304 after 1308. If 1304 is true, control continues with 1312.

At 1312, the IAQ control module 404 determines whether the RH within the building is greater than a first dehumidification RH setpoint (Predetermined RH1). The first dehumidification RH setpoint is calibratable and may be set, for example, to approximately 50% RH or another suitable value. If 1312 is false, control transfers to 1336, which is discussed further below. If 1312 is true, the IAQ control module 404 increments a first timer value (Timer 1) by a predetermined increment amount at 1316, and control continues with 1320.

At 1320, the IAQ control module 404 determines whether the RH within the building is greater than a second predetermined dehumidification RH. The second predetermined dehumidification RH is calibratable and is greater than the first predetermined dehumidification RH. For example only, the second predetermined dehumidification RH may be approximately 60% RH or another suitable value. If 1320 is false, control transfers to 1328, which is discussed further below. If 1320 is true, control continues with 1324.

At 1324, the IAQ control module 404 sets the humidity control mode to a third control mode (Mode 3) and operates the blower 108 at the predetermined low speed (e.g., corresponding to approximately 250 CFM/ton of the condensing unit 164). The thermostat 208 (or the IAQ control module 404) also operates the compressor 148 at 1324 by applying power to the compressor 148 and the condenser fan 160 via the control module 156 or 276. Operating the blower 108 at the predetermined low speed while operating the compressor 148 decreases the RH more quickly than operating the blower 108 at a higher speed. Control resets a second timer value (Timer 2) to a predetermined reset value (e.g., zero) at 1334, and control returns to 1304.

At 1328 (when the RH within the building is not greater than the second predetermined dehumidification RH at 1320), the IAQ control module 404 determines whether the first timer value (Timer 1) is greater than a first predetermined value. The first predetermined value corresponds to a first predetermined period. The first predetermined value may be calibrated, for example, to correspond to approximately 10 minutes or another suitable period. If 1328 is true, control transfers to 1324, as discussed above. If 1328 is false, control continues with 1332.

At 1332, the IAQ control module 404 sets the humidity control mode to a first control mode (Mode 1) and operates the blower 108 at the predetermined medium speed (e.g., corresponding to approximately 300 CFM/ton of the condensing unit 164). The thermostat 208 (or the IAQ control module 404) also operates the compressor 148 at 1332 by applying power to the compressor 148 and the condenser fan 160 via the control module 156 or 276. Operating the blower 108 at the predetermined medium speed while operating the compressor 148 decreases the RH more quickly than operating the blower 108 at a higher speed (e.g., conventional operation) but less quickly than operating the blower at a lower speed (e.g., the first control mode). Control then transfers to 1334, as discussed above.

Referring back to 1336 (when the RH within the building is not greater than the first predetermined dehumidification RH at 1312), the IAQ control module 404 resets the first timer value (Timer 1) to the predetermined reset value at 1336, and control continues with 1340. At 1340, the IAQ control module 404 determines whether the RH within the building is less than a third dehumidification RH setpoint (Predetermined RH3). The third dehumidification RH setpoint is calibratable and is less than the first dehumidification RH setpoint. For example, the third dehumidification RH setpoint may be set to approximately 40% RH or another suitable value. If 1340 is false, the IAQ control module 404 sets the humidity control mode to a sixth control mode (conventional operation) and operates the blower 108 at the predetermined high speed (e.g., corresponding to approximately 400 CFM/ton of the condensing unit 164). The thermostat 208 (or the IAQ control module 404) also operates the compressor 148 at 1344 by applying power to the compressor 148 and the condenser fan 160 via the control module 156 or 276. Operating the blower 108 at the predetermined high speed while operating the compressor 148 decreases the RH but does so less quickly than operating the blower 108 at a lower speed (e.g., the first control mode or the third control mode). Control then returns to 1304. If 1340 is true, the IAQ control module 404 increments the second timer value (Timer 2) by the predetermined increment amount at 1348, and control continues with 1352.

At 1352, the IAQ control module 404 determines whether the RH within the building is less than a fourth dehumidification RH setpoint. The fourth dehumidification RH setpoint is calibratable and is less than the third dehumidification RH setpoint. For example only, the fourth dehumidification RH setpoint may be approximately 30% RH or another suitable value. If 1352 is false, control transfers to 1360, which is discussed further below. If 1352 is true, control continues with 1356.

At 1356, the IAQ control module 404 sets the humidity control mode to a second control mode (Mode 2) and operates the blower 108 at the predetermined medium speed (e.g., corresponding to approximately 300 CFM/ton of the condensing unit 164). The thermostat 208 (or the IAQ control module 404), however, maintains the compressor 148 off at 1356 and does not apply power to the compressor 148 and the condenser fan 160. This humidifies the air within the building using condensation on the evaporator 144 and/or in the condensate pan 146. Control then returns to 1304.

At 1360 (when the RH within the building is not less than the fourth predetermined dehumidification RH at 1356), the IAQ control module 404 determines whether the second timer value (Timer 2) is greater than a second predetermined value. The second predetermined value corresponds to a second predetermined period. The second predetermined value may be calibrated, for example, to correspond to approximately 10 minutes or another suitable period. The first and second predetermined values may be the same or different. If 1360 is true, control transfers to 1356, as discussed above. If 1360 is false, control continues with 1364.

At 1364, the IAQ control module 404 sets the humidity control mode to a fourth control mode (Mode 4) and operates the blower 108 at the predetermined low speed (e.g., corresponding to approximately 250 CFM/ton of the condensing unit 164). The thermostat 208 (or the IAQ control module 404), however, maintains the compressor 148 off at 1364 and does not apply power to the compressor 148 and the condenser fan 160. This humidifies the air within the building using condensation on the evaporator 144 and/or in the condensate pan 146 but humidifies the air less quickly than operating the blower 108 at a higher speed. Control then returns to 1304.

Figure 14:
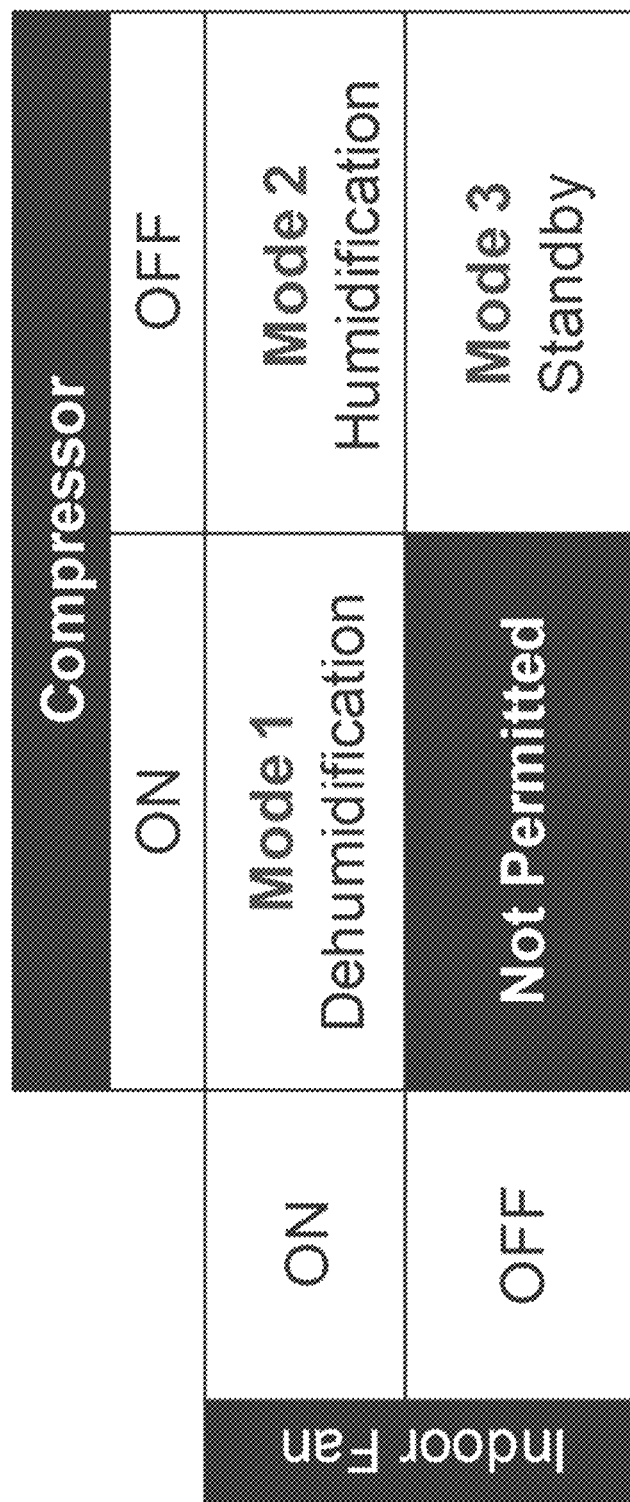
FIG. 14 includes an example table of compressor operation and blower speed for various humidity control modes.
Figure 15:
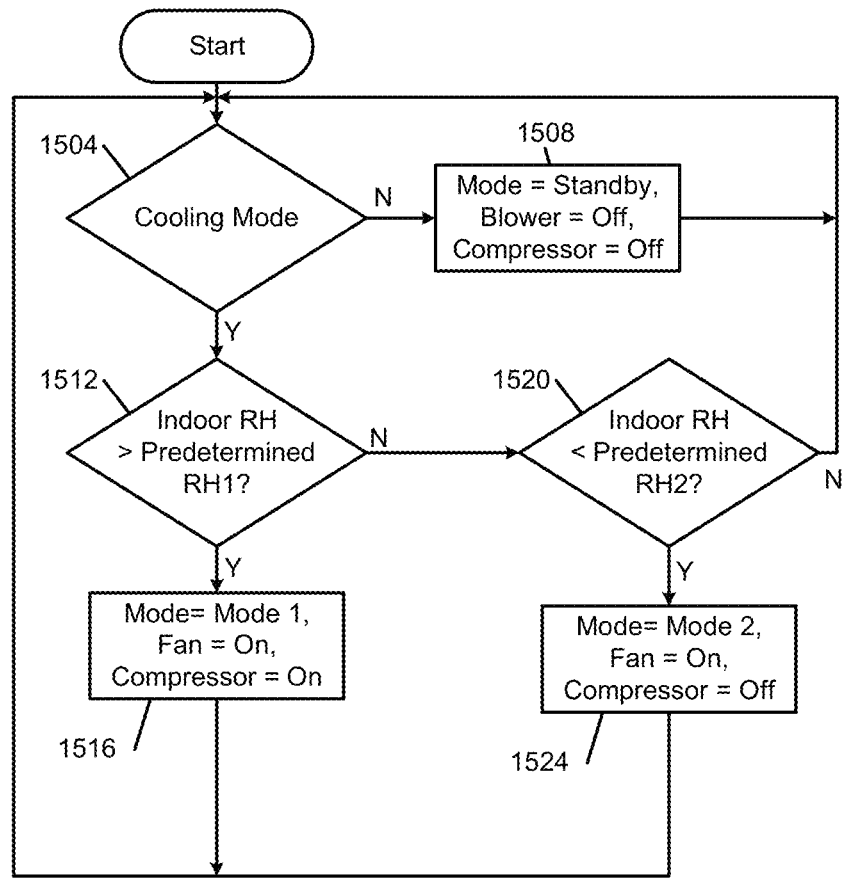
FIG. 15 includes an example method of controlling a blower and a compressor based on relative humidity.

FIG. 14 includes an example table of compressor operation and blower speed for various humidity control modes. FIG. 15 includes an example method of determining the humidity control mode based on RH within the building and controlling the blower 108 and the compressor 148 based on the humidity control mode that may be performed by the thermostat 208.

Referring to FIGS. 14 and 15, at 1504, the thermostat 208 determines whether the thermostat 208 is set to cooling (not heat or off). If 1504 is false, at 1508 the thermostat 208 sets the humidity control mode to a standby mode (Standby) and turns the blower 108 off (i.e., discontinues power to the blower 108). The thermostat 208 also turns off the compressor 148 at 1508. Control returns to 1504 after 1508. If 1504 is true, control continues with 1512.

At 1512, the thermostat 208 determines whether the RH within the building is greater than a first dehumidification RH setpoint (Predetermined RH1). The first dehumidification RH setpoint is calibratable and may be set, for example, to approximately 50% RH or another suitable value. If 1512 is false, control transfers to 1520, which is discussed further below. If 1512 is true, control continues with 1516. At 1516, the thermostat 208 sets the humidity control mode to a first control mode (Mode 1) and operates the blower 108 (e.g., at a predetermined fixed speed). The thermostat 208 also operates the compressor 148 at 1516 by applying power to the compressor 148 and the condenser fan 160 via the control module 156 or 276. Operating the blower 108 while operating the compressor 148 decreases the RH (i.e., dehumidifies) the air within the building. Control returns to 1504.

At 1520 (when the RH is not greater than the first dehumidification RH setpoint at 1512), the thermostat 208 determines whether the RH within the building is less than a second dehumidification RH setpoint. The second dehumidification RH setpoint is calibratable and is less than the first dehumidification RH setpoint. For example, the second dehumidification RH setpoint may be set to approximately 40% RH or another suitable value. If 1520 is false, control returns to 1504 and maintains the states of the blower 108 and the compressor 148. If 1520 is true, control continues with 1524.

At 1524, the thermostat 208 sets the humidity control mode to a second control mode (Mode 2) and operates the blower 108 (e.g., at the predetermined fixed speed). The thermostat 208, however, does not operate the compressor 148 at 1524. Instead, the thermostat 208 does not apply power to the compressor 148 and the condenser fan 160. Operating the blower 108 while not operating the compressor 148 increases the RH (i.e., humidifies) the air within the building via condensation on the evaporator 144 and/or in the condensate pan 146. Control returns to 1504.

Figure 16:
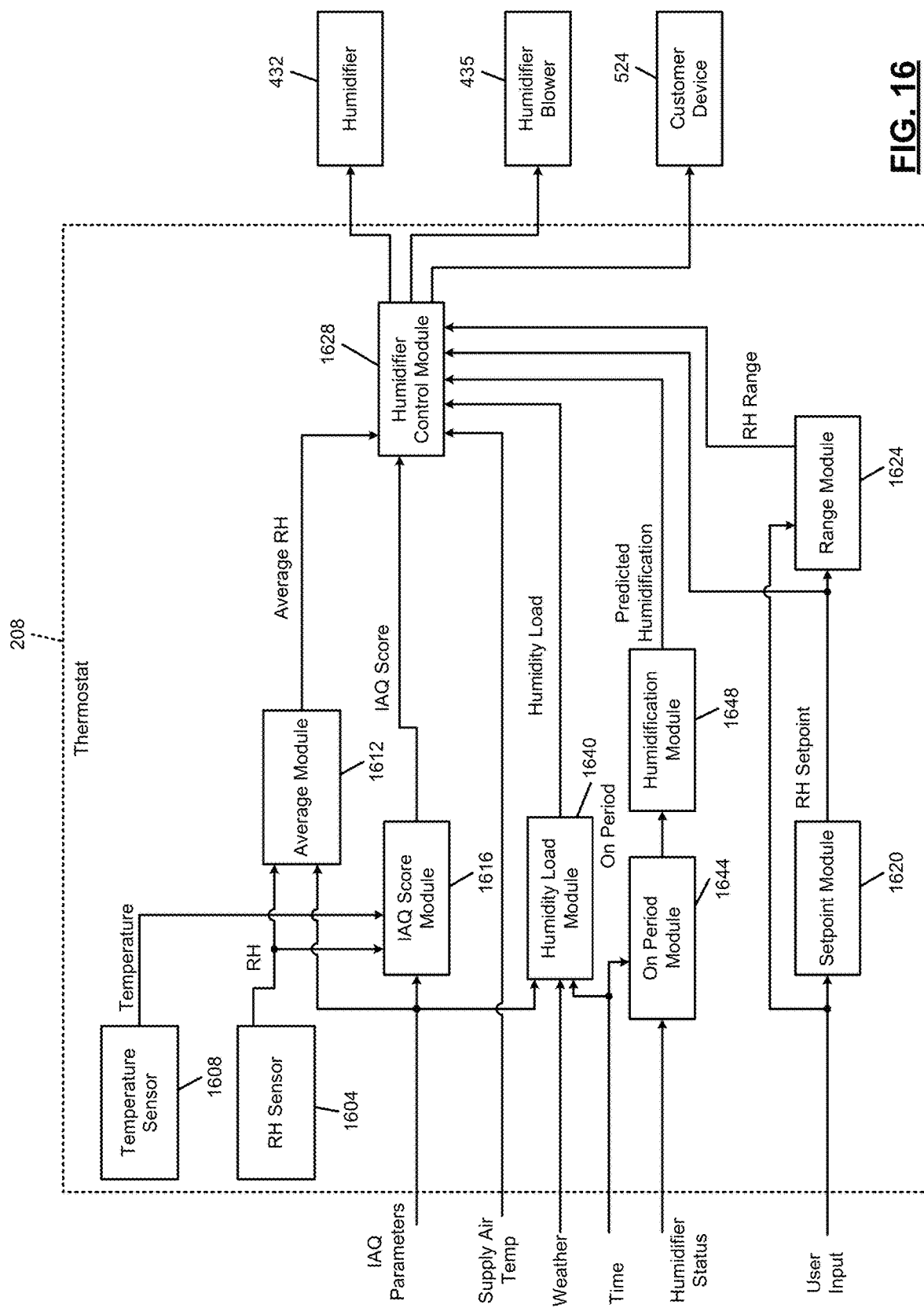
FIG. 16 includes a functional block diagram of an example implementation of a thermostat.

FIG. 16 includes a block diagram of an example implementation of a mitigation system using the example of the thermostat 208. While the example of the thermostat 208 is provided for purposes of discussion, the modules of the thermostat 208 may alternatively be implemented within the IAQ control module 404 or within a combination of the thermostat 208 and the IAQ control module 404.

The thermostat 208 includes a RH sensor 1604 and a temperature sensor 1608. The temperature sensor 1608 measures a temperature of air at the thermostat 208. The RH sensor 1604 measures a RH of air at the thermostat 208. The thermostat 208 may also include a sampling module that samples (analog) measurements of the RH and temperature sensors 1604 and 1608. The sampling module may also digitize and/or store values of the measurements of the sensors. In various implementations, the RH and temperature sensors 1604 and 1608 may be digital sensors and output digital values corresponding to the respective measured parameters. In such implementations, the sampling module may perform storage or may be omitted.

An average module 1612 determines an average RH within the building based on a plurality of RHs measured by the RH sensor 1604 and/or a plurality of RHs measured by the RH sensor 312. For example, the average module 1612 may set the average RH based on or equal to an average (e.g., non-weighted) of all of the RHs measured by the RH sensor 1604 during a predetermined period before the present time. As another example, the average module 1612 may set the average RH based on or equal to an average (e.g., non-weighted) of all of the RHs measured by the RH sensor 312 during the predetermined period before the present time. As another example, the average module 1612 may set the average RH based on or equal to an average (e.g., non-weighted) of all of the RHs measured by the RH sensor 312 and the RH sensor 1604 during a predetermined period before the present time. The predetermined period may be a predetermined number of samples (e.g., 1-100) or a predetermined period of time (e.g., 1 second to 1 minute).

An IAQ score module 1616 determines a present IAQ score for the air within the building based on (all of) the IAQ parameters measured by the IAQ sensor module 304. As discussed above, the IAQ parameters include RH, temperature, amount of VOCs, amount of carbon dioxide, and amount of particulate. In various implementations, the RH measured by the RH sensor 1604 may be used in place of the RH measured by the RH sensor 312. Alternatively, an average of the RHs measured by the RH sensors 312 and 1604 may be used. In various implementations, the temperature measured by the temperature sensor 1608 may be used in place of the temperature measured by the temperature sensor 308. Alternatively, an average of the temperatures measured by the temperature sensors 316 and 1608 may be used. The IAQ score module 1616 determines the IAQ score using one or more lookup tables and/or equations that relate sets of IAQ parameters (RH, temperature, particulate, carbon dioxide, and VOCs) to IAQ scores.

For example, the IAQ score module 1616 may set the IAQ score to a value between a predetermined minimum value (e.g., 0) and a predetermined maximum value (e.g., 100), inclusive. The IAQ score module 1616 may decrease the IAQ score toward the predetermined minimum value when one of the IAQ parameters is outside of a respective predetermined range (in the examples of temperature and RH) or is greater than a respective predetermined value (in the examples of carbon dioxide, particulate, and VOCs). A magnitude of the decrease may be based on a magnitude of a deviation of the one of the IAQ parameters outside of the respective predetermined range or above the respective predetermined value. For example, the magnitude of the decrease may increase as the magnitude of the deviation increases and vice versa.

The IAQ score module 1616 may increase the IAQ score toward the predetermined maximum value when one of the IAQ parameters transitions from outside of the respective predetermined range or greater than the respective predetermined values to within the respective predetermined range or to less than the respective predetermined value. The IAQ score module 1616 may do the above for each of the IAQ parameters. When all of the IAQ parameters are within the respective predetermined range or less than the respective predetermined value, the IAQ score module 1616 may set the IAQ score toward or to the predetermined maximum value.

The IAQ score module 1616 may additionally set the IAQ score based on periods of time that the IAQ parameters have been within the respective predetermined ranges, outside of the respective predetermined ranges, less than the respective predetermined values, or greater than the respective predetermined values. For example, the IAQ score module 1616 may increase the IAQ score toward the predetermined maximum value when the period that one of the IAQ parameters has been within the respective predetermined range increases. The IAQ score module 1616 may decrease the IAQ score toward the predetermined minimum value when the period that the one of the IAQ parameters has been outside of the respective predetermined range increases. The IAQ score module 1616 may increase the IAQ score toward the predetermined maximum value when the period that one of the IAQ parameters has been less than the respective predetermined value increases. The IAQ score module 1616 may decrease the IAQ score toward the predetermined minimum value when the period that the one of the IAQ parameters has been greater than the respective predetermined value increases. The IAQ score module 1616 may do the above for each of the IAQ parameters.

A setpoint module 1620 sets the RH setpoint. The RH setpoint may be set to a predetermined value by default. The setpoint module 1620 may set the RH setpoint to a first predetermined RH during heating and may set the RH setpoint to a second predetermined RH that is greater than or equal to the first predetermined RH during cooling. The setpoint module 1620 may adjust the RH setpoint in response to receipt of user input (e.g., to the thermostat 208 or the customer device 524).

Based on the RH setpoint, a range module 1624 sets a RH range including the humidification RH setpoint and the dehumidification RH setpoint. The dehumidification setpoint is greater than the humidification setpoint. For example, the range module 1624 may set the humidification RH setpoint to the RH setpoint minus a predetermined amount and set the dehumidification RH setpoint to the RH setpoint plus the predetermined amount. The range module 1624 may adjust the predetermined amount in response to receipt of user input (e.g., to the thermostat 208 or the customer device 524). Adjustment of the predetermined amount increases or decreases a size of the range defined by the humidification and dehumidification RH setpoints.

A humidifier control module 1628 controls operation of the humidifier 432 based on the average RH and the IAQ score. As described above, the humidifier blower 435 may be included with the humidifier 432. When turning the humidifier 432 on and off (opening and closing the water feed valve 434, e.g., shown in FIG. 1), the humidifier control module 1628 may additionally turn the humidifier blower 435 on and off.

Figure 17:
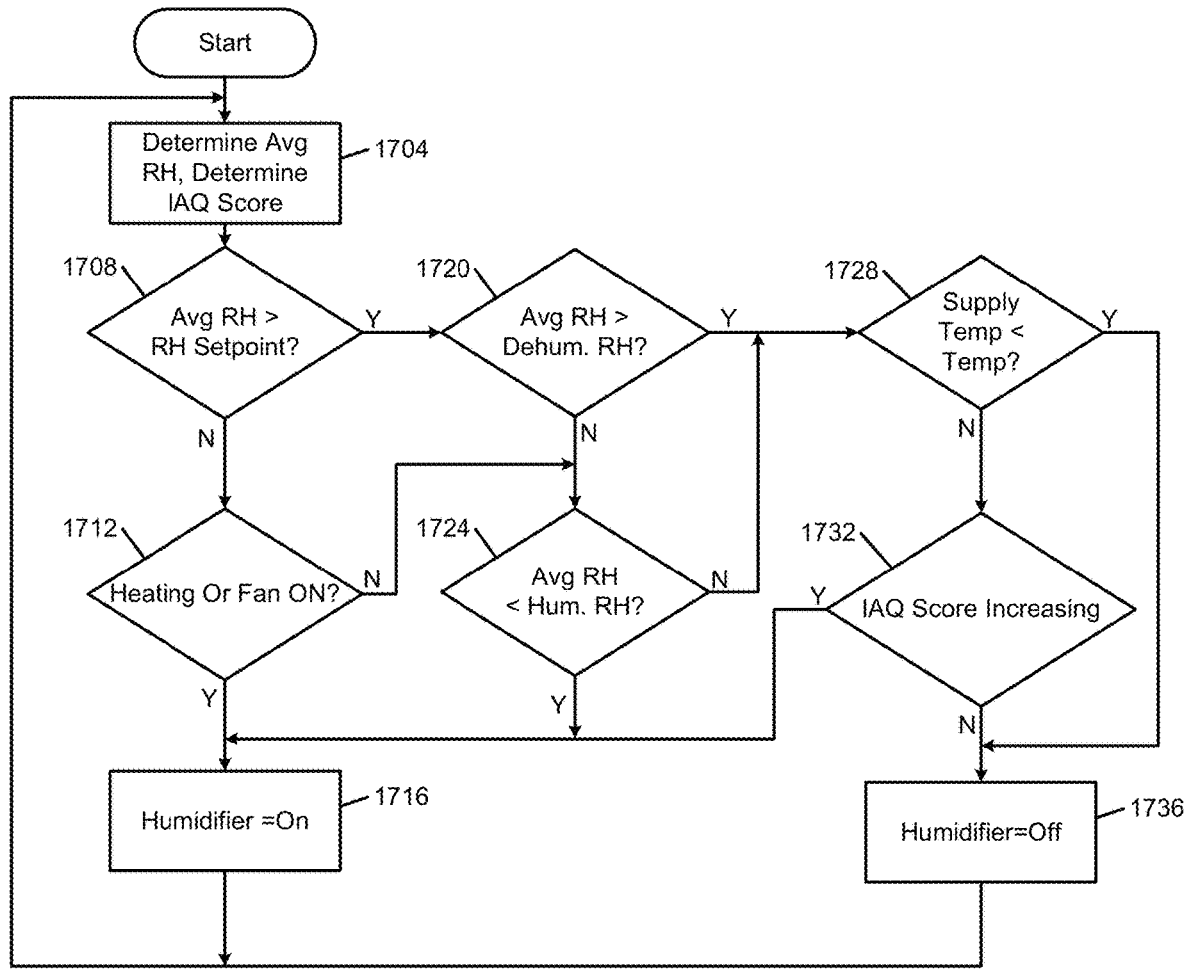
FIGS. 17-18 include flowcharts depicting example methods of controlling operation of a humidifier.

FIG. 17 includes a flowchart depicting an example method of controlling operation of the humidifier 432. Control may begin with 1704 where the average module 1612 determines the average RH and the IAQ score module 1616 determines the IAQ score, as described above. At 1708, the humidifier control module 1628 may determine whether the average RH is greater than the RH setpoint. If 1708 is true, control may transfer to 1720, which is discussed further below. If 1708 is false, control may continue with 1712.

At 1712, the humidifier control module 1628 may determine whether the circulator blower 108 is ON or whether the air handler unit 136 is in the heating mode. The circulator blower 108 is ON in the heating mode. Thus, the humidifier 432 can humidify the building during operation in the heating mode. If 1712 is true, the humidifier control module 1628 may turn (or maintain) the humidifier 432 on at 1716, and control may return to 1704. The humidifier control module 1628 opens the water feed valve 434 of the humidifier 432 to provide water (e.g., to an evaporative pad) for humidification of the air within the building. The humidifier control module 1628 may also turn on the humidifier blower 435 of the humidifier 432. If 1712 is false, control may transfer to 1724, which is discussed further below.

At 1720, the humidifier control module 1628 may determine whether the average RH is greater than the dehumidification RH setpoint. If 1720 is true, control may transfer to 1728. If 1720 is false, control may continue with 1724. At 1724, the humidifier control module 1628 may determine whether the average RH is less than the humidification RH setpoint. If 1724 is true, the humidifier control module 1628 may turn (or maintain) the humidifier 432 on at 1716, and control may return to 1704.

The humidifier control module 1628 may determine whether the supply air temperature is greater than a predetermined temperature at 1728. Supply air temperature less than the predetermined temperature (e.g., 87 degrees F. or another suitable temperature) may imply that humidification is adding too much moisture and may decrease user comfort. A supply air temperature sensor 1750 (e.g., see FIG. 1) may measure the supply air temperature. The supply air temperature may be the temperature of air output to the building at the air handler unit 136. The supply air temperature sensor 1750 may be implemented, for example, in ducting that provides supply air to vents of the building or at an outlet of one of the vents. If 1728 is false, control may continue with 1732. If 1728 is true, control may transfer to 1736.

At 1732, the humidifier control module 1628 may determine whether the IAQ score is increasing. For example, the humidifier control module 1628 may determine whether the IAQ score (e.g., determined at 1704) is greater than a previously determined value of the IAQ score (e.g., from a last instance of 1704). If 1732 is true, humidification of the building is contributing to increasing the IAQ score, so the humidifier control module 1628 may turn (or maintain) the humidifier 432 on at 1716, and control may return to 1704. If 1732 is false, the humidifier control module 1628 turns (or maintains) the humidifier 432 off at 1736, and control may return to 1704. This balances the interest of humidifying the building with the interest of maintaining other ones of the IAQ parameters within their respective predetermined ranges or less than their respective predetermined values. Higher RH can also contribute to higher VOCs and/or carbon dioxide.

Referring back to FIG. 16, the thermostat 208 may additionally or alternatively (to the average module 1612 and the IAQ score module 1616) include a humidity load module 1640, an on period module 1644, and a humidification module 1648.

The humidity load module 1640 determines a (predicted) humidity load on the building over the next predetermined period, such as the next day (24 hours) or another suitable future period (e.g., day, 12 hours, etc.). The humidity load corresponds to an amount (e.g., in gallons) of water to be added to the air within the building during the next predetermined period (e.g., day) to achieve the RH setpoint.

The humidity load module 1640 determines the (real-time) humidity load based on outdoor ambient temperature (OAT), outdoor RH, indoor ambient temperature (IAT), indoor RH, a predetermined air change per hour of the building, and a predetermined volume of the building. The humidity load module 1640 may determine the humidity load using one or more equations and/or lookup tables that relate OATs, outdoor RHs, IATs, indoor RHs, air changes, and building volumes to humidity loads. For example, the humidity load module 1640 may set the humidity load based on or using the equation:

$$\text{Load} = \frac{V * ACH * (Wi - Wo)}{\text{Conversion Value}}$$

where Load is the humidity load (e.g., in gallons of water per day or per hour), V is the predetermined volume of the building (e.g., in cubic feet), ACH is the predetermined air change per hour of the building, Wi is an indoor moisture content (e.g., in grains/lb of dry air), Wo is outdoor moisture content (e.g., in grains/lb of dry air), and Conversion Value is a predetermined conversion value. The ACH (e.g., in cubic feet of air per hour) may be calibrated and may be, for example, 0.5 for a (air) tightly sealed building, 1.0 for a less (air) tightly sealed building, and 1.5 for a (air) leaky building. For the example of humidity load in gallons per day, the predetermined conversion value may be 33,082. The OAT and the outdoor RH can be measured or obtained, for example, based on the location of the building. The IAT and the indoor RH can be measured by the thermostat 208 and/or the IAQ sensor module 304.

The humidity load module 1640 may determine the indoor moisture content based on the IAT and the indoor RH. The humidity load module 1640 may determine the outdoor moisture content based on the OAT and the outdoor RH. The humidity load module 1640 may determine the indoor moisture content and the outdoor moisture content, for example, using a lookup table or an equation that relates ambient temperatures and RHs to moisture contents. The lookup table or equation may be calibrated based on standard air properties.

In various implementations, the humidity load module 1640 may determine the humidity load using the equation above with an average predicted OAT over the next day and an average predicted outdoor RH over the next day. The setpoint temperature and the setpoint RH may also be used. The humidity load module 1640 may determine the average predicted OAT and the average predicted outdoor RH based on weather data for the location of the building, such as from the local data sources 532. For example, the local data sources 532 may provide predicted OATs and outdoor RHs at the location of the building by hour during the next day. The humidity load module 1640 may average the predicted OATs and average the predicted outdoor RHs to determine the average predicted OAT and the average predicted RH that are used to determine the humidity load for the next day. The humidity load module 1640 may update the humidity load each day for the next day.

In various implementations, the humidity load module 1640 may determine the humidity load by determining individual (predicted) humidity loads per hour during the next day and summing individual humidity loads per hour to determine the humidity load during the next day. The humidity load module 1640 may determine the individual humidity loads based on the predicted OATs and outdoor RHs by hour obtained via the weather data for the location of the building, such as from the local data sources 532. For example, the humidity load module 1640 may determine the individual humidity load for 2-3 pm based on the predicted OAT at 2 pm (or 3 pm) and the predicted outdoor RH at 2 pm (or 3 pm). The humidity load module 1640 may determine the individual humidity loads based on the equation above. In the example of determining individual (hourly) humidity loads, the predetermined conversion value may be 792,968 (33,082*24).

As discussed above, the humidifier 432 can be on (and dispensing water for evaporation to humidify the air within the building) or off (and not dispensing water for evaporation). The ON period module 1644 tracks the total amount of time that the humidifier 432 is on during each day. The total amount of time will be referred to as a humidifier ON period (e.g., in hours) of a day. The ON period module 1644 increments the humidifier ON period when the humidifier 432 is on. The ON period module 1644 maintains the humidifier ON period (and does not increment or decrement the humidifier ON period) when the humidifier 432 is off. The ON period module 1644 begins a new humidifier ON period each day. The ON period module 1644 may store one or more previous humidifier ON periods from one or more previous days, such as a last (complete) day.

The humidifier 432 has a predetermined evaporation rate of water provided (e.g., in gallons per hour). A predetermined water feed rate of the water feed valve 434 is greater than the predetermined evaporation rate such that the water feed valve 434 provides enough water to the humidifier 432 so the humidifier 432 can achieve the predetermined evaporation rate.

The humidification module 1648 determines a predicted humidification (e.g., in gallons of water) that may be provided to the air within the building by the humidifier 432 during the next day based on the predetermined evaporation rate of the humidifier 432 and the humidifier ON period of the last day. The humidification module 1648 may determine the predicted humidification using one of an equation and a lookup table that relates humidifier ON periods and predetermined evaporation rates to humidification values. For example, the humidification module 1648 may set the predicted humidification based on or equal to the predetermined evaporation rate of the humidifier 432 multiplied by the humidifier ON period of the last (previous) day before the present day.

The humidifier control module 1628 may compare the humidity load of the next day with the predicted humidification of the next day. If the predicted humidification is less than the humidity load, the humidifier control module 1628 may increase operation of the humidifier 432 before and/or during the next day. For example, the humidifier control module 1628 may turn the humidifier 432 on at times when the circulator blower 108 is on and the humidifier 432 would otherwise be off, such as due to the RH within the building being greater than the humidification RH setpoint. The increased operation of the humidifier 432 may, at least to some extent, offset the predicted humidity load of the next day in an effort to prevent low RH situations from occurring before and during the next day.

Figure 18:
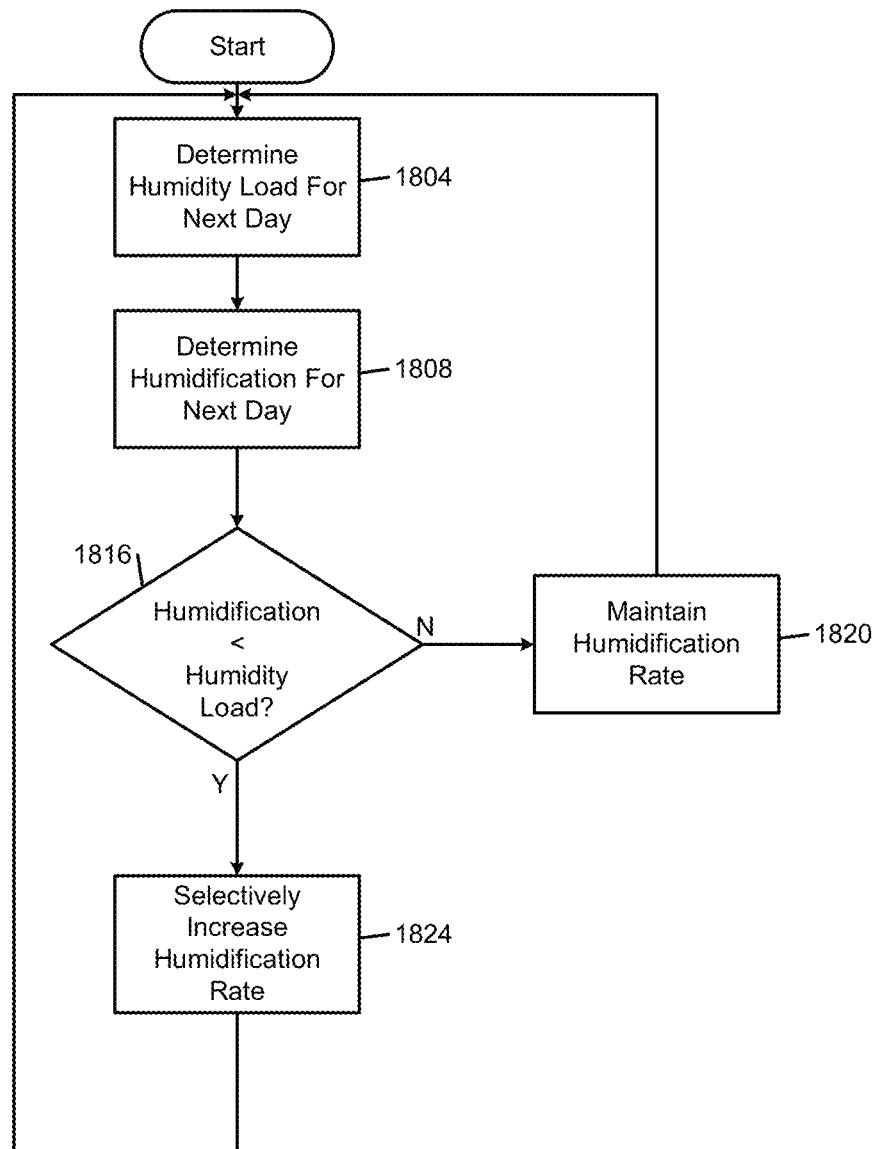

FIG. 18 includes an example method of controlling operation of the humidifier 432. Control may begin with 1804 where the humidity load module 1640 determines the humidity load for the next day. As described above, the humidity load module 1640 may determine the humidity load for the next day based on the average predicted OAT for the next day and the average predicted outdoor RH for the next day or the individual predicted OATs and outdoor RHs by hour.

At 1808, the humidification module 1648 determines the predicted humidification for the next day based on the predetermined evaporation rate of the humidifier 432 and the humidifier ON period of the previous (e.g., last) day. At 1816, the humidifier control module 1628 determines whether the predicted humidification is less than the humidity load. If 1816 is false, the humidifier control module 1628 may maintain the present humidification rate at 1820 and turn the humidifier 432 on, for example, when the RH is less than the humidification RH setpoint or as described in the example of FIG. 17. Alternatively, the humidifier control module 1628 may decrease the humidification rate (by turning the humidifier 432 on less frequently and/or for a shorter period while the circulator blower 108 is on) at 1820 before and/or during the next day. For example, the humidifier control module 1628 may leave the humidifier 432 off at times when the circulator blower 108 is on and the humidifier 432 would otherwise be on, such as due to the RH within the building being less than the humidification RH setpoint. This may at least to some extent offset the expected humidity load of the next day in an effort to prevent high RH situations from occurring before and during the next day.

If 1816 is true, the humidifier control module 1628 may increase the humidification rate (by turning the humidifier 432 on more frequently and/or for a longer period while the circulator blower 108 is on) at 1824 before and/or during the next day. For example, the humidifier control module 1628 may turn on the humidifier 432 at times when the circulator blower 108 is on and the humidifier 432 would otherwise be off, such as due to the RH within the building being greater than the humidification RH setpoint. This may at least to some extent offset the expected humidity load of the next day in an effort to prevent low RH situations from occurring before and during the next day.

The humidifier control module 1628 may also provide various data regarding humidity and humidification to the customer device 524. For example, the humidifier control module 1628 may provide the IAQ score, humidifier ON period per day, water usage of the humidifier per day (e.g., humidifier ON period multiplied by predetermined feed rate of the water feed valve 434), the IAQ score, humidification (e.g., humidifier ON period multiplied by predetermined evaporation rate), humidity load, predicted humidification, and/or other data. As described above, the customer device 524 may display received data on a display. As described above, the customer device 524 may allow a user to adjust RH setpoints and other parameters, for example, to balance IAQ, water, and blower usage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A humidifier control system for a building, comprising:
a humidity load module configured to:
obtain an outdoor ambient temperature at the building and an outdoor relative humidity (RH) at the building; and,
at a first time, determine a predicted humidity load of a future predetermined period based on a temperature of air within the building, a RH of air within the building, the outdoor ambient temperature, the outdoor RH, a predetermined air exchange rate of the building with outdoors, and an interior volume of the building,
wherein the future predetermined period is after the first time;
a humidification module configured to determine a predicted humidification provided by a humidifier within the building during the future predetermined period based on:
a period that the humidifier was on during a previous predetermined period, wherein the previous predetermined period is before the future predetermined period; and
a predetermined evaporation rate of the humidifier when the humidifier is on; and
a humidifier control module configured to open a water feed valve of the humidifier in response to a determination that the predicted humidification for the future predetermined period is less than the predicted humidity load of the future predetermined period.

2. The humidifier control system of claim 1 wherein the humidifier control module is configured to open the water feed valve of the humidifier before the future predetermined period in response to the determination that the predicted humidification for the future predetermined period is less than the predicted humidity load of the future predetermined period.

3. The humidifier control system of claim 2 wherein, in response to the determination that the predicted humidification for the future predetermined period is less than the predicted humidity load of the future predetermined period, the humidifier control module is configured to open the water feed valve of the humidifier before the future predetermined period when the RH of air within the building is greater than a predetermined humidification setpoint.

4. The humidifier control system of claim 1 wherein the humidifier control module is configured to open the water feed valve of the humidifier during the future predetermined period in response to the determination that the predicted humidification for the future predetermined period is less than the predicted humidity load of the future predetermined period.

5. The humidifier control system of claim 4 wherein, in response to the determination that the predicted humidification for the future predetermined period is less than the predicted humidity load of the future predetermined period, the humidifier control module is configured to open the water feed valve of the humidifier during the future predetermined period when the RH of air within the building is greater than a predetermined humidification setpoint.

6. The humidifier control system of claim 1 further comprising an indoor air quality (IAQ) module of the building and that comprises:
a temperature sensor configured to measure the temperature of air within the building; and
a RH sensor configured to measure the RH of air within the building.

7. The humidifier control system of claim 1 wherein the humidity load module is configured to:
receive predicted outdoor temperatures at predetermined times during the future predetermined period;
determine the outdoor ambient temperature at the building based on an average of the predicted outdoor temperatures at the predetermined times;
receive predicted outdoor RHs at the predetermined times during the future predetermined period; and
determine the outdoor ambient RH at the building based on an average of the predicted outdoor RHs at the predetermined times.

8. The humidifier control system of claim 1 wherein the humidity load module is configured to:
receive a first predicted outdoor ambient temperature at a first predetermined time during the future predetermined period;
receive a second predicted outdoor ambient temperature at a second predetermined time during the future predetermined period;
receive a first predicted outdoor RH at the first predetermined time during the future predetermined period;
receive a second predicted outdoor RH at the second predetermined time during the future predetermined period;
determine a first predicted humidity load based on the temperature of air within the building, the RH of air within the building, the first predicted outdoor ambient temperature, the first predicted outdoor RH, the predetermined air exchange rate of the building with outdoors, and the interior volume of the building;
determine a second predicted humidity load based on the temperature of air within the building, the RH of air within the building, the second predicted outdoor ambient temperature, the second predicted outdoor RH, the predetermined air exchange rate of the building with outdoors, and the interior volume of the building; and
set the predicted humidity load based on the first predicted humidity load plus the second predicted humidity load.

9. The humidifier control system of claim 1 wherein the temperature of air within the building is a setpoint temperature within the building.

10. The humidifier control system of claim 1 wherein the RH of air within the building is a setpoint RH within the building.

11. The humidifier control system of claim 1 wherein the temperature of air within the building is an average air temperature within the building over the previous predetermined period.

12. The humidifier control system of claim 1 wherein the RH of air within the building is an average RH of air within the building over the previous predetermined period.

13. A humidifier control method, comprising:
obtaining an outdoor ambient temperature at a building;
obtaining an outdoor relative humidity (RH) at the building;
at a first time, determining a predicted humidity load of a future predetermined period based on a temperature of air within the building, a RH of air within the building, the outdoor ambient temperature, the outdoor RH, a predetermined air exchange rate of the building with outdoors, and an interior volume of the building,
wherein the future predetermined period is after the first time;

determining a predicted humidification provided by a humidifier within the building during the future predetermined period based on:
- a period that the humidifier was on during a previous predetermined period, wherein the previous predetermined period is before the future predetermined period; and
- a predetermined evaporation rate of the humidifier when the humidifier is on; and opening a water feed valve of the humidifier in response to a determination that the predicted humidification for the future predetermined period is less than the predicted humidity load of the future predetermined period.

14. The humidifier control method of claim 13 wherein opening the water feed valve includes opening the water feed valve of the humidifier before the future predetermined period in response to the determination that the predicted humidification for the future predetermined period is less than the predicted humidity load of the future predetermined period.

15. The humidifier control method of claim 14 wherein opening the water feed valve includes, in response to the determination that the predicted humidification for the future predetermined period is less than the predicted humidity load of the future predetermined period, opening the water feed valve of the humidifier before the future predetermined period when the RH of air within the building is greater than a predetermined humidification setpoint.

16. The humidifier control method of claim 13 wherein opening the water feed valve includes opening the water feed valve of the humidifier during the future predetermined period in response to the determination that the predicted humidification for the future predetermined period is less than the predicted humidity load of the future predetermined period.

17. The humidifier control method of claim 16 wherein opening the water feed valve includes, in response to the determination that the predicted humidification for the future predetermined period is less than the predicted humidity load of the future predetermined period, opening the water feed valve of the humidifier during the future predetermined period when the RH of air within the building is greater than a predetermined humidification setpoint.

18. The humidifier control method of claim 13 further comprising:
- by a temperature sensor of an indoor air quality (IAQ) sensor module of the building, measuring the temperature of air within the building; and
- by a RH sensor of the IAQ sensor module, measuring the RH of air within the building.

19. The humidifier control method of claim 13 further comprising:
- receiving predicted outdoor temperatures at predetermined times during the future predetermined period;
- determining the outdoor ambient temperature at the building based on an average of the predicted outdoor temperatures at the predetermined times;
- receiving predicted outdoor RHs at the predetermined times during the future predetermined period; and
- determining the outdoor ambient RH at the building based on an average of the predicted outdoor RHs at the predetermined times.

20. The humidifier control method of claim 13 further comprising:
- receiving a first predicted outdoor ambient temperature at a first predetermined time during the future predetermined period;
- receiving a second predicted outdoor ambient temperature at a second predetermined time during the future predetermined period;
- receiving a first predicted outdoor RH at the first predetermined time during the future predetermined period;
- receiving a second predicted outdoor RH at the second predetermined time during the future predetermined period;
- determining a first predicted humidity load based on the temperature of air within the building, the RH of air within the building, the first predicted outdoor ambient temperature, the first predicted outdoor RH, the predetermined air exchange rate of the building with outdoors, and the interior volume of the building;
- determining a second predicted humidity load based on the temperature of air within the building, the RH of air within the building, the second predicted outdoor ambient temperature, the second predicted outdoor RH, the predetermined air exchange rate of the building with outdoors, and the interior volume of the building; and
- setting the predicted humidity load based on the first predicted humidity load plus the second predicted humidity load.

21. The humidifier control method of claim 13 wherein the temperature of air within the building is a setpoint temperature within the building.

22. The humidifier control method of claim 13 wherein the RH of air within the building is a setpoint RH within the building.

23. The humidifier control method of claim 13 wherein the temperature of air within the building is an average air temperature within the building over the previous predetermined period.

24. The humidifier control method of claim 13 wherein the RH of air within the building is an average RH of air within the building over the previous predetermined period.

25. A humidifier control method, comprising:
- obtaining an outdoor ambient temperature at a building;
- obtaining an outdoor relative humidity (RH) at the building;
- determining a humidity load based on a temperature of air within the building, a RH of air within the building, the outdoor ambient temperature, the outdoor RH, a volume of the building, a predetermined air exchange rate of the building with outdoors, and an interior volume of the building;
- determining a humidification provided by a humidifier within the building based on:
  - a period that the humidifier was on during a previous predetermined period; and
  - a predetermined evaporation rate of the humidifier when the humidifier is on; and
- opening a water feed valve of the humidifier in response to a determination that the humidification is less than the humidity load.

* * * * *